(12) United States Patent
Yamada et al.

(10) Patent No.: US 7,322,607 B2
(45) Date of Patent: Jan. 29, 2008

(54) TELESCOPIC SHAFT FOR STEERING VEHICLE AND TELESCOPIC SHAFT FOR STEERING VEHICLE WITH CARDAN SHAFT COUPLING

(75) Inventors: Yasuhisa Yamada, Gunma-ken (JP); Akihiro Shoda, Gunma-ken (JP); Atsushi Ozawa, Kanagawa-ken (JP); Kinji Yukawa, Kanagawa-ken (JP); Takatsugu Yamada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 319 days.

(21) Appl. No.: 10/504,815

(22) PCT Filed: Jun. 10, 2003

(86) PCT No.: PCT/JP03/07323

§ 371 (c)(1), (2), (4) Date: Aug. 17, 2004

(87) PCT Pub. No.: WO03/104062

PCT Pub. Date: Dec. 18, 2003

(65) Prior Publication Data

US 2005/0104354 A1  May 19, 2005

(30) Foreign Application Priority Data

Jun. 11, 2002 (JP) ............... 2002-170552
Jan. 10, 2003 (JP) ............... 2003-004774

(51) Int. Cl.
*B60R 21/00* (2006.01)
(52) U.S. Cl. ............... 280/755; 74/493; 74/496
(58) Field of Classification Search ............ 280/755; 74/492, 493, 504, 496, 503; 403/559.5, 559.4, 403/359.1; 464/167; 384/49, 52, 53, 54
See application file for complete search history.

(56) References Cited

U.S. PATENT DOCUMENTS 4,667,530 A * 5/1987 Mettler et al. ............... 74/493

(Continued)

FOREIGN PATENT DOCUMENTS

DE  37 30 393  3/1989

(Continued)

*Primary Examiner*—Paul N. Dickson
*Assistant Examiner*—Toan C. To
(74) *Attorney, Agent, or Firm*—Miles & Stockbridge PC

(57) ABSTRACT

A telescopic shaft for steering of a vehicle is assembled in a steering shaft and includes a male shaft and a female shaft that are so fitted as not to be rotatable but to be slidable. Rolling members are fitted through an elastic body for pre-load between at least a pair of axially-extending grooves formed in an outer peripheral surface of the male shaft and in an inner peripheral surface of the female shaft. A slide member is fitted in between at least another pair of axially-extending grooves formed in the outer peripheral surface of the male shaft and in the inner peripheral surface of the female shaft. When a steering toque is equal to or smaller than a predetermined level, the elastic body for the pre-load exhibits a low rigidity characteristic as the elastic body performs pre-load action. When the steering torque is equal to or larger than the predetermined level, the slide member exhibits a high rigidity characteristic as the slide member engages with the pair of axially extending grooves.

9 Claims, 39 Drawing Sheets

U.S. PATENT DOCUMENTS

| | | | |
|---|---|---|---|
| 5,226,853 A * | 7/1993 | Courgeon | 464/160 |
| 5,235,734 A * | 8/1993 | DuRocher et al. | 29/455.1 |
| 5,460,574 A * | 10/1995 | Hobaugh | 464/162 |
| 6,343,993 B1 | 2/2002 | Duval et al. | 464/167 |
| 6,557,433 B1 * | 5/2003 | Castellon | 74/492 |
| 6,755,746 B2 * | 6/2004 | Barnley et al. | 464/162 |
| 2001/0006564 A1 | 7/2001 | Geyer et al. | 384/49 |
| 2005/0104354 A1 * | 5/2005 | Yamada et al. | 280/775 |
| 2006/0060022 A1 * | 3/2006 | Yamada | 74/492 |
| 2006/0068924 A1 * | 3/2006 | Yamada | 464/167 |
| 2006/0156855 A1 * | 7/2006 | Yukawa et al. | 74/493 |
| 2006/0162989 A1 * | 7/2006 | Yamada | 180/444 |
| 2006/0181069 A1 * | 8/2006 | Yamada | 280/775 |
| 2006/0252559 A1 * | 11/2006 | Yamada | 464/167 |

FOREIGN PATENT DOCUMENTS

| | | |
|---|---|---|
| DE | 198 24 477 | 2/1999 |
| DE | 199 05 350 | 8/2000 |
| EP | 1 065 397 | 1/2001 |
| EP | 1 078 843 | 2/2001 |
| JP | 29-16708 | 12/1954 |
| JP | 62-244758 | 10/1987 |
| JP | UM 4-43522 | 4/1992 |
| JP | UM 4-123775 | 11/1992 |
| JP | 2000-38142 | 2/2000 |
| JP | 2001-50293 | 2/2001 |
| JP | 2001-239944 | 9/2001 |
| WO | WO 99/08920 | 2/1999 |

* cited by examiner

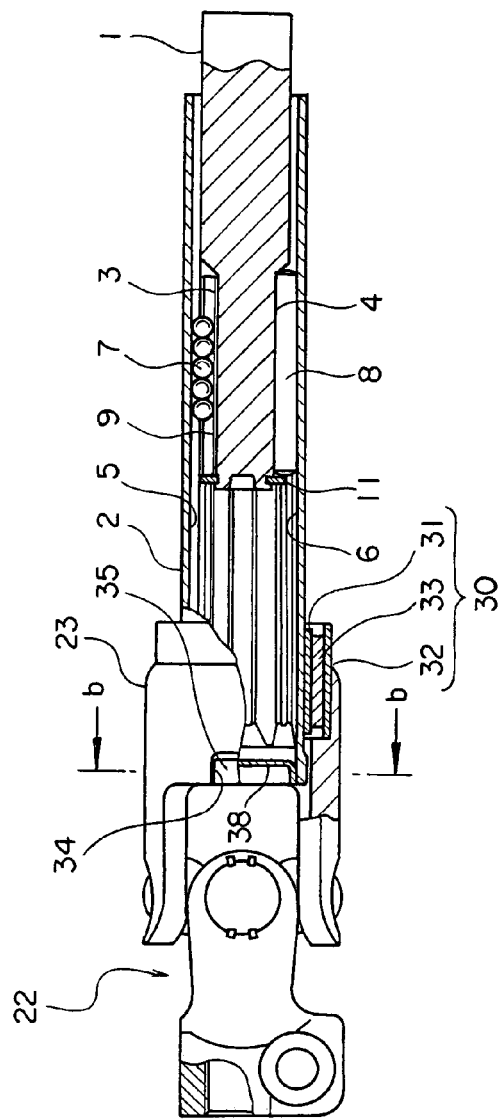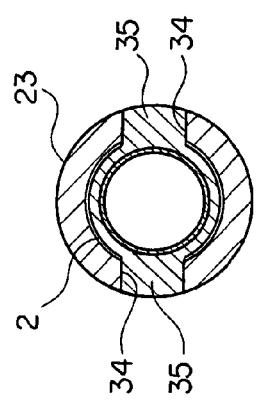
FIG. 12A
FIG. 12B

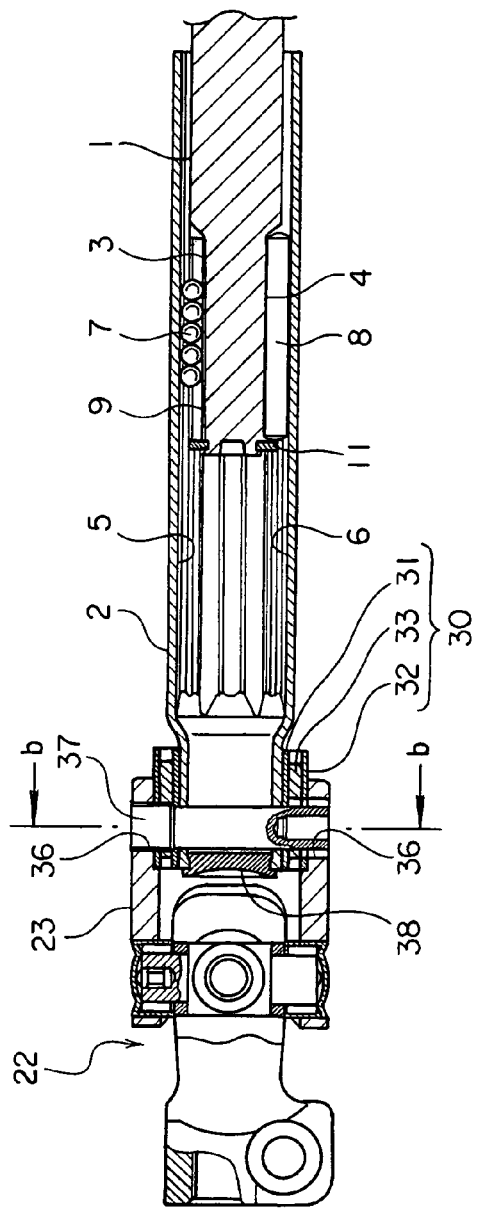
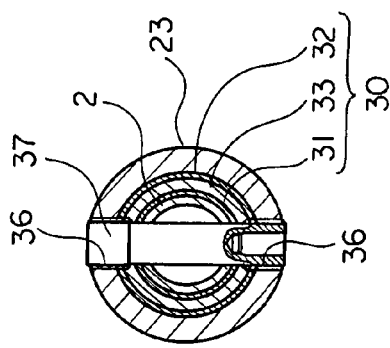
FIG. 16A
FIG. 16B

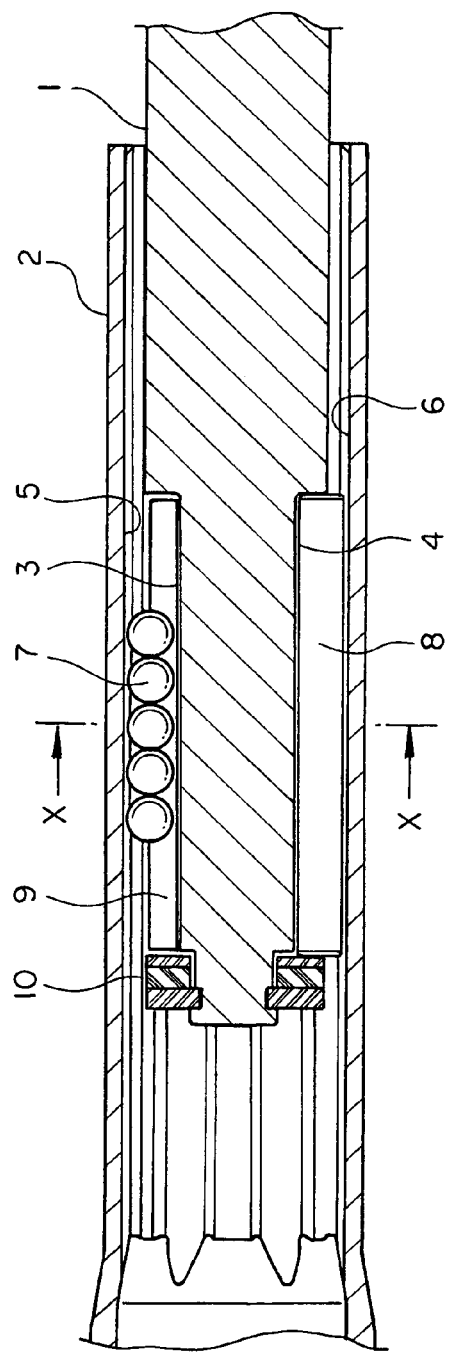
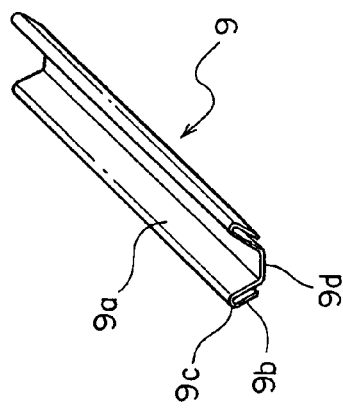
FIG. 18A
FIG. 18B

TELESCOPIC SHAFT FOR STEERING VEHICLE AND TELESCOPIC SHAFT FOR STEERING VEHICLE WITH CARDAN SHAFT COUPLING

TECHNICAL FIELD

The present invention relates to a telescopic shaft for steering of a vehicle and a telescopic shaft for steering of a vehicle with a Cardan shaft joint.

BACKGROUND ARTS

In a steering apparatus for a vehicle, an intermediate shaft is provided, for instance, between a Cardan shaft joint provided on the side of a steering shaft and a Cardan shaft joint provided on the side of a steering gear.

The intermediate shaft is constructed of a male shaft and a female shaft that are so spline-fitted, etc. as not to be rotatable but to be slidable on each other. The intermediate shaft is structured to be capable of transferring a steering torque in a high rigidity state while preventing a backlash in order to surely transfer the steering torque given from a driver to the steering gear, absorbing an axis-directional displacement caused when the vehicle travels, and sliding (expandable/retractable) in the axial direction with a comparatively low and stable slide load so that the intermediate shaft can be expanded and retracted when disassembled and assembled.

The intermediate shaft has, for cutting uncomfortable "noises" and "vibrations" transferred to an interior of a car room from traveling wheels and from an engine room, a buffer mechanism provided between the intermediate shaft and a yoke of the Cardan shaft joint as disclosed in, e.g., German Patent Laid-Open Publication DE19905350A1.

In this buffer mechanism, a buffer member constructed by charging a space between an inner ring and an outer ring with a rubber, is provided between the intermediate shaft and the yoke of the Cardan shaft joint. When the steering torque is equal to or smaller than a predetermined level, the buffer member can buffer and reduce the uncomfortable noises and vibrations transferred from the engine room.

Note that the yoke is formed with a cut portion, while the intermediate shaft is provided with an engaging member (a protruded cam). Owing to this configuration, when the steering torque is equal to or smaller than the predetermined level, the engaging member does not engage with the cut portion, and when the steering torque rises to become equal to or larger than the predetermined level, the engaging member engages the cut portion, thus enabling the steering torque to be transferred. A feeling of sharp steering can be therefore acquired.

As described above, the intermediate shaft with the Cardan shaft joint has the buffer function in addition to the steering torque transfer function and the telescopic function.

It is, however, required that the buffer mechanism be provided on the side of the yoke of the Cardan shaft joint, and hence an effective utility space is reduced proportionally to a space for the buffer mechanism. This is a comparatively narrow portion, and nevertheless a scheme of effectively utilizing the space can not be attained. Further, this is a hindrance to decrease both the number of parts and manufacturing costs.

Moreover, a performance of absorbing the axis-directional displacement caused when the car travels and preventing the displacement and vibrations from being transferred onto a steering wheel, is required of the telescopic shaft of the steering mechanism of the car. Furthermore, the telescopic shaft is required to have a function by which a driver shifts and thus adjusts a position of the steering wheel in the axial direction in order to obtain an optimum position to driving the car.

In each of these cases, the telescopic shaft is required to reduce the backlash noises, an unpleasant feeling about the backlash on the steering wheel and a slide resistance during a slide operation in the axial direction.

Such being the case, the male shaft of the telescopic shaft has hitherto been coated with a film of nylon, and the slide portion has been greased, thereby absorbing or relieving metal noises, metal butting noises, etc. and reducing the slide resistance and the backlash caused in the rotating direction.

It might, however, happen that the film of nylon is increasingly abraded with an elapse of its use, with the result that the backlash in the rotating direction augments. Further, under a condition of being exposed to a high temperature within an engine room, the film of nylon changes in its volume and remarkably increases in slide resistance, and the abrasion thereof is conspicuously accelerated, resulting in an increase in the backlash in the rotating direction.

Under such circumstances, German Patent DE3730393C2 discloses that torque transfer members (spherical members) rolling when two shafts make relative movements in the axial direction, are fitted in between plural pairs of axially-extending grooves formed respectively in an outer peripheral surface of a male shaft and in an inner peripheral surface of a female shaft.

Further, according to German Patent DE3730393C2, a pre-load elastic body (leaf spring) for giving pre-load to the male shaft and the female shaft through a torque transfer member (spherical member), is provided between an inward or outward portion of the torque transfer member (spherical member) in a radial direction and each pair of axially-extending grooves.

With this configuration, when the torque is not transferred (when sliding), the leaf spring gives the pre-load to the torque transfer member (spherical member) against the female shaft to an extent large enough not to cause the backlash, thereby making it possible to prevent the backlash between the male shaft and the female shaft and enabling the male shaft and the female shaft to slide in the axial direction with a stable slide load without any backlash.

Moreover, when the torque is transferred, the leaf spring is capable of restricting the torque transfer member (spherical member) in a peripheral direction, and therefore the male shaft and the female shaft can transfer the torque in a high rigidity state while preventing the backlash in the rotating direction thereof.

Besides, according to structures disclosed in FIGS. 1 through 5 in German Patent DE3730393C2, one leaf spring for giving the pre-load to a set of torque transfer members (spherical members) is connected in the peripheral direction to another leaf spring for giving the pre-load to another set of torque transfer members (spherical members) adjacent thereto in the peripheral direction through a circular-arc connecting portion (web) extending in the peripheral direction.

The connecting portion (web) serves to generate the pre-load in the two leaf springs by applying tension or compression to the two leaf springs each other.

Note that according to structures disclosed in FIGS. 6 and 7 in German Patent DE3730393C2, the two leaf springs are not connected through the connecting member (web), however, a separate elastic body is interposed between the leaf spring and the axially-extending groove, thereby generating the pre-load in the radial direction.

In the structure disclosed in the above Patent Document, however, firstly, the pre-load is generated between the male shaft, the spherical member and the female shaft, and hence a curvature of the leaf spring and a curvature of the axially-extending groove has been changed so that the leaf spring may be disposed. The leaf spring is therefore unable to take a large quantity of flexure thereof. Note that a scatter in working accuracy, if any, is not allowable with the quantity of flexure to that extent.

Secondly, when the torque is inputted, the male shaft, the leaf spring, the spherical members and the female shaft get narrow down each other and thus transfer the torque, and therefore an extremely high surface pressure occurs at a contact point between the spherical member and the leaf spring. Namely, when the torque is transferred, a high stress occurs on the leaf spring, with the result that a "fatigue" of the leaf spring is induced by a permanent deformation, pre-load performance becomes hard to maintain over a long period of time, and this might be a hindrance to gain a longer life-time of the steering shaft.

Thirdly, when the torque is transferred, the leaf spring slides sideways in the peripheral direction from the axially-extending groove, whereby a decline of the transfer torque is induced, a degree of hysteresis can not be managed, and the hysteresis might excessively occur.

Fourthly, when a torque load is not applied, the contact points between the male shaft, the spherical member, the leaf spring and the female shaft do not exist on the same line, and hence contact angles change as the torque load is applied. As a result, neither a linear torsional characteristic necessary for the steering shaft nor the proper hysteresis might be obtained.

It is a first object of the present invention, which was devised under the circumstances described above, to provide a telescopic shaft for steering of a vehicle and a telescopic shaft for steering of a vehicle with a Cardan shaft joint that are capable of sliding with a stable slide load while surely preventing a backlash, transferring a torque in a high rigidity state and, besides, having two- or three-staged torsional rigidity characteristics while scheming to effectively utilize a space and to reduce the number of parts.

DISCLOSURE OF THE INVENTION

To accomplish the first object, a telescopic shaft for steering of a vehicle according to a first invention is assembled in a steering shaft and including a male shaft and a female shaft that are so fitted as not to be rotatable but to be slidable, and is characterized in that: rolling members are fitted through an elastic body for pre-load between at least a pair of axially-extending grooves formed in an outer peripheral surface of the male shaft and in an inner peripheral surface of the female shaft; a slide member is fitted in between at least another pair of axially-extending grooves formed in the outer peripheral surface of the male shaft and in the inner peripheral surface of the female shaft; and when a steering toque is equal to or smaller than a predetermined level, the elastic body for the pre-load exhibits a low rigidity characteristic as the elastic body performs pre-load action, when the steering torque is equal to or larger than the predetermined level, the slide member exhibits a high rigidity characteristic as the slide member engages with the pair of axially extending grooves, and two-staged torsional rigidity characteristics of the low rigidity characteristic and the high rigidity characteristic, are thereby provided.

Thus, according to the first invention, when torque is transferred, two types of roller members and slide member are employed, and the elastic body gives the pre-load to the rolling members against the female shaft to an extent large enough not to cause the backlash, whereby the male shaft and the female shaft can slide with the stable slide load in the axial direction while surely preventing the backlash between the male shaft and the female shaft.

When the torque is transferred, the slide member engages with the pair of axially-extending grooves in the peripheral direction and can thus be restricted, and further the rolling members can be restricted in the peripheral direction by the elastic body. It is therefore possible to transfer the torque in a high rigidity state by certainly preventing the backlash in the rotating direction between the male shaft and the female shaft.

Moreover, when the steering toque is equal to or smaller than the predetermined level, the elastic body for the pre-load exhibits the low rigidity characteristic as the elastic body performs pre-load action. On the other hand, when the steering torque is equal to or larger than the predetermined level, the slide member exhibits the high rigidity characteristic as the slide member engages with the pair of axially extending grooves in the peripheral direction.

Namely, when the steering torque is equal to or smaller than the predetermined level, the elastic body buffers and thus reduces uncomfortable noises and vibrations transferred from an engine room by the pre-load action thereof. While on the other hand, when the steering torque rises to become equal to or larger than the predetermined level, the slide member engages with the pair of axially-extending grooves in the peripheral direction, and can thus transfer the steering torque, whereby a feeling of sharp steering can be acquired.

Accordingly, the torque transfer/slide mechanism serves also as a buffer mechanism, and hence it is possible to provide the telescopic shaft exhibiting the two-staged torsional rigidity characteristics in a way that effectively makes the use of a space and reduces both of the number of parts and manufacturing costs.

A telescopic shaft for steering of a vehicle with a Cardan shaft joint according to a second invention is assembled in a steering shaft, including a male shaft and a female shaft that are so fitted as not to be rotatable but to be slidable, and receiving a connection of a yoke of a Cardan shaft joint, and is characterized in that: rolling members are fitted through an elastic body for pre-load between at least a pair of axially-extending grooves formed in an outer peripheral surface of the male shaft and in an inner peripheral surface of the female shaft; a slide member is fitted in between at least another pair of axially-extending grooves formed in the outer peripheral surface of the male shaft and in the inner peripheral surface of the female shaft; a buffer member is interposed between the yoke and any one of the male shaft and the female shaft; the yoke is formed with an engaged portion, and any one of the male shaft and the female shaft is provided with an engaging member capable of engaging with and disengaging from the engaged portion; and when a steering toque is equal to or smaller than a predetermined level, the engaging member does not engage with the engaged portion while the buffer member exhibits a low rigidity characteristic as the buffer member performs buffer action, when the steering torque falls within a predetermined intermediate range, the elastic body for the pre-load exhibits an intermediate rigidity characteristic as the elastic body performs pre-load action, when the steering torque is equal to or larger than the predetermined level, the engaging member engages with the engaged portion while the slide member exhibits a high rigidity characteristic as the slide member engages with the pair of axially-extending grooves in a peripheral direction, and three-staged torsional rigidity characteristics of the low rigidity characteristic, the intermediate rigidity characteristic and the high rigidity characteristic, are thereby provided.

Thus, according to the second invention, when the steering torque is equal to or smaller than the predetermined level, the engaging member does not engage with the engaged portion, and the buffer member exhibits the low rigidity characteristic as it performs the buffer action. When the steering torque is within the predetermined intermediate range, the elastic body for the pre-load exhibits the intermediate rigidity characteristic as it performs the pre-load action. On the other hand, when the steering torque is equal to or larger than the predetermined level, the engaging member engages with the engaged portion, and the slide member engages with the pair of axially-extending grooves in the peripheral direction and exhibits the high rigidity characteristic.

Namely, when the steering torque is equal to or smaller than the predetermined level, the engaging member does not engage with the engaged portion, and the buffer member can buffer and thus reduce the uncomfortable noises and vibrations transferred from the engine room. When the steering torque is within the predetermined intermediate range, the elastic body for the pre-load raises the torsional rigidity stepwise by the pre-load action thereof. On the other hand, when the steering torque rises to become equal to or larger than the predetermined level, the engaging member engages with the engaged portion, and the slide member engages with the pair of axially-extending grooves in the peripheral direction, thus transferring the steering torque. The feeling of sharp steering can be therefore acquired.

Accordingly, if the telescopic shaft serves also as a torque transfer/slide/buffer mechanism, the buffer mechanism is provided separately on the yoke-side, the telescopic shaft having the three-staged torsional rigidity characteristics can be provided.

It is an object of a third invention of the present application to provide a telescopic shaft for steering of a vehicle that is capable of actualizing a stable slide load, surely preventing the backlash in the rotating direction, transferring the torque in the high rigidity state, besides setting a quantity of flexure of the leaf spring comparatively large, improving durability of pre-load performance, preventing hysteresis from becoming excessive, and acquiring a linear torsional characteristic necessary for the steering shaft.

A telescopic shaft for steering of a vehicle according to the third invention is assembled in a steering shaft and including a male shaft and a female shaft that are so fitted as not to be rotatable but to be slidable, and is characterized in that: a first torque transfer member is interposed through an elastic body in at least one line of axially-extending groove formed in each of an outer peripheral surface of the male shaft and an inner peripheral surface of the female shaft; a second torque transfer member is interposed between at least another line of axially-extending groove formed in each of the outer peripheral surface of the male shaft and the inner peripheral surface of the female shaft; and the elastic body includes a transfer member sided contact portion making contact with the first torque transfer member, a groove surface sided contact portion spaced at a predetermined interval substantially in a peripheral direction from the transfer member sided contact portion, and making contact with a groove surface of the axially-extending groove of the male shaft or the female shaft, and a biasing portion elastically biasing the transfer member sided contact portion and the groove surface sided contact portion in such a direction as to get separated from each other.

Thus, according to the third invention, the elastic body includes the transfer member sided contact portion making contact with the first torque transfer member, the groove surface sided contact portion spaced at the predetermined interval substantially in the peripheral direction from the transfer member sided contact portion, and making contact with the groove surface of the axially-extending groove of the male shaft or the female shaft, and the biasing portion elastically biasing the transfer member sided contact portion and the groove surface sided contact portion in such a direction as to get separated from each other. Accordingly, the elastic body, with its transfer member sided contact portion capable of getting sufficiently flexural through the biasing portion, is therefore capable of ensuring an ample quantity of flexure thereof.

Further, because of including the second torque transfer member in addition to the first torque transfer members, when the torque is transferred, the second torque transfer member makes contact with the axially-extending grooves of the male shaft and of the female shaft earlier than the excessive load (stress) is applied on the elastic body, and are capable of mainly transferring the torque, and consequently the excessive load (stress) is applied on neither the first torque transfer members nor the elastic body.

Moreover, the elastic body can ensure the sufficient quantity of flexure, and the excessive load (stress) is applied on neither the first torque members nor the elastic body. Therefore, when the torque is transferred, the stress generated at the contact portion between the first torque member and the elastic body can be relieved, whereby none of the high stress occurs and the pre-load performance can be maintained over a long period of time by preventing a "fatigue" due to the permanent deformation.

Still further, in the elastic body, the transfer member sided contact portions thereof are in contact with the first torque transfer member, and the groove surface sided contact portions thereof are in contact with the groove surfaces of the axially-extending groove. Therefore, the elastic body is in the state of fitting into the axially-extending groove. Accordingly, when the torque is transferred, the whole of the elastic body is hard to slide sideways in the peripheral direction from the axially-extending groove. Hence, a decrease in the transfer torque is not induced, and the hysteresis can be prevented from becoming excessive.

Furthermore, contact points between the male shaft, the spherical member, the elastic body and the female shaft stay on the same line irrespective of the state of the torque load, and therefore the contact angle does not change. This makes it possible to acquire the linear torsional characteristic necessary for the steering shaft and also a linear steering characteristic giving the feeling of the high rigidity.

Note that manufacturing errors of the male shaft, the female shaft and the elastic body can be absorbed by the elastic deformation of the elastic body, so that machining of the groove is not required, and the costs can be reduced.

In the telescopic shaft for the steering of the vehicle according to the third invention, preferably the first torque transfer member may be a rolling member that rolls when the two shafts make relative movements in the axial direction, and the second torque transfer member may be a slide member that slides when the two shafts make the relative movements in the axial direction. Thus, the first torque transfer member is the rolling member that rolls when the two shafts make relative movements in the axial direction, and the second torque transfer member may be a slide member that slides when the two shafts make the relative movements in the axial direction. Hence, when the torque is transferred, the second torque transfer member as the slide member makes contact with the axially-extending groove of the male shaft and of the female shaft earlier than the excessive load (stress) is applied on the elastic body, and is capable of mainly transferring the torque, and consequently the excessive load (stress) is applied on neither the first torque transfer member as the rolling member nor the elastic body. Therefore, when setting and when the torque is transferred, the stress generated at the contact portion between the rolling member and the elastic body can be relieved, whereby the pre-load performance can be maintained over the long period of time by preventing the "fatigue" due to the permanent deformation.

In the telescopic shaft for the steering of the vehicle according to the third invention, preferably, the biasing portion of the elastic body may take a bent shape bent between the transfer member sided contact portion and the groove surface sided contact portion. Thus, the biasing portion of the elastic body may take a bent shape bent between the transfer member sided contact portion and the groove surface sided contact portion. The biasing portion in the bent shape can elastically bias the transfer member sided contact portion and the groove surface sided contact portion so as to get separated from each other.

In the telescopic shaft for the steering of the vehicle according to the third invention, preferably, the axially-extending groove of the male shaft or the female shaft may have a flat side surface making contact with the groove surface sided contact portion of the elastic body, and a bottom surface contiguous to the flat side surface, the elastic body may have a bottom portion facing the bottom surface of the axially-extending groove, and the bottom portion of the elastic body may be set in a contact state with the bottom surface of the axially-extending groove, or an interval between the bottom surface of the axially-extending groove and the bottom portion of the elastic body may be set to a predetermined interval.

Hence, the bottom portion of the elastic body is made contact with the bottom surface of the axially-extending groove as the necessity may arise, thereby making it possible to control the hysteresis and to obtain the hysteresis as desired.

Namely, it is required that the hysteresis be changed in many ways in matching with the steering performance of each vehicle. To be specific, in a case where the bottom portion of the elastic body is set in the contact-state with the bottom surface of the axially-extending groove, a friction occurs when the axially-extending groove and the elastic body make relative movements, and the hysteresis can be set comparatively large. On the other hand, an interval between the bottom surface of the axially-extending groove and the bottom portion of the elastic body is set to a predetermined interval, in which case none of the friction occurs when the axially-extending groove and the elastic body make the relative movements, and the hysteresis can be set comparatively small.

In the telescopic shaft for the steering of the vehicle according to the third invention, preferably the biasing portion of the elastic body may be a separate portion from the transfer member sided contact portion and from the groove surface sided contact portion, and may be formed of a different material. Thus, the biasing portion of the elastic body is a separate portion from the transfer member sided contact portion and from the groove surface sided contact portion, and is formed of the different material. Therefore, when the torque is transferred, the stress generated at the biasing portion can be made comparatively small.

In the telescopic shaft for the steering of the vehicle according to a fourth invention, preferably, the elastic body includes, in addition to the transfer member sided contact portion, the groove surface sided contact portion and the biasing portion, a second biasing portion provided formed of a different material as a separate portion. Thus, the elastic body may include, in addition to the transfer member sided contact portion, the groove surface sided contact portion and the biasing portion, the second biasing portion provided formed of the different material as the separate portion, whereby the steering characteristic giving the feeling of desired high rigidity can be acquired owing to the two biasing portions.

In the telescopic shaft for the steering of the vehicle according to the fourth invention, preferably, the elastic body is constructed of a leaf spring. Thus, the elastic body is constructed of the leaf spring, whereby the steering characteristic giving the feeling of the desired high rigidity can be obtained while restraining the manufacturing costs.

In the telescopic shaft for the steering of the vehicle according to the fourth invention, preferably, the biasing portion provided as the separate portion and formed of the different material and the second biasing portion provided as the separate portion and formed of the different material, are made of a rubber or a synthetic resin. Thus, the biasing portion provided as the separate portion and formed of the different material and the second biasing portion provided as the separate portion and formed of the different material, are made of the rubber or the synthetic resin, whereby the stress generated at the biasing portion when the torque is transferred can be made comparatively small, and the steering characteristic giving the feeling of desired high rigidity can be acquired.

In the telescopic shaft for the steering of the vehicle according to the fourth invention, preferably, a lubricating agent is applied between the axially-extending groove of the male shaft, the axially-extending groove of the female shaft, the elastic body and the first torque transfer member. Thus, the lubricating agent is applied between the axially-extending groove of the male shaft, the axially-extending groove of the female shaft, the elastic body and the first torque transfer member, whereby when the torque is not transferred (when sliding), the male shaft and the female shaft can slide in the axial direction with the stable slide load without any backlash.

From what has been discussed so far, according to the fourth invention, the stress generated on the elastic body is relieved, whereby the pre-load performance required over the long period of time can be maintained by preventing the "fatigue" of the elastic body. Further, there is no necessity of setting the dimensional accuracy strict, and the reduction in the costs can be actualized. Moreover, the steering performance required can be easily obtained because of being structured so that the friction between the elastic body and the axially-extending groove can be controlled.

BRIEF DESCRIPTION OF THE DRAWINGS

FIG. 12A is a vertical sectional view of the telescopic shaft for the steering of the vehicle with a Cardan shaft joint according to a second embodiment of the present invention; FIG. 12B is a cross-sectional view taken along the line b-b in FIG. 12A;

FIG. 16A is a vertical sectional view of the telescopic shaft for the steering of the vehicle with the Cardan shaft joint according to a third embodiment of the present invention; FIG. 16B is a cross-sectional view taken along the line b-b in FIG. 16A;

FIG. 18A is a vertical sectional view of the telescopic shaft for the steering of the vehicle according to a fourth embodiment of the present invention; FIG. 18B is a perspective view of a leaf spring as an elastic body;

EMBODIMENTS OF THE INVENTION

A telescopic shaft for steering of a vehicle according an embodiment of the present invention will hereinafter be described with reference to the accompanying drawings.

(Whole Construction of Steering Shaft for Vehicle)

Figure 1:
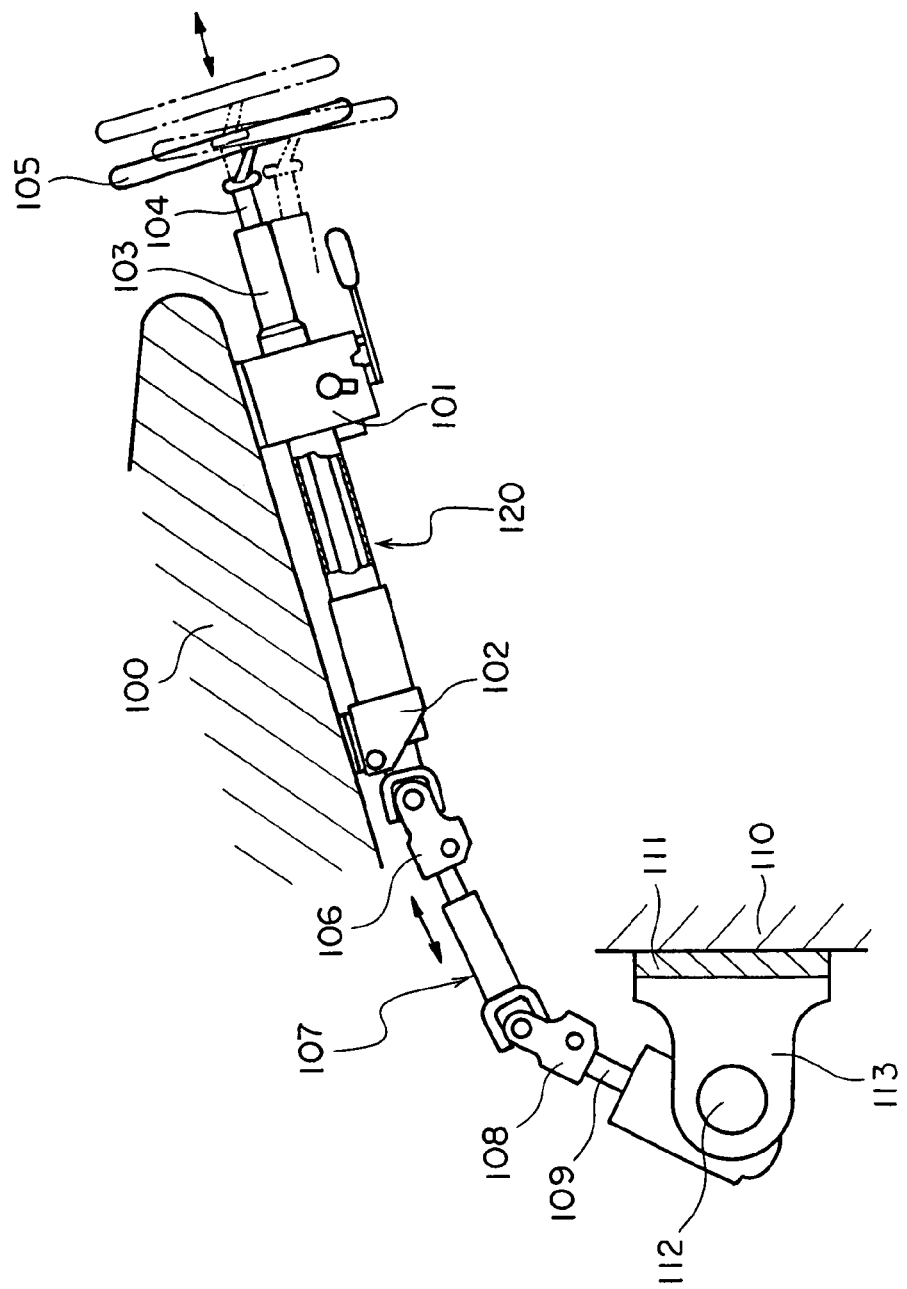
FIG. 1 is a schematic side view of a steering mechanism unit of a car, to which a telescopic shaft for steering of a vehicle according to an embodiment of the present invention is applied.

FIG. 1 is a side view of a steering mechanism unit of a car, to which the telescopic shaft for the steering of the vehicle according to the embodiment of the present invention is applied.

Referring to FIG. 1, the steering mechanism unit is constructed of: an upper steering shaft member 120 (including a steering column 103 and a steering shaft 104a rotatably held in the steering column 103) secured to a car-body-sided member 100 through an upper bracket 101 and a lower bracket 102; a steering wheel 105 fitted to an upper end of the steering shaft 104; a lower steering shaft member 107 connected through a universal joint 106 to a lower end of the steering shaft 104; a pinion shaft 109 connected through a steering shaft joint 108 to the lower steering shaft member 107; a steering rack shaft 112 connected to the pinion shaft 109; and a steering rack support member 113 supporting the steering rack shaft 112 and fixed to a different frame 110 of the car body through an elastic body 111.

Herein, the upper steering shaft member 120 and the lower steering shaft member 107 involve the use of the telescopic shaft for the steering of the vehicle (which will hereinafter be simply termed "the telescopic shaft") according to the embodiment of the present invention. The lower steering shaft member 107 is assembled by fitting a male shaft and a female shaft to each other. This type of lower steering shaft member 107 is, however, required to have performance of absorbing displacement in the axial direction that occurs when the car travels, and of preventing the displacement and vibrations from being transferred onto the steering wheel 105. This performance is required for such a configuration that the car body takes a sub-frame structure, wherein the member 100 for fixing an upper part of the steering mechanism is separated from the frame 110 to which the steering rack support member 113 is fixed, and the steering rack support member 113 is fixed by fastening to the frame 110 through the elastic body 111 such as a rubber, etc. Further, another case is that a worker, when fastening the steering shaft joint 108 to the pinion shaft 109, temporarily contracts the telescopic shaft and thereafter secures the joint 108 to the pinion shaft 109 by fastening, and hence there is an instance of requiring an telescopic function. Moreover, the upper steering shaft member 120 provided at the upper part of the steering mechanism is, though configured likewise by fitting the male shaft and the female shaft together, is required to include a function of adjusting, on such an occasion that a driver shifts a position of the steering wheel 105 in the axial direction in order to gain an optimum position for driving the car, this position and is therefore demanded to have the telescopic function in the axial direction. It is required in all the cases described above to reduce backlash noises at fitting portion in the telescopic shaft, to relieve a uncomfortable feeling to the backlash on the steering wheel 105 and to decrease a slide resistance when slid in the axial direction.

First Embodiment

Figure 2:
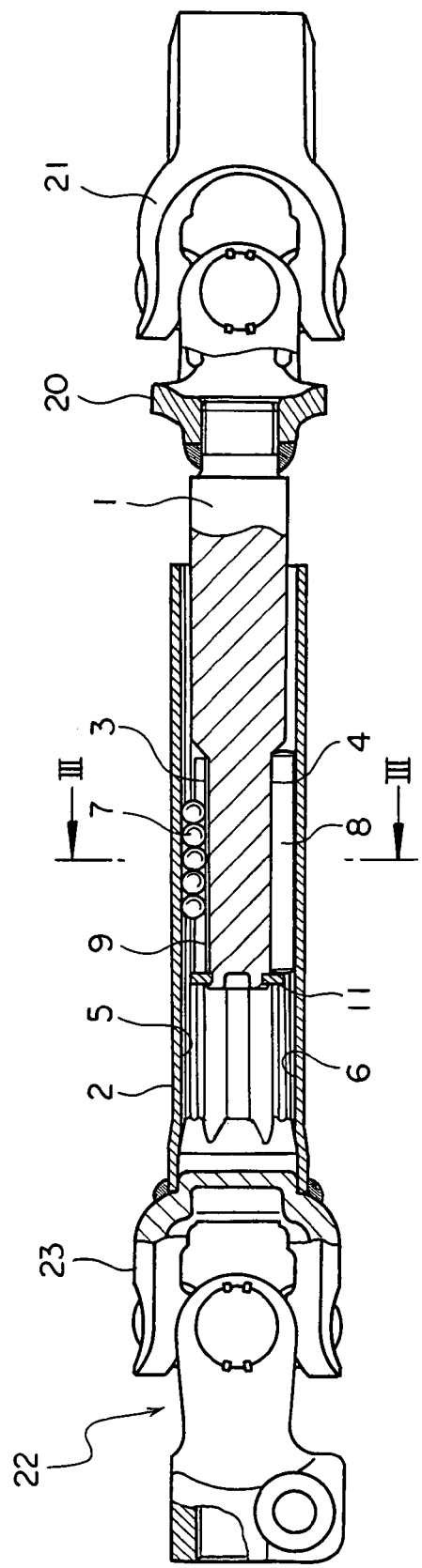
FIG. 2 is a vertical sectional view of the telescopic shaft for the steering of the vehicle with a Cardan shaft joint according to a first embodiment of the present invention.
Figure 3:
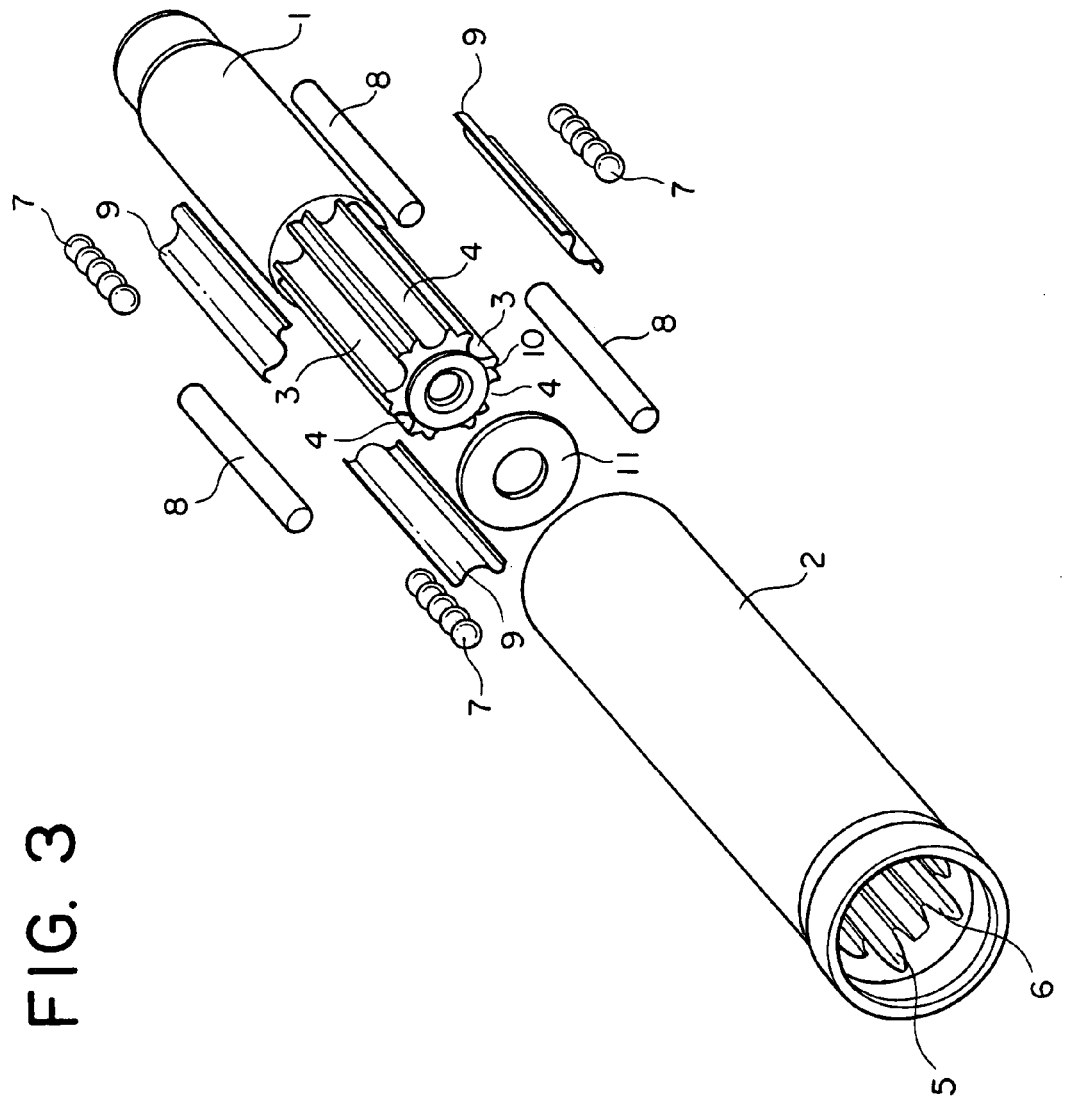
FIG. 3 is an exploded perspective view of the telescopic shaft for the steering of the vehicle shown in FIG. 2.
Figure 4:
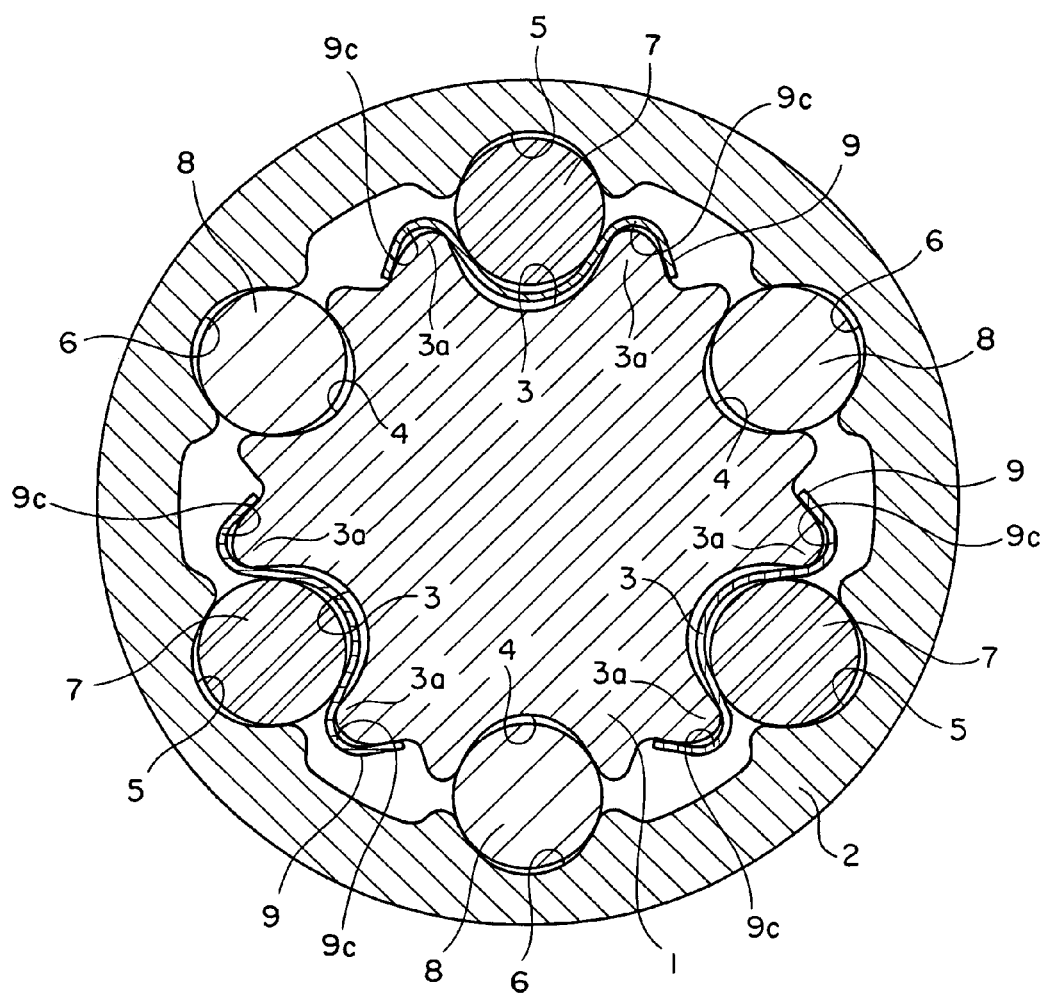
FIG. 4 is a cross-sectional view taken along the line III-III in FIG. 2.
Figure 5:
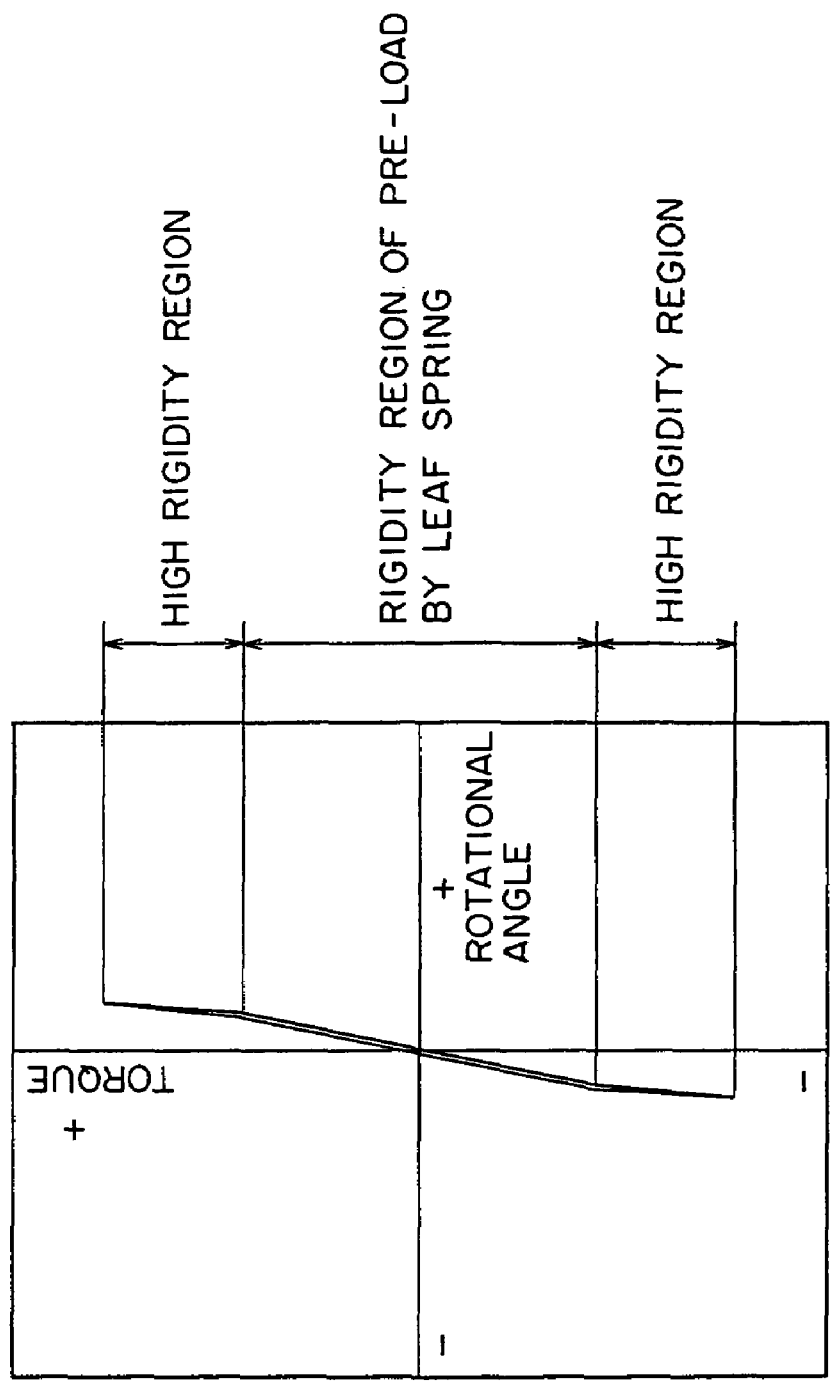
FIG. 5 is a graph (a part 1) showing a relationship between a steering torque and a rotational angle.
Figure 6:
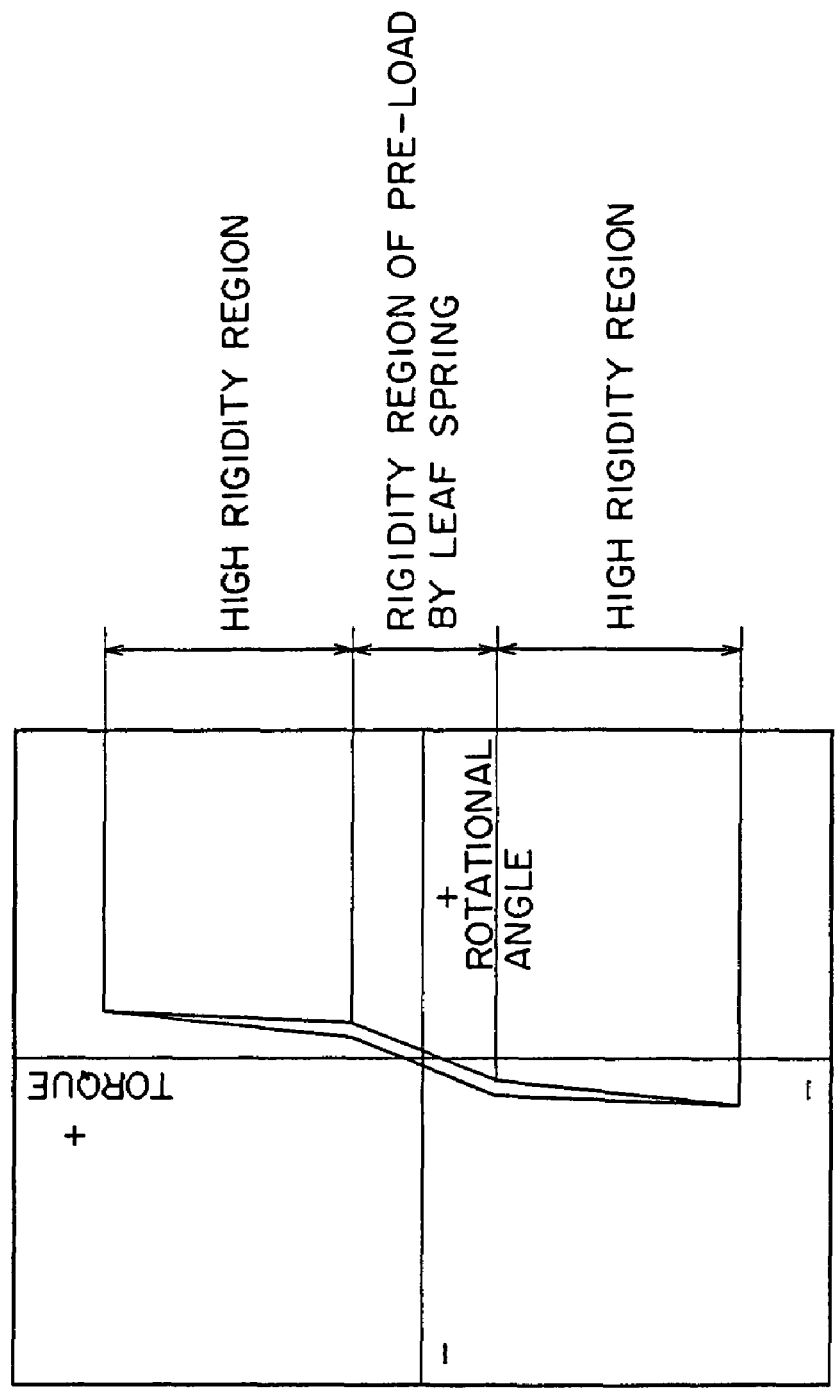
FIG. 6 is a graph (a part 2) showing the relationship between the steering torque and the rotational angle.
Figure 7:
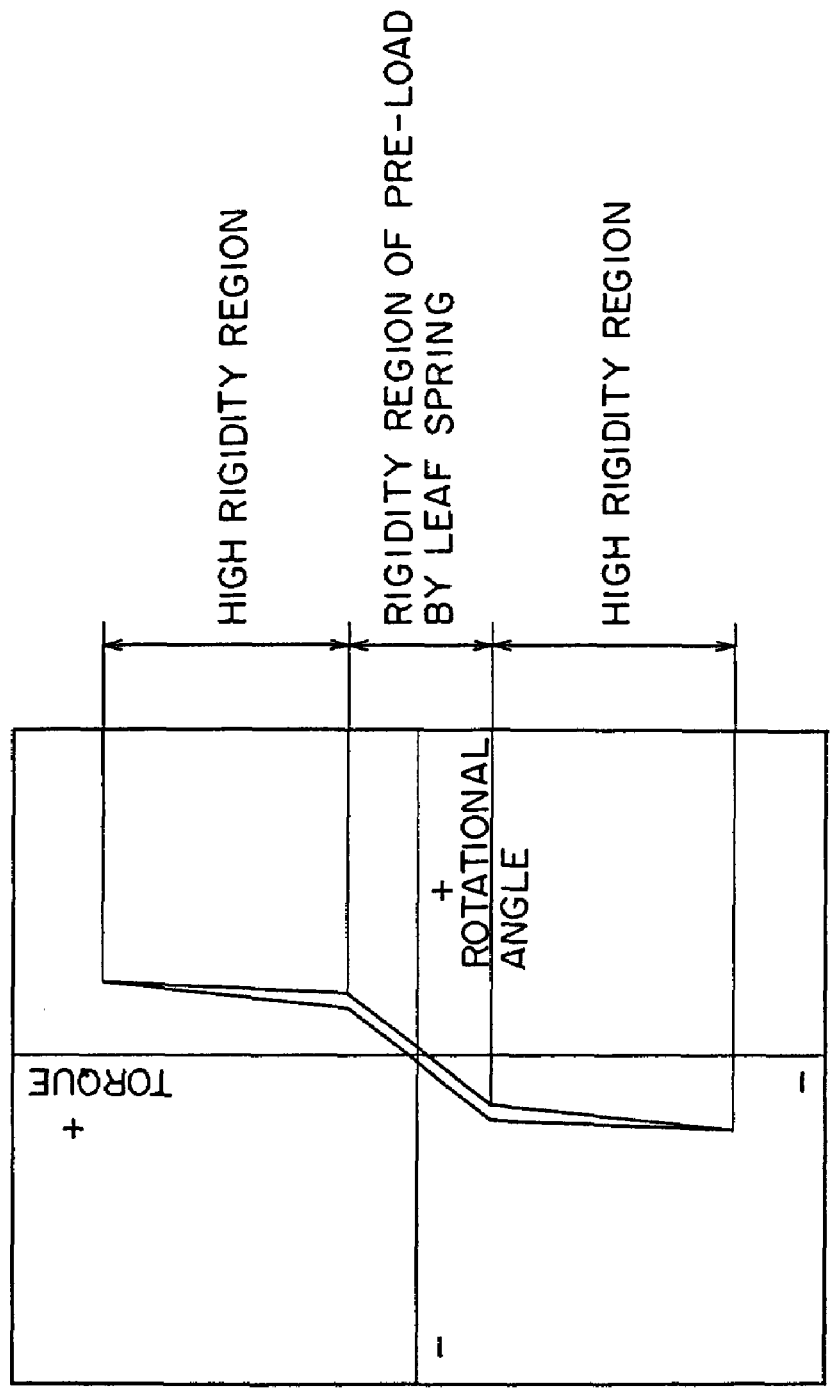
FIG. 7 is a graph (a part 3) showing the relationship between the steering torque and the rotational angle.

FIG. 2 is a vertical sectional view of the telescopic shaft for the steering of the vehicle with a Cardan shaft joint according to a first embodiment of the present invention. FIG. 3 is an exploded perspective view of the telescopic shaft for the steering of the vehicle shown in FIG. 2. FIG. 4 is a cross-sectional view taken along the line III-III in FIG. 2. FIG. 5 is a graph (a part 1) showing a relationship between a steering torque and a rotational angle. FIG. 6 is a graph (a part 2) showing the relationship between the steering torque and the rotational angle. FIG. 7 is a graph (a part 3) showing the relationship between the steering torque and the rotational angle.

As illustrated in FIG. 2, the telescopic shaft for the steering of the vehicle (which will hereinafter be termed an "telescopic shaft") is constructed of a male shaft 1 and a female shaft 2 that are fitted so as not to be rotatable but to be slidable on each other.

The male shaft 1 is connected to a yoke 21 of a Cardan shaft joint 20 on the side of the steering wheel. The female shaft 2 is connected to a yoke 23 of a Cardan shaft joint 22 on the side of a steering gear.

As shown in FIG. 3, three pairs of grooves 3, 4 each taking substantially a circular-arc shape and extending in the axial direction, are formed in an outer peripheral surface of the male shaft 1 in a way that disposes these grooves equally at an interval of 120 degrees in a peripheral direction thereof. Correspondingly in an inner peripheral surface of the female shaft 2, three pairs of grooves 5, 6 each taking substantially the circular-arc shape and extending in the axial direction, are formed in a way that disposes these grooves equally at the interval of 120 degrees in the peripheral direction thereof.

A plurality of balls 7 (spherical rolling members) are disposed set rollable in each pair of the axially-extending groove 3, taking substantially the circular-arc shape, of the male shaft 1 and the axially-extending groove 5, taking substantially the circular-arc shape, of the female shaft 2 through a corrugated leaf spring 9 for pre-load. Note that stopper portions 3a for stopping the leaf spring 9 are formed on both sides of each axially-extending groove 3 of the male shaft 1.

A needle roller 8 (a slide member) is slidably disposed between the axially-extending groove 4, taking substantially the circular-arc shape, of the male shaft 1 and the corresponding line of axially-extending groove 6, taking substantially the circular-arc shape, of the female shaft 2.

Each leaf spring 9 works to give pre-load to the balls 7 and the needle roller 8 against the female shaft 2 to an extent large enough not to cause a backlash when the torque is not transferred, and also works to restrain the balls 7 between the female shaft 2 and the spring plate 9 itself in the peripheral direction as the leaf spring 9 elastically deforms when the torque is transferred.

A periphery-directional groove 10 is formed in a side end portion of the male shaft 1. With this contrivance, a stopper plate 11 is fitted in the periphery-directional groove 10, and the needle roller 8 is fixed in the axial direction in such a form as to be sandwiched in between the side end of the stoppers plate and internal side end surfaces of the axially-extending grooves 3 and 4. The internal side end surfaces of the axially-extending grooves 3, 4 may be inclined or substantially right-angled to the axis.

Further, as illustrated in FIG. 4, each of the leaf springs 9 is latched, at its concave portions 9c formed at both of its side end portions, by the stopped portions 3a provided on both sides of the axially-extending groove 3, thereby making the whole leaf spring 9 unable to move in the peripheral direction when the torque is transferred.

In the thus structured telescopic shaft, when torque is transferred, the balls 7 and the needle rollers 8 are used respectively for "rolling" and "sliding", and each leaf spring 9 gives the pre-load to the balls 7 against the female shaft 2 to the extent large enough not to cause the backlash. It is therefore possible to surely prevent the backlash between the male shaft 1 and the female shaft 2, whereby the male shaft 1 and the female shaft 2 can be slid in the axial direction with a stable slide load but with no backlash.

When the torque is transferred, as shown in FIG. 4, the needle rollers 8 interposed between the male shaft 1 and the female shaft 2 perform a main function of transferring the torque. For instance, when the torque is inputted from the male shaft 1, as the pre-load is applied from the leaf springs 9 at an initial stage, there is no backlash, and the leaf springs 9 generates reactive forces to the torque, thus transferring the torque. At this time, the torque is transferred on the whole in a state of equilibrium between a torque transfer load among the male shaft 1, the leaf springs 9, the balls 7 and the female shaft 2, and a torque transfer load among the male shaft 1, the needle rollers 8 and the female shaft 2.

As the torque further increases, as shown in FIG. 4, a gap in a rotating direction between the male shaft, the needle rollers 8 and the female shaft 2 has been set smaller than a gap between the male shaft 1, the leaf springs 9, the balls 7 and the female shaft 2, and hence the needle rollers 9 receive the reactive force stronger than the balls 7 receive, and mainly transfer the torque to the female shaft 2. It is therefore feasible to surely prevent the backlash in the rotating direction between the male shaft 1 and the female shaft 2 and also to transfer the torque in a high-rigidity state.

Moreover, when the steering torque is equal to or smaller than a predetermined level, each of the pre-load leaf springs 9 performs the pre-load operation to exhibit a low-rigidity characteristic, while the needle rollers 8, when the steering torque is equal to or larger than the predetermined level, respectively engage with the pair of axially-extending grooves 4, 6 in the peripheral direction to exhibit a high-rigidity characteristic.

Namely, when the steering torque is equal to or smaller than the predetermined level, the leaf springs 9 buffer and reduce the uncomfortable noises and vibrations transferred from an engine room by the pre-load action. While on the other hand, when the steering torque rises to become equal to or larger than the predetermined level, the needle rollers 8 respectively engage with the pair of axially-extending grooves 4, 6, whereby the steering torque can be transferred. Therefore, a feeling of sharp steering can be acquired.

Accordingly, the torque transfer/slide mechanism serves also as a buffer mechanism, and hence it is possible to provide the telescopic shaft exhibiting the torsional rigidity characteristics at two stages in a way that effectively makes the use of the space and reduces both of the number of parts and manufacturing costs.

FIG. 5 is the graph (the part 1) showing the relationship between the steering torque and the rotational angle. In this case, since a spring constant of the leaf spring 9 is high, the rigidity in a pre-load rigidity (low rigidity) region is high, and a torsional rigidity that is not so different from a high rigidity region is shown. The characteristic herein is, though much of the buffer function is not acquired, suited to a case where the high rigidity is required also in a low torque region.

FIG. 6 is the graph (the part 2) showing the relationship between the steering torque and the rotational angle. This case represents a state where the spring constant of the leaf spring 9 is set slightly lower than the state in FIG. 5(*the* part 1), and the characteristic herein is required for a case of scheming to establishing compatibility between the buffer characteristic and the torsional rigidity.

FIG. 7 is the graph (the part 3) showing the relationship between the steering torque and the rotational angle. This case represents a state where the spring constant of the leaf spring 9 is set slightly lower than the state in FIG. 6 (the part 2), and the characteristic herein is in such a case that a further buffer characteristic is demanded.

FIGS. 8 through 11 are cross-sectional views similar to FIG. 4, respectively showing first through fourth modified examples of the first embodiment of the present invention. The first through fourth modified examples are different from the first embodiment illustrated in FIGS. 2 through 4 in terms of a structure and a configuration of an elastic member including the leaf spring, and in terms of a sectional shape of the male shaft attached with the elastic member.

Figure 8:
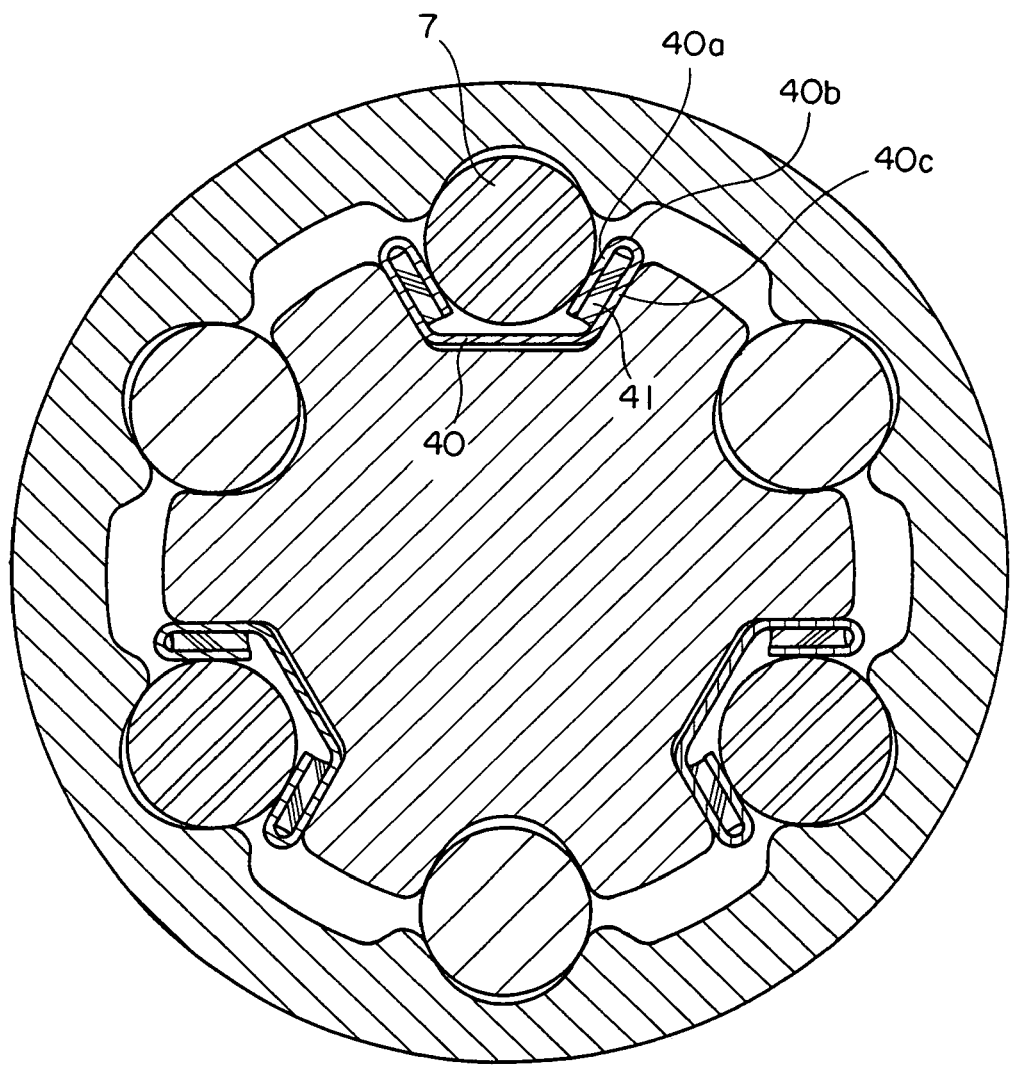
FIG. 8 is a cross-sectional view similar to FIG. 4, showing a first modified example of the first embodiment of the present invention.

FIG. 8 shows the first modified example of the first embodiment, wherein an elastic body corresponding to the leaf spring 9 in FIGS. 2 through 4 is structured as a composite body consisting of a leaf spring member 40 and an elastic member 41 formed of a rubber (or a synthetic resin, etc. which is a different material from the leaf spring member 40. The rubber elastic member 41 is fixed by bonding to the leaf spring member 40, thus attaining an integral structure. The leaf spring member 40 has an addition of the rubber elastic member 41 and therefore improves its buffer performance.

Crooked or bent portions 40c, 40a of the leaf spring member 40 are pushed by balls 7 and thereby exhibit a spring property.

Further, the rubber elastic member 41 is interposed between the crooked portions 40a and 40 of the leaf spring member 40, whereby composite action with the leaf spring member enhances the buffer performance.

Figure 9:
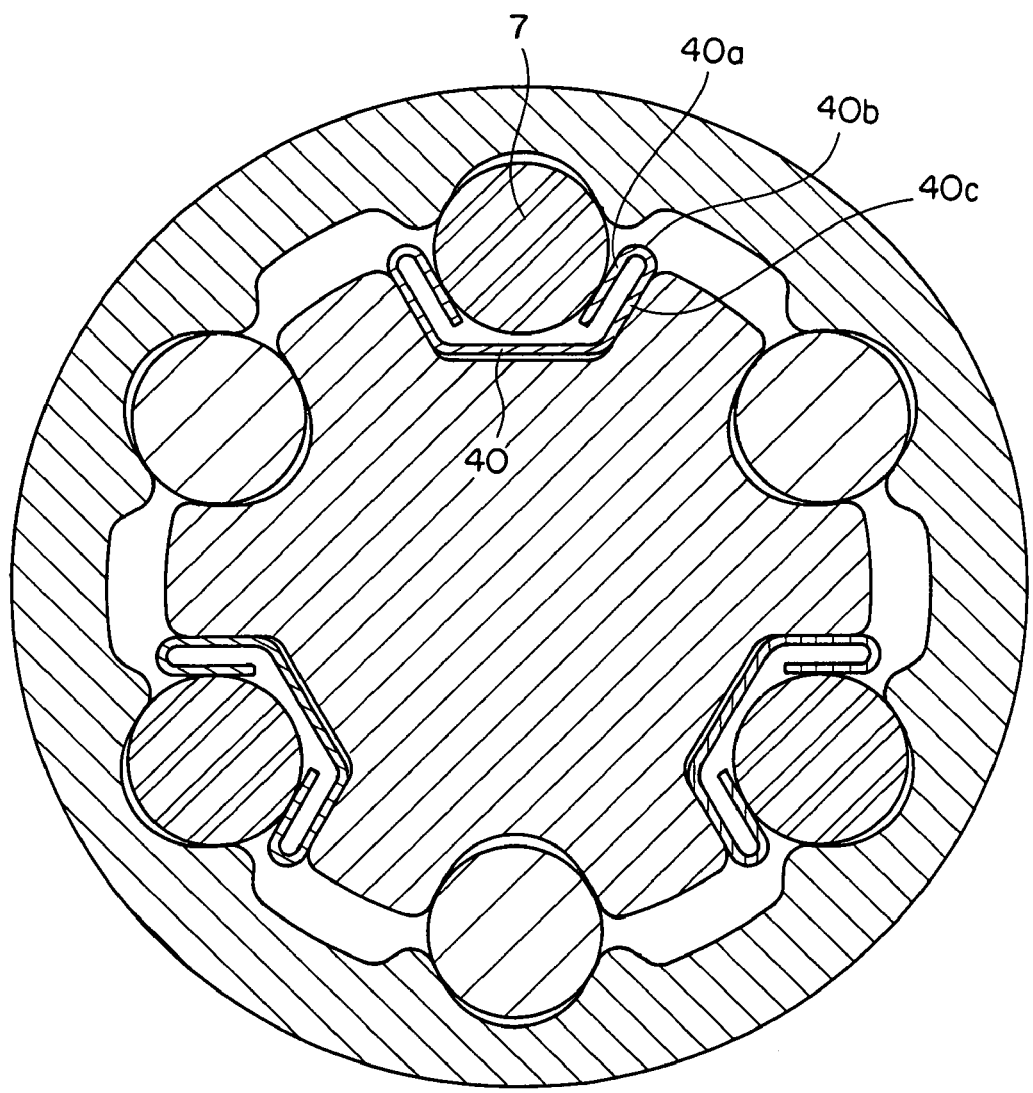
FIG. 9 is a cross-sectional view similar to FIG. 4, showing a second modified example of the first embodiment of the present invention.

FIG. 9 shows the second modified example of the first embodiment, wherein the elastic body corresponding to the leaf spring 9 in FIGS. 2 through 4 takes a structure in which the rubber elastic member is removed from the elastic body shown in FIG. 8. The elastic body, even in the case of being thus formed of a single material without the rubber elastic member 41, has a function as the elastic body.

Leaf spring members 40a apply the pre-load to the ball 7 on one hand and serve as race surfaces for the ball 7 on the other hand.

Figure 10:
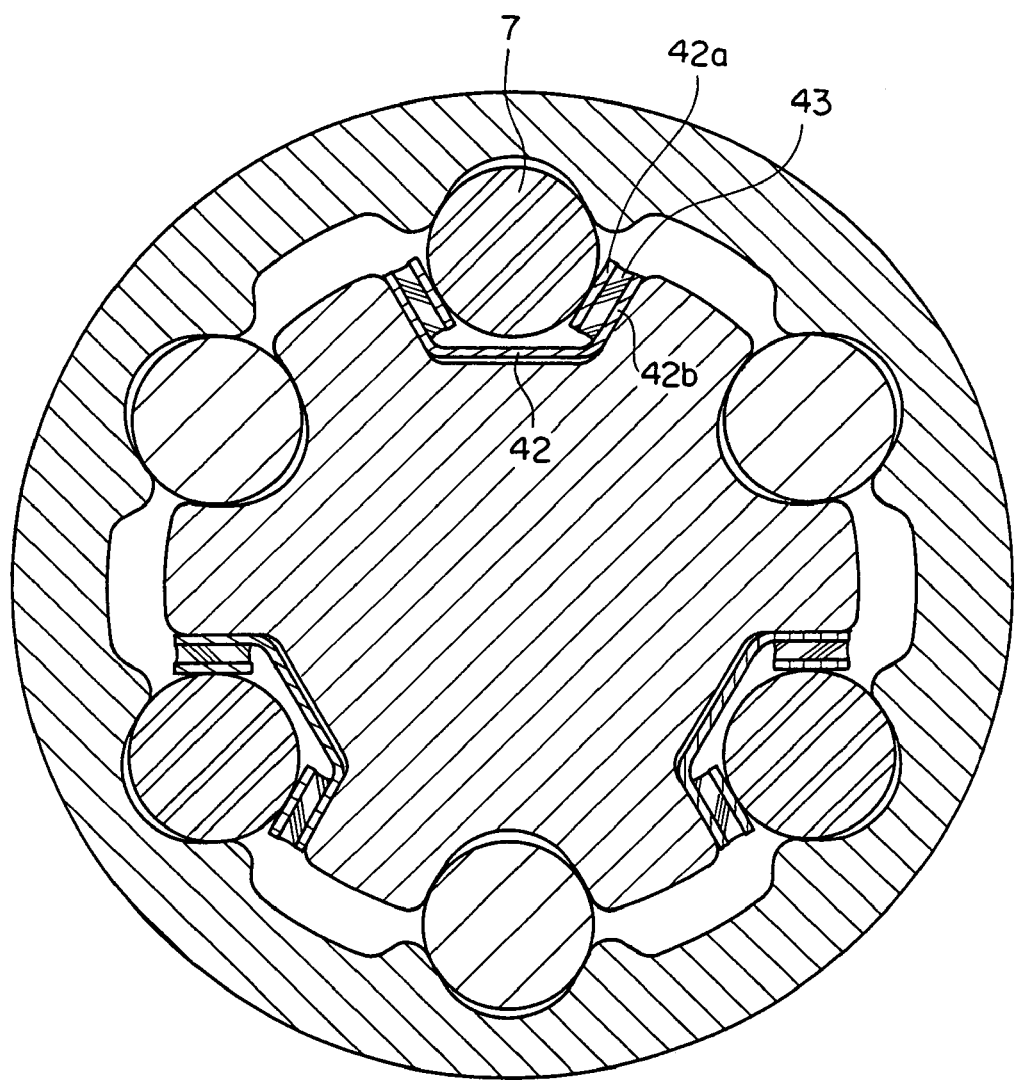
FIG. 10 is a cross-sectional view similar to FIG. 4, showing a third modified example of the first embodiment of the present invention.

FIG. 10 shows the third modified example of the first embodiment, wherein the elastic body corresponding to the leaf spring 9 in FIG. 2 through 4 is a composite body consisting of a leaf spring member 42, rubber elastic members 43 and race surface members 42a for the ball 7. The rubber elastic members 43 are fixed by bonding to the race surface members 42a, thus attaining an integral structure. The leaf spring member 42 has an addition of the rubber elastic members 43 and can therefore improve its buffer performance. Bent portions 42b of the leaf spring member 42 are pushed by the balls 7 through the rubber elastic members 43 and the race surface members 42a, and hence composite action thereof enhances the buffer function. The race surface member 42 is flat in shape.

Figure 11:
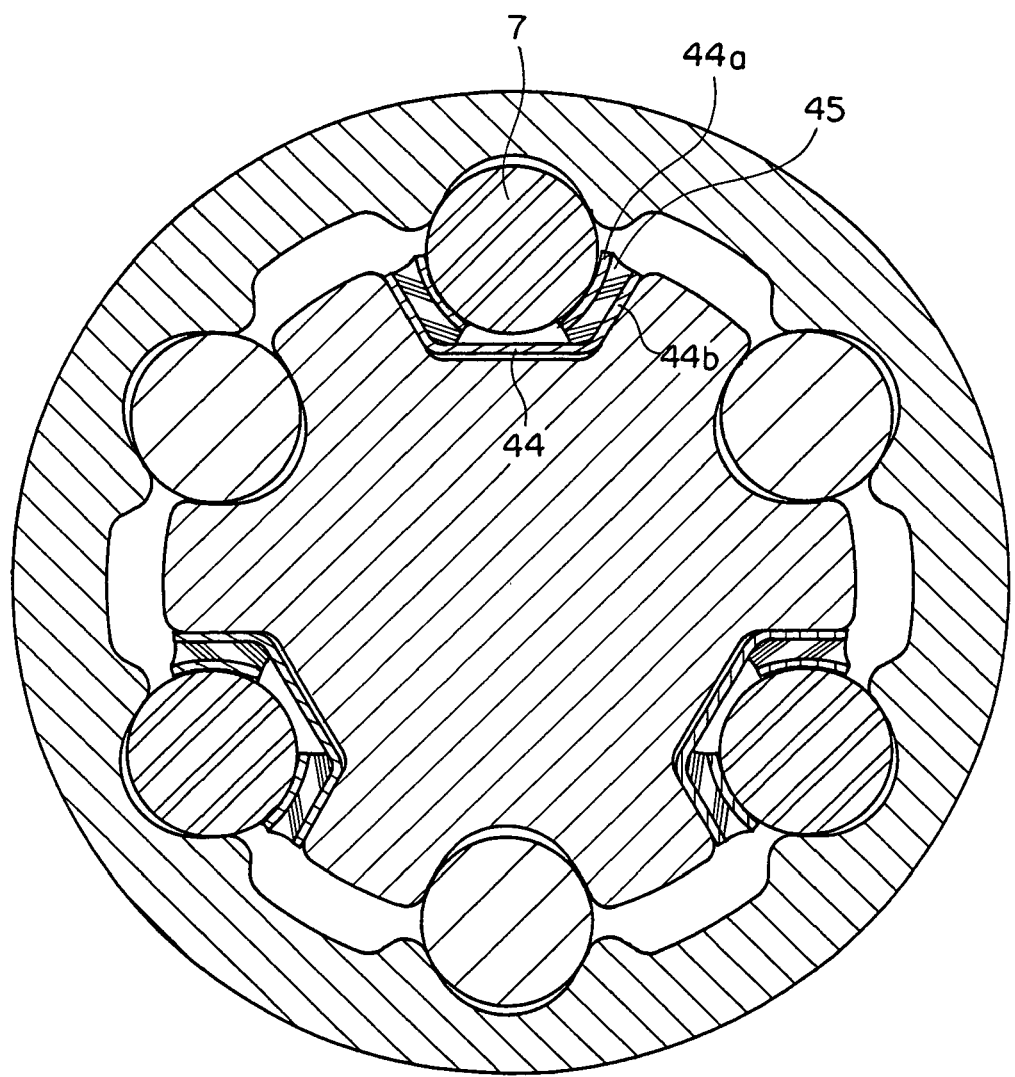
FIG. 11 is a cross-sectional view similar to FIG. 4, showing a fourth modified example of the first embodiment of the present invention.

FIG. 11 shows the fourth modified example of the first embodiment, wherein an elastic body 44 corresponding to the leaf spring 9 in FIGS. 2 through 4 takes a shape similar to that in the third modified example, however, a race surface member 44a in the fourth embodiment is structured to have a radius that is larger by 5%-50% than a radius of the ball 7 and have a larger area in its contact portion than in the second modified example.

With this contrivance, a local surface pressure of the contact portion can be restrained from rising.

The buffer performance is the same as in the second modified example.

Second Embodiment

FIG. 12A is a vertical sectional view of the telescopic shaft for the steering of the vehicle with a Cardan shaft joint according to a second embodiment of the present invention. FIG. 12B is a cross-sectional view taken along the line b-b in FIG. 12A.

Figure 13A:
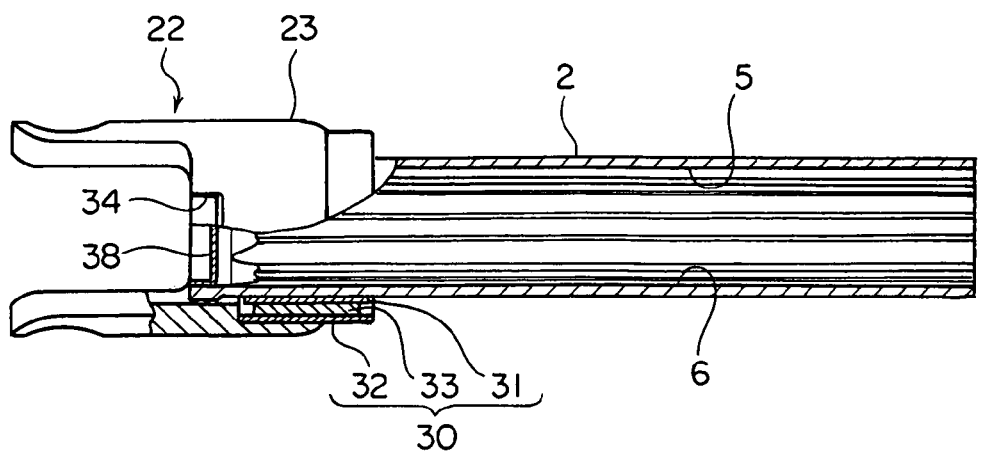
FIG. 13A is a side view including a partial cut-off section of a sub-assembly of the telescopic shaft for the steering of the vehicle with the Cardan shaft joint shown in FIGS. 12A and 12B.
Figure 13B:
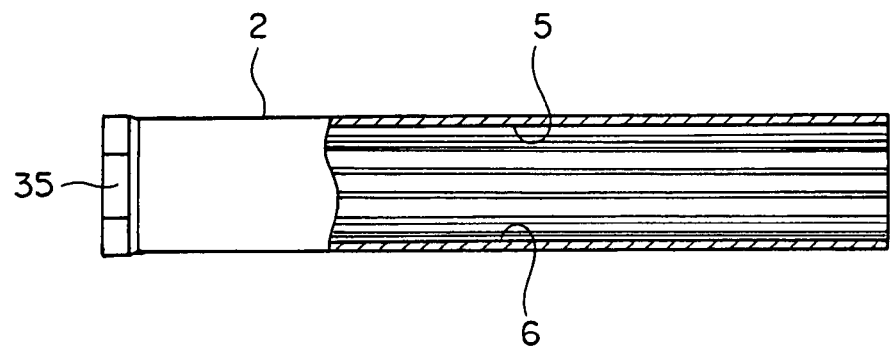
FIG. 13B is a side view including a partial cut-off section of a female shaft.
Figure 13C:
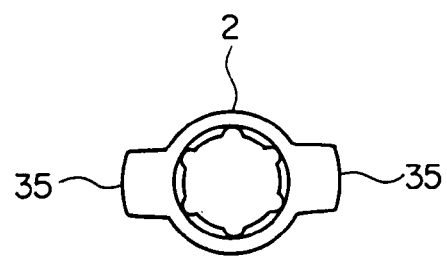
FIG. 13C is a front view of the female shaft as viewed from the left side.

FIG. 13A is a side view including a partial cut-off section of a sub-assembly of the telescopic shaft for the steering of the vehicle with the Cardan shaft joint shown in FIGS. 12A and 12B. FIG. 13B is a side view including a partial cut-off section of a female shaft. FIG. 13C is a front view of the female shaft as viewed from the left side.

Figure 14:
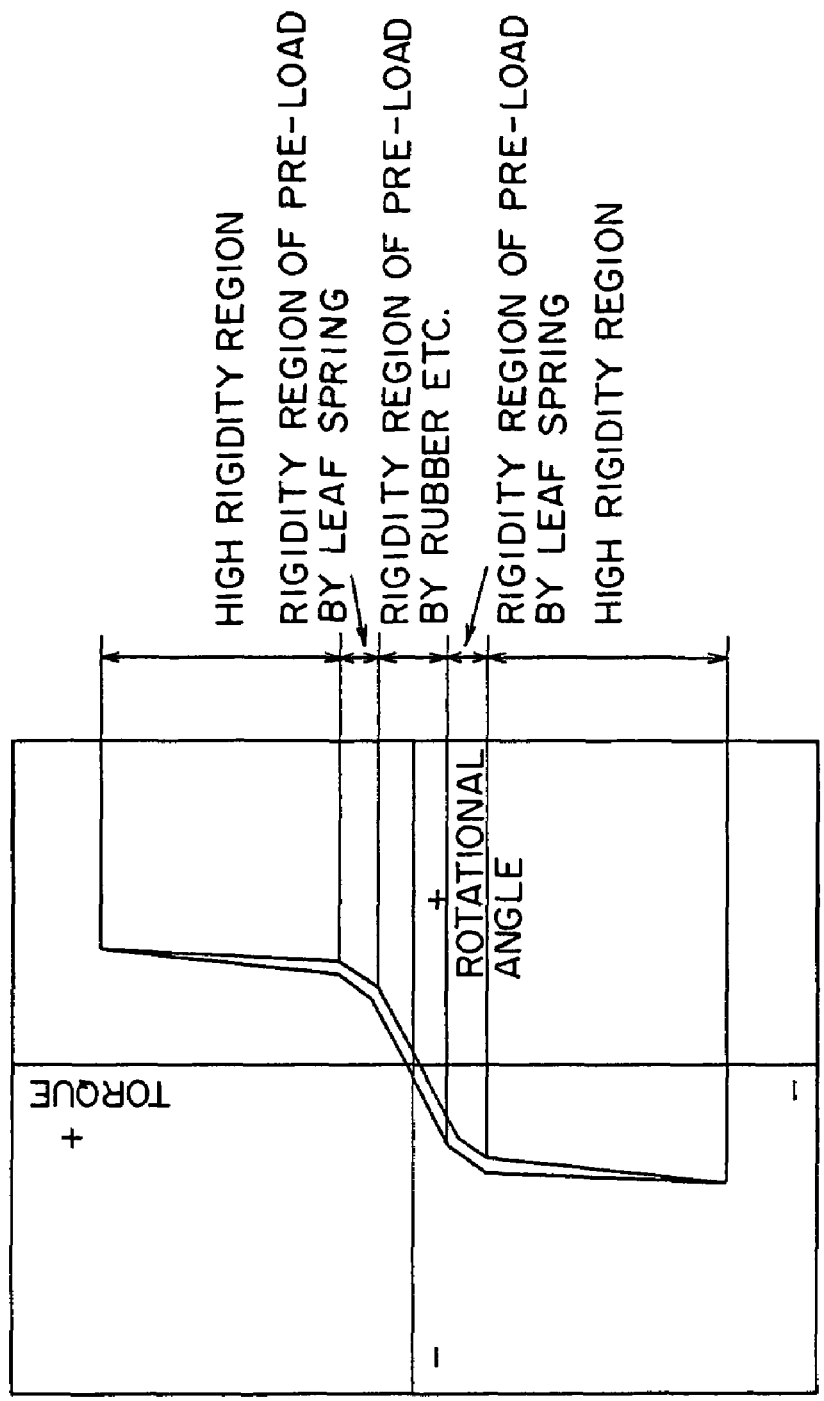
FIG. 14 is a graph showing a relationship between the steering torque and the rotational angle in the second embodiment.

FIG. 14 is a graph showing a relationship between the steering torque and the rotational angle in the second embodiment.

In the second embodiment, a buffer member 30 structured by charging a space between an inner ring 31 and an outer ring 32 with a rubber 33, is provided between an end portion of a female shaft 2 and a yoke 23 of a Cardan shaft joint 22. When the steering torque is equal to or smaller than a predetermined level, the buffer member 30 can buffer and thus reduce the uncomfortable noises and vibrations transferred from the engine room. Note that the buffer member 30 may also be of a rubber coupling type.

Moreover, as shown in FIGS. 12B and 13C, the yoke 23 is formed with cuts 34 (engaged portions), and cam flanges 35 (engaging members) capable of engaging with and disengaging from the cuts 34 are provided at the end portion of the female shaft 2. Incidentally, the numeral 38 represents a cap for preventing dusts from entering.

Owing to this configuration, the cam flanges 35 do not engage with the cuts 34 when the steering torque is equal to or smaller than the predetermined level, but engage with the cuts 34 when the steering torque increases to become equal to or larger than the predetermined level, whereby it is possible to transfer the steering torque and therefore possible to acquire the feeling of sharp steering.

Thus, according to the second embodiment, when the steering torque is equal to or smaller than the predetermined level, the cam flanges 35 do not engage with the cuts 34, and the buffer member 30 exhibits the low rigidity characteristic as it performs the buffer action. When the steering torque is within a predetermined intermediate range, the leaf spring 9 for the pre-load exhibits an intermediate rigidity characteristic as it performs the pre-load action. On the other hand, when the steering torque is equal to or larger than the predetermined level, the cam flanges 35 engage with the cuts 34, and the needle rollers 8 engage with the pair of axially-extending grooves 4, 6 in the peripheral direction and exhibit the high rigidity characteristic.

Namely, when the steering torque is equal to or smaller than the predetermined level, the cam flanges 35 do not engage with the cuts 34, and the buffer member 30 can buffer and thus reduce the uncomfortable noises and vibrations transferred from the engine room. When the steering torque is within the predetermined intermediate range, the leaf spring 9 for the pre-load raises the torsional rigidity stepwise as it performs the pre-load action. On the other hand, when the steering torque rises to become equal to or larger than the predetermined level, the cam flanges 35 engage with the cuts 34, and the needle rollers 8 engage with the pair of axially-extending grooves 4, 6 in the peripheral direction, thus transferring the steering torque. The feeling of sharp steering can be therefore acquired.

Accordingly, if the telescopic shaft serves also as the torque transfer/slide/buffer mechanism, the buffer mechanism is provided separately on the yoke-side, the telescopic shaft having the three-staged torsional rigidity characteristics can be provided.

FIG. 14 is a graph showing a relationship between the steering torque and the rotational angle in the second embodiment. The buffer function is exhibited in a rigidity region of the rubber 33 of the buffer member 30, the torsional rigidity is increased stepwise by the leaf spring 9 in a higher torque region (an intermediate rigidity region), and the torque can be transferred with a high rigidity in a much higher torque region (a high rigidity region).

Thus, the three-staged torsional rigidity characteristics more excellent than the two-staged torsional rigidity characteristics, can be acquired. Hence, the torsional rigidity characteristics can be combined without any restrictions in accordance with characteristics demanded of the vehicle, a space and costs thereof, and both of the improvement of the feeling of the steering and the buffer function can be set as desired.

Figure 15A:
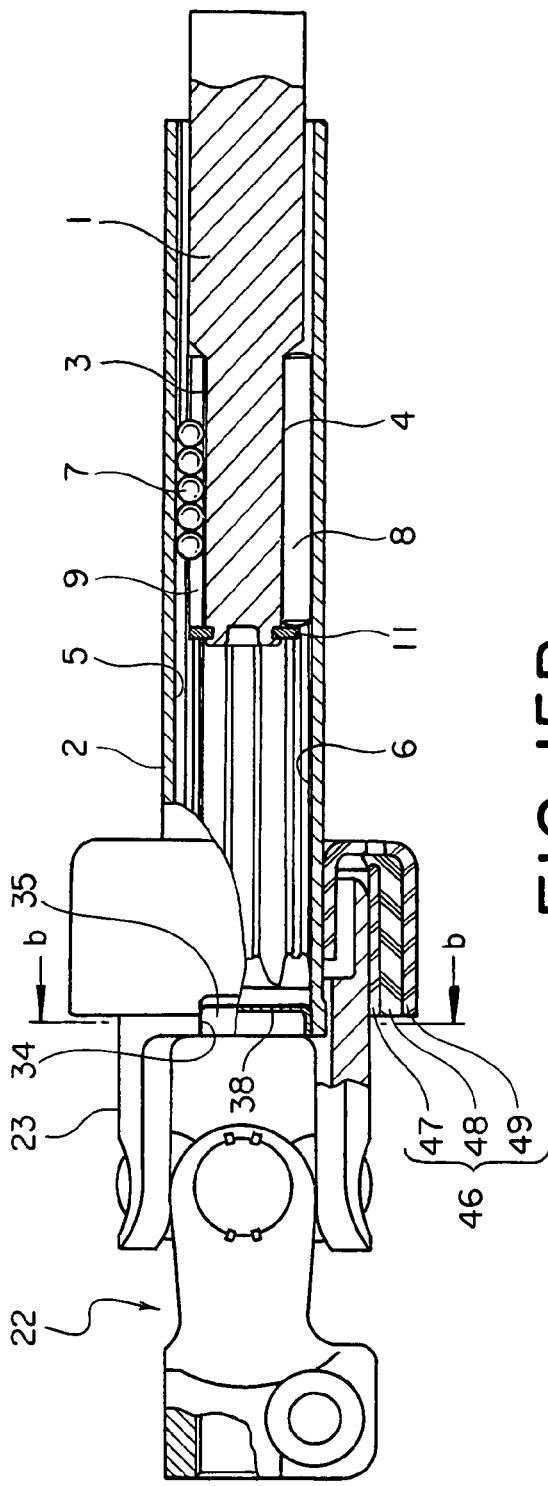
FIG. 15A is a vertical sectional view of the telescopic shaft for the steering of the vehicle with the Cardan shaft joint according to a modified example of the second embodiment of the present invention.
Figure 15B:
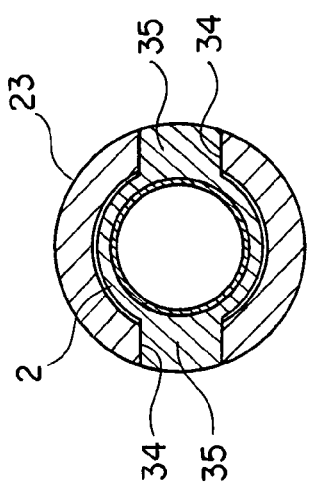
FIG. 15B is a cross-sectional view taken along the line b-b in FIG. 15A.

FIG. 15A is a vertical sectional view of the telescopic shaft for the steering of the vehicle with the Cardan shaft joint according to a modified example of the second embodiment of the present invention. FIG. 15B is a cross-sectional view taken along the line b-b in FIG. 15A.

In this modified example, a buffer member 46 is disposed outwardly of the yoke. The buffer member 46 is constructed of an inner ring 47, an outer ring 49 and a rubber 48 with which a space between these inner and outer rings is charged. An inner peripheral surface of the inner ring 47 is fixedly fitted on an outer peripheral surface of the yoke. The outer ring 49 takes substantially a U-shape in section, and an inner periphery of an inside-diametrical portion thereof is fixedly fitted on the female shaft 2.

According to the present modified example, a size of the rubber serving as the elastic member can be increased, and it is therefore possible to absorb the uncomfortable noises and vibrations transferred from the engine in a much broader frequency band.

Third Embodiment

FIG. 16A is a vertical sectional view of the telescopic shaft for the steering of the vehicle with the Cardan shaft joint according to a third embodiment of the present invention. FIG. 16B is a cross-sectional view taken along the line b-b in FIG. 16A.

Figure 17:
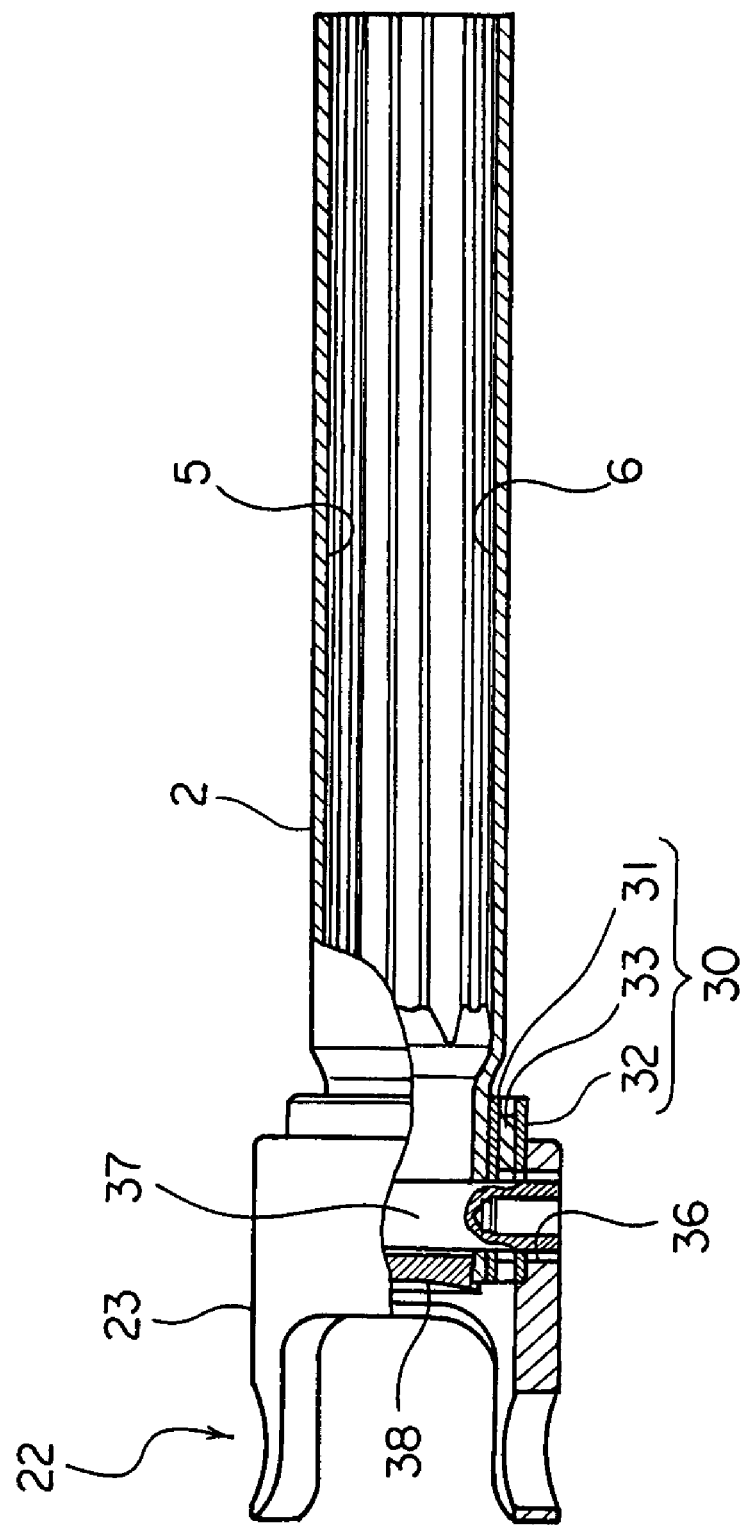
FIG. 17 is a side view including a partial cut-off section of the female shaft of the telescopic shaft for the steering of the vehicle with the Cardan shaft joint shown in FIG. 15A.

FIG. 17 is a side view including a partial cut-off section of the female shaft of the telescopic shaft for the steering of the vehicle with the Cardan shaft joint shown in FIGS. 16A and 16B.

In the third embodiment also, the buffer member 30 structured by charging the space between the inner ring 31 and the outer ring 32 with the rubber 33, is provided between the end portion of the female shaft 2 and the yoke 23 of the Cardan shaft joint 22. When the steering torque is equal to or smaller than the predetermined level, the buffer member 30 can buffer and thus reduce the uncomfortable noises and vibrations transferred from the engine room.

Moreover, as shown in FIGS. 16A and 17, the yoke 23 is formed with an engaged hole 36 (an engaged portion), and a stopper pin (an engaging member) capable of engaging with and disengaging from the engaged hole 36 is provided at the end portion of the female shaft 2. Incidentally, the numeral 38 designates the cap for preventing dusts from entering.

With this configuration, the stopper pin 37 does not engage with the engaged hole 36 when the steering torque is equal to or smaller than the predetermined level, but engages with the engaged portion 36 when the steering torque rises to become equal to or larger than the predetermined level, whereby it is possible to transfer the steering torque and therefore possible to acquire the feeling of sharp steering.

Thus, according to the third embodiment, when the steering torque is equal to or smaller than the predetermined level, the stopper pin 37 does not engage with the engaged hole 36, and the buffer member 30 can buffer and thus reduce the uncomfortable noises and vibrations transferred from the engine room. When the steering torque is within the predetermined intermediate range, the leaf springs 9 for the pre-load raise the torsional rigidity stepwise by the pre-load action. On the other hand, when the steering torque is equal to or larger than the predetermined level, the stopper pin 37 engages with the engaged hole 36, and the needle rollers 8 engage with the pair of axially-extending grooves 4, 6 in the peripheral direction, whereby the feeling of sharp steering can be acquired.

Accordingly, if the telescopic shaft serves as the torque transfer/slide/buffer mechanism, the buffer mechanism is provided separately also on the yoke-side, the telescopic shaft having the three-staged torsional rigidity characteristics can be provided.

For example, in the third embodiment, the male shaft is connected to the yoke of the Cardan shaft joint on the side of the steering wheel, and the female shaft is connected to the yoke of the Cardan shaft joint on the side of the steering gear. Conversely, the female shaft may be connected to the yoke of the Cardan shaft joint on the side of the steering wheel, and the male shaft may be connected to the yoke of the Cardan shaft joint on the side of the steering gear.

As discussed above, according to the embodiment described above, when the torque is not transferred, two types of rolling members and slide members are employed, and the elastic body gives the pre-load to the rolling members against the female shaft to the extent large enough not to cause the backlash, whereby the male shaft and the female shaft can slide in the axial direction with the stable slide load in a way that surely prevents the backlash between the male shaft and the female shaft.

When the torque is transferred, the slide members engage with the pair of axially-extending grooves in the peripheral direction and thus can be restricted, and further the rolling members can be restricted in the peripheral direction by the elastic body. The torque can be therefore transferred in the high-rigidity state by certainly preventing the backlash in the rotating direction between the male shaft and the female shaft.

Further, when the steering toque is equal to or smaller than the predetermined level, the elastic body for the pre-load exhibits the low-rigidity characteristic as the elastic body performs the pre-load action. While on the other hand, when the steering torque is equal to or larger than the predetermined level, the slide members engage with the pair of axially-extending grooves in the peripheral direction and exhibit the high-rigidity characteristic.

Namely, when the steering torque is equal to or smaller than the predetermined level, the elastic body buffers and reduces the uncomfortable noises and vibrations transferred from the engine room by the pre-load action. While on the other hand, when the steering torque rises to become equal to or larger than the predetermined level, the slide members engage with the pair of axially-extending grooves, whereby the steering torque can be transferred. Therefore, the feeling of sharp steering can be acquired.

Accordingly, the torque transfer/slide mechanism serves also as the buffer mechanism, and hence it is possible to provide the telescopic shaft exhibiting the two-staged torsional rigidity characteristics in a way that effectively makes the use of the space and reduces both of the number of parts and manufacturing costs.

Moreover, according to the embodiment discussed above, when the steering torque is equal to or smaller than the predetermined level, the engaging member does not engage with the engaged portion, and the buffer member exhibits the low rigidity characteristic as it performs the buffer action. When the steering torque is within the predetermined intermediate range, the elastic body for the pre-load exhibits the intermediate rigidity characteristic as it performs the pre-load action. On the other hand, when the steering torque is equal to or larger than the predetermined level, the engaging member engages with the engaged portion, and the slide members engage with the pair of axially-extending grooves in the peripheral direction and exhibit the high rigidity characteristic.

Namely, when the steering torque is equal to or smaller than the predetermined level, the engaging member does not engage with the engaged portion, and the buffer member can buffer and thus reduce the uncomfortable noises and vibrations transferred from the engine room. When the steering torque is within the predetermined intermediate range, the elastic body for the pre-load raises the torsional rigidity stepwise as it performs the pre-load action. On the other hand, when the steering torque rises to become equal to or larger than the predetermined level, the engaging member engages with the engaged portion, and the slide members engage with the pair of axially-extending grooves in the peripheral direction, thus transferring the steering torque. The feeling of sharp steering can be therefore acquired.

Fourth Embodiment

Figure 19:
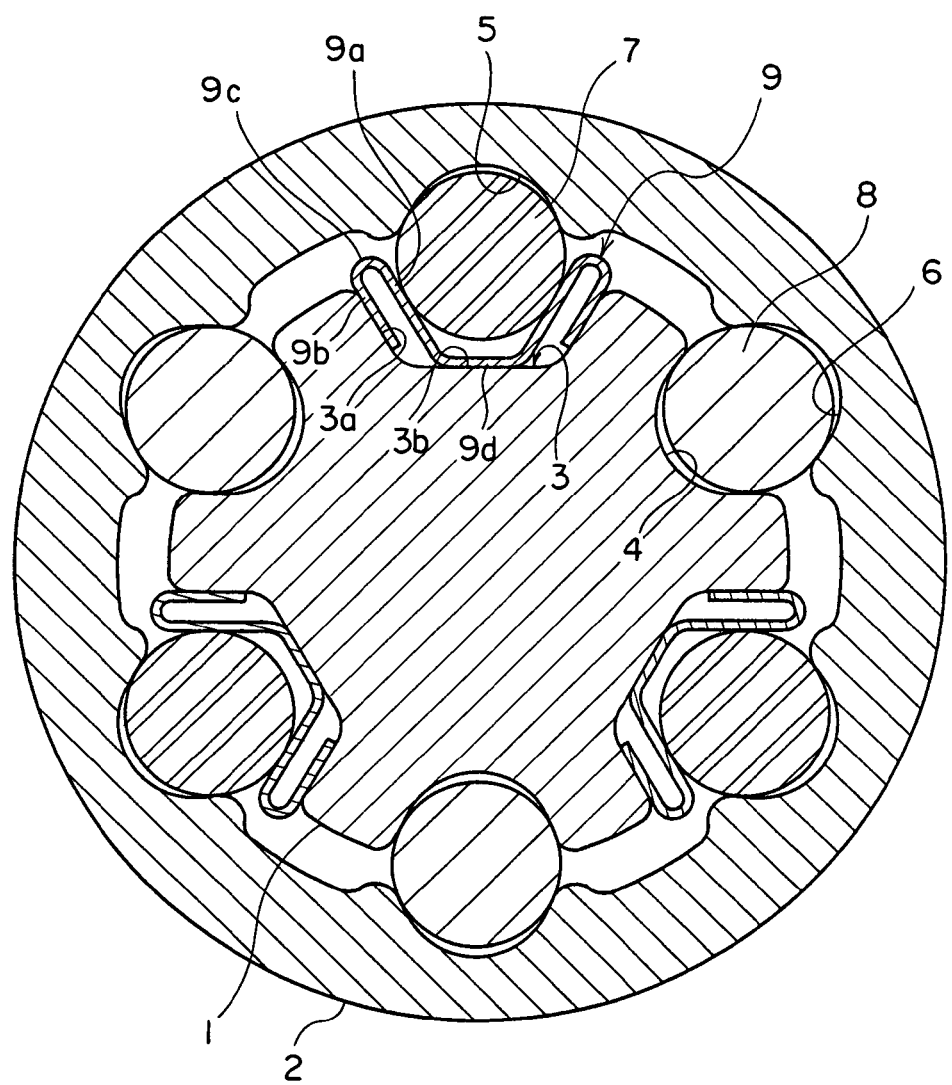
FIG. 19 is a cross-sectional view taken along the line X-X in FIG. 18A.

FIG. 18A is a vertical sectional view of the telescopic shaft for the steering of the vehicle according to a fourth embodiment of the present invention. FIG. 18B is a perspective view of a leaf spring as an elastic body. FIG. 19 is a cross-sectional view taken along the line X-X in FIG. 18A.

As illustrated in FIG. 18A, the telescopic shaft for the steering of the vehicle (which will hereinafter be termed the "telescopic shaft") is constructed of the male shaft 1 and the female shaft 2 that are fitted so as not to be rotatable but to be slidable on each other.

As shown in FIG. 19, three lines of grooves 3 extending in the axial direction, are formed in an outer peripheral surface of the male shaft 1 in a way that disposes these grooves equally at an interval (phase) of 120 degrees in a peripheral direction thereof. Correspondingly in an inner peripheral surface of the female shaft 2, three lines of grooves 5 extending in the axial direction, are formed in a way that disposes these grooves equally at the interval (phase) of 120 degrees in the peripheral direction thereof.

A plurality of rigid spherical members 7 (rolling members, balls) rolling when the two shafts 1, 2 make relative movements in the axial direction, are so interposed as to be rollable between the axially-extending groove 3 of the male shaft 1 and the axially-extending groove 5 of the female shaft 2. Note that the axially-extending grooves 5 of the female shaft 2 each takes substantially a circular-arc shape or a Gothic-arch shape in section.

The axially-extending groove 3 of the male shaft 1 is configured of a pair of slant flat side surfaces 3a and a bottom surface 3b formed flat between the pair of flat side surfaces 3a.

The leaf spring 9 making contact with the spherical member 7 and thus giving pre-load thereto, is interposed between the axially-extending groove of the male shaft 1 and the spherical member 7.

The leaf spring 9 includes a spherical member sided contact portion 9a making contact at two points with the spherical member 7, a groove surface sided contact portion 9b spaced at a predetermined interval substantially in the peripheral direction away from the spherical member sided contact portion 9a and being in contact with the flat side surface 3a of the axially-extending groove 3 of the male shaft 1, a biasing portion 9c elastically biasing the spherical member sided contact portion 9a and the groove surface sided contact portion 9b in such a direction as to get separated from each other, and a bottom portion 9d facing to the bottom surface 3b of the axially-extending groove 3.

The biasing portion 9c is crooked a bent substantially in a U-shape and substantially in a circular-arc shape. The crooked biasing portion 9c is capable of elastically biasing the spherical member sided contact portion 9a and the groove surface sided contact portion 9b so as to get separated from each other.

As shown in FIG. 19, three lines of grooves 4 extending in the axial direction, are formed in the outer peripheral surface of the male shaft 1 in a way that disposes these grooves equally at the interval (phase) of 120 degrees in the peripheral direction thereof. Correspondingly in the inner peripheral surface of the female shaft 2, three lines of grooves 6 extending in the axial direction, are formed in a way that disposes these grooves equally at the interval (phase) of 120 degrees in the peripheral direction thereof.

A plurality of rigid cylindrical members 8 (slide members, needle rollers) sliding when the two shafts 1, 2 make the relative movements in the axial direction, are interposed with a minute gap between the axially-extending groove 4 of the male shaft 1 and the axially-extending groove 6 of the female shaft 2. Note that the axially-extending grooves 4, 6 are formed substantially in the circular-arc shape or the Gothic-arch shape in section.

Further, as illustrated in FIG. 18A, a stopper plate 10 with an elastic body is provided at the end portion of the male shaft 1, and serves to prevent the spherical members 7, the cylindrical members 8 and the leaf springs 9 from coming off.

Moreover, a lubricating agent is applied to between the axially-extending groove 3 of the male shaft 1, the axially-extending groove 5 of the female shaft 2, the leaf spring 9 and the spherical member 7, thereby enabling the male shaft and the female shaft to slide in the axial direction with the stable slide load without any backlash when the torque is not transferred (during the slide).

In the thus constructed telescopic shaft, the spherical members 7 are interposed between the male shaft 1 and the female shaft 2, and the leaf springs 9 give the pre-load to the spherical members 7 against the female shaft 2 to the extent large enough not to cause the backlash. When the torque is not transferred, it is therefore possible to surely prevent the backlash between the male shaft 1 and the female shaft 2, and the male shaft 1 and the female shaft 2, when making the relative movements in the axial direction, can slide with the stable slide load without any backlash.

When torque is transferred, the leaf springs 9 elastically deform to restrict the spherical members 7 in the peripheral direction, and the three lines of cylindrical members 8 interposed between the male shaft 1 and the female shaft 2 perform the main function of transferring the torque.

For example, when the torque is inputted from the male shaft 1, as the pre-load is applied from the leaf springs 9 at the initial stage, there is no backlash, and the leaf springs 9 generate reactive force to the torque, thus transferring the torque. At this time, the torque is transferred on the whole in a state of equilibrium between an input torque and a transfer torque among the male shaft 1, the leaf springs 9, the spherical members 7 and the female shaft 2.

As the torque further increases, there disappears a gap in the rotating direction between the male shaft 1 and the female shaft 2 through the cylindrical member 8, and an increment of the torque hereafter is transferred by the cylindrical members 8 through the male shaft 1 and the female shaft 2. Hence, it is possible to surely prevent the backlash in the rotating direction between the male shaft 1 and the female shaft 2 and also to transfer the torque in the high-rigidity state.

From what has been discussed so far, according to the fourth embodiment, the cylindrical members 8 in addition to the spherical members 7 are provided, and hence a large proportion of the load quantity can be sustained by the cylindrical members 8 when the large torque is inputted. Accordingly, the durability can be improved by restraining a rise in contact pressure between the axially-extending groove 5 of the female shaft 2 and the spherical members 7, and the torque can be transferred in the high-rigidity state when the large torque load is applied.

Furthermore, the cylindrical members 8 are in contact with the male shaft 1 and the female shaft 2, so that the torsional torque to the spherical members 7 is reduced, and a lateral slip of the leaf spring 9 is retrained, with the result that hysteresis can be restrained from becoming excessive.

Thus, according to the fourth embodiment, the stable slide load is actualized, the backlash in the rotating direction is certainly prevented, whereby the torque can be transferred in the high-rigidity state.

Note that the spherical member 7, it is preferable, be a rigid ball. Further, it is preferable that the rigid cylindrical member 8 be a needle roller.

The cylindrical member (which will hereinafter be referred to as the needle roller) 8 receives the load in the line-to-line contact and therefore exhibits a variety of effects such as being capable of restraining the contact pressure lower than by the ball receiving the load in the point-to-point contact, and so on. Accordingly, the needle roller 8 is more excellent in terms of the following items than in the case of adopting the all-line ball rolling structure.

- An attenuation effect at the slide portion is larger than by the ball rolling structure. Hence, the vibration absorbing performance is high.
- The needle rollers make contact at their extremely small areas with the male shaft and the female shaft, so that a slide load fluctuation width can be restrained low. The vibrations caused by the fluctuation thereof are not transferred up to the steering.
- If the same torque is transferred, the needle roller can restrain the contact pressure low, and hence it is feasible to decrease the length in the axial direction and to utilize the space effectively.

If the same torque is transferred, the needle roller can restrain the contact pressure low, and consequently there is no necessity for an additional process for hardening the surface of the axially-extending groove of the female shaft by a thermal treatment, etc.

The number of parts can be decreased.

Assembly characteristics can be improved.

A cost for the assembly can be restrained.

Thus, the needle roller performs the key function of transferring the torque between the male shaft 1 and the female shaft 2, and slidably contacts with the inner peripheral surface of the female shaft 2. The use of the needle roller has the following superior points to the conventional spline fitting.

The needle rollers are mass-produced and are therefore extremely low in their costs.

The needle roller, which is polished after the thermal treatment, is therefore high of its surface hardness and excellent of its abrasion resistance.

The needle roller is polished to gain fine surface roughness thereof with the result that a frictional coefficient is low when slid, and is therefore capable of restraining the slide load low.

Lengths and layout of the needle rollers can be changed according to the conditions for use, and hence the needle rollers can correspond to a variety of applications without changing the concept of design.

There might be a case where the frictional coefficient at the sliding time must be further decreased depending on the conditions for use, at which time the slide characteristic thereof can be altered simply by effecting a surface treatment on only the needle roller. The needle roller can therefore correspond to the variety of applications without changing the concept of design.

As the needle rollers with their outside diameters differentiated on the order of every several microns can be manufactured, gaps between the male shaft, the needle roller and the female shaft can be minimized. Hence, an improvement in the rigidity of the shaft in the torsional direction can be facilitated.

Next, an examination will be made by comparing German Patent DE3730393C2 with the present fourth embodiment.

Figure 20:
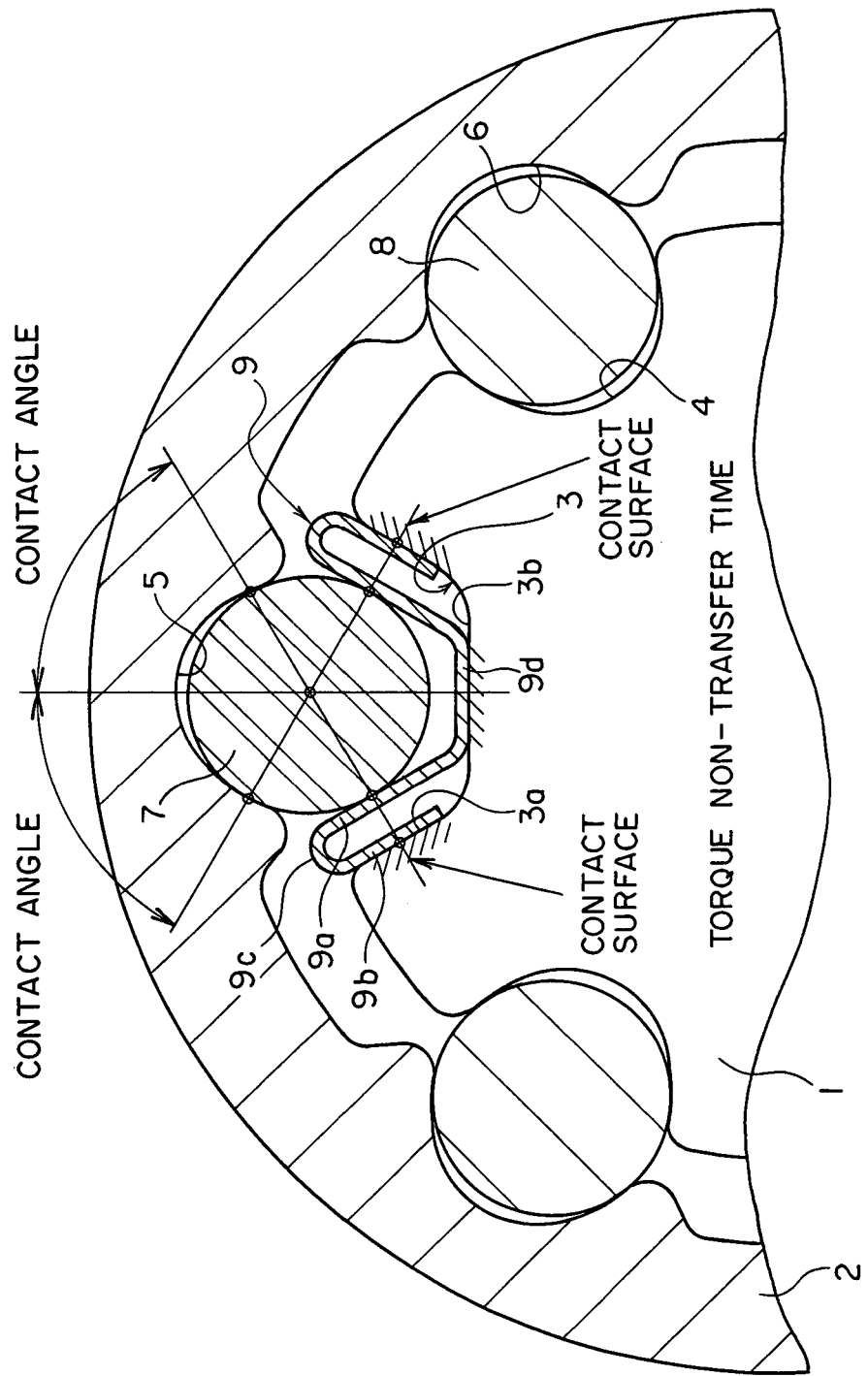
FIG. 20 is an enlarged partial sectional view of the telescopic shaft for the steering of the vehicle in the fourth embodiment of the present invention, showing a state when the torque is not transferred.

FIG. 20 is an enlarged partial sectional view of the telescopic shaft for the steering of the vehicle in the fourth embodiment of the present invention, showing a state when the torque is not transferred.

Figure 21:
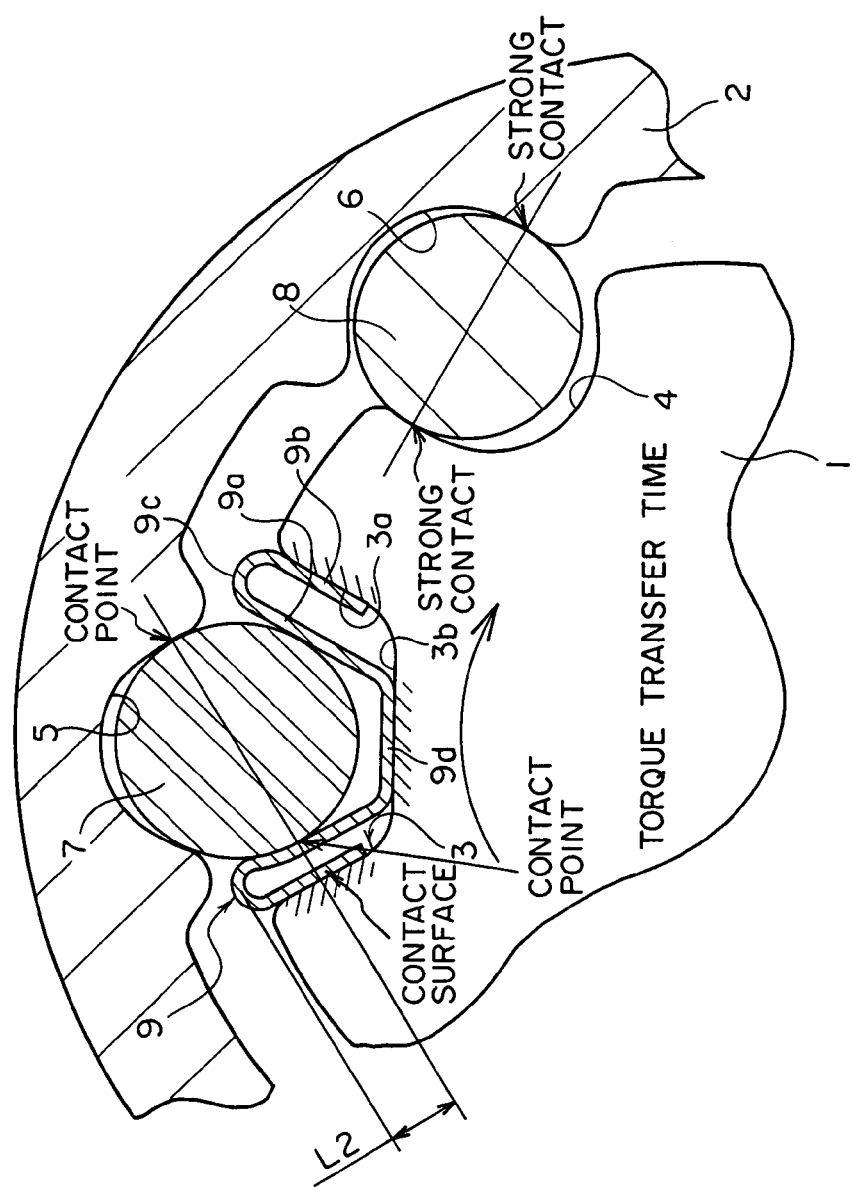
FIG. 21 is an enlarged partial sectional view of the telescopic shaft for the steering of the vehicle in the fourth embodiment of the present invention, showing a state when the torque is transferred.

FIG. 21 is an enlarged partial sectional view of the telescopic shaft for the steering of the vehicle in the fourth embodiment of the present invention, showing a state when the torque is transferred.

Figure 37:
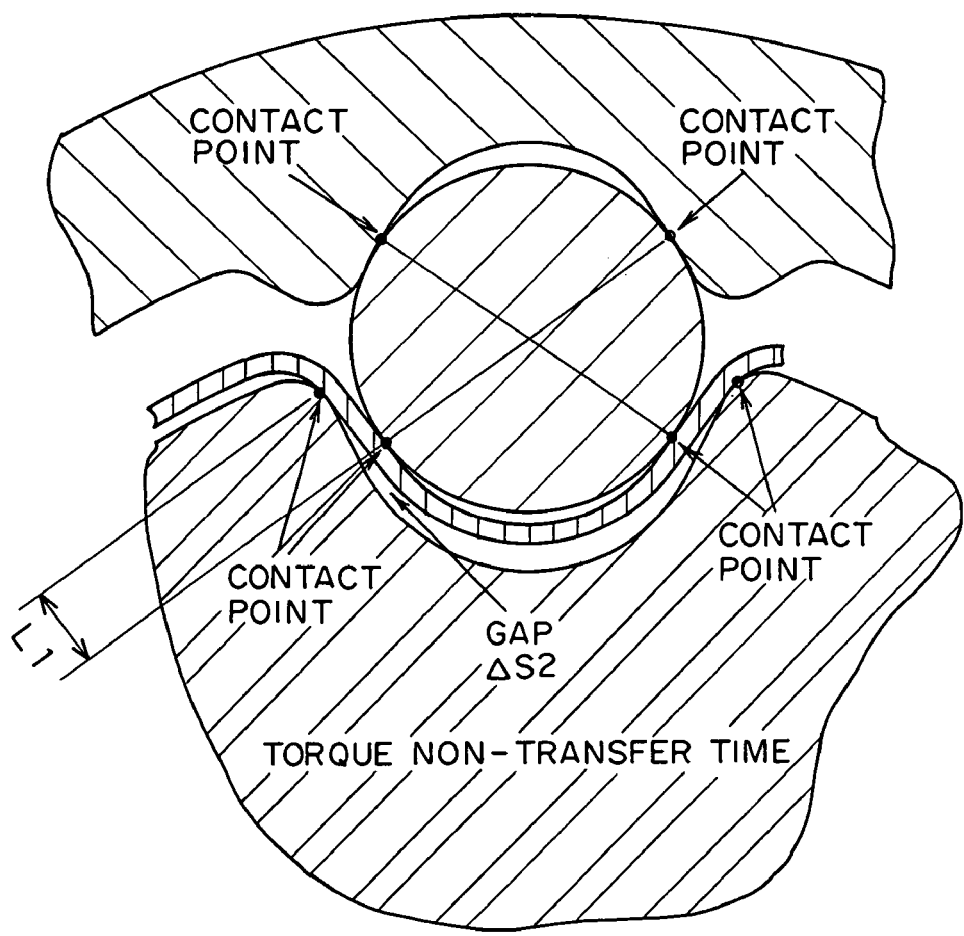
FIG. 37 is an enlarged partial sectional view of a telescopic shaft for steering of a vehicle in German Patent DE3730393C2, showing a state when the torque is not transferred.

FIG. 37 is an enlarged partial sectional view of a telescopic shaft for steering of a vehicle in German Patent DE3730393C2, showing a state when the torque is not transferred.

Figure 38:
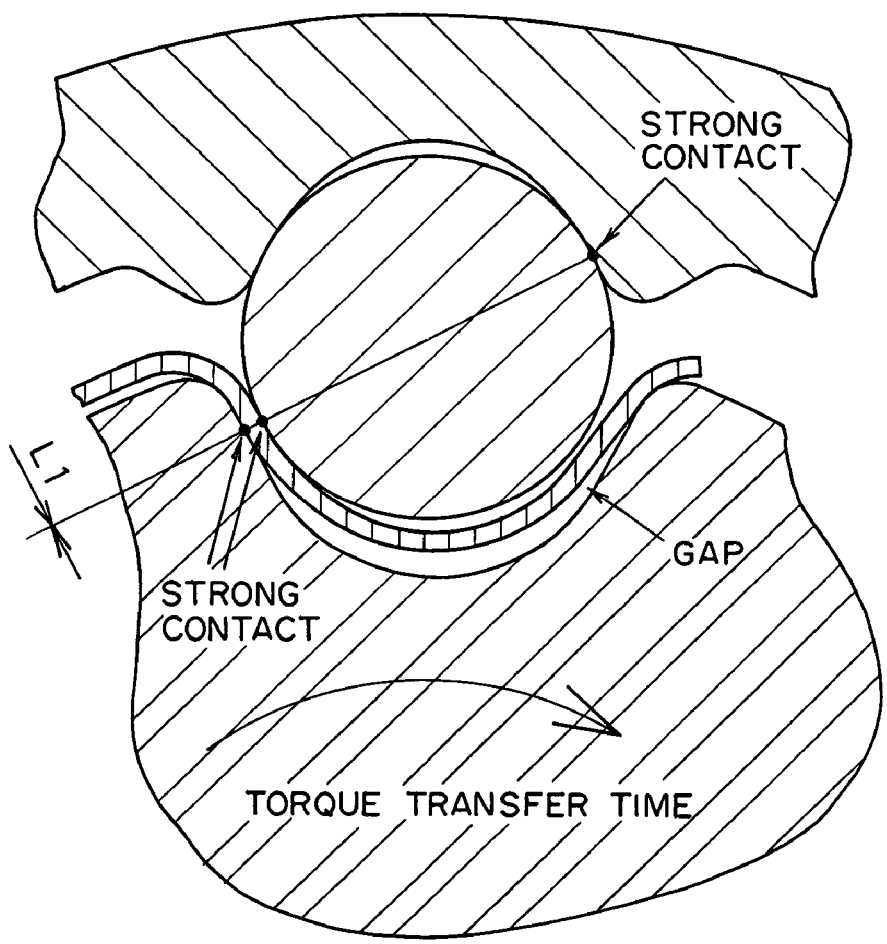
FIG. 38 is an enlarged partial sectional view of the telescopic shaft for the steering of the vehicle in German Patent DE3730393C2, showing a state when the torque is transferred.

FIG. 38 is an enlarged partial sectional view of the telescopic shaft for the steering of the vehicle in German Patent DE3730393C2, showing a state when the torque is transferred.

In German Patent DE3730393C2 shown in FIG. 37, when the torque is not transferred (including a state where the torque is well balanced on the left and right sides), for generating the pre-load between the male shaft, the ball and the female shaft, the leaf spring is interposed in a way that changes its curvature and a curvature of the axially-extending groove. In this state, however, a contact-point-to-contact-point distance (L1) between a contact point between the male shaft and the leaf spring and a contact point between the ball and the leaf spring, is extremely small. Besides, a gap (ΔS2: a quantity of flexure) is small, so that an excessive load occurs at the contact point between the leaf spring and the ball, and a high stress occurs on the leaf spring.

In German Patent DE3730393C2 shown in FIG. 38, when the torque load is applied, the contact-point-to-contact-point distance (L1) decreases stepwise due to the flexure of the leaf spring. The distance L1 gets approximate to zero as the torque increases, the load applied on the contact point rises in proportion to the torque, and the stress generated on the leaf spring further increases. As this state repeatedly occurs, there might be a possibility in which a life-time of the torque transfer unit can not be sustained long.

By contrast, according to the present fourth embodiment shown in FIGS. 20 and 21, the leaf spring 9 can be sufficiently flexural at its spherical member sided contact portion 9a through the biasing portion 9c, and a sufficient quantity of flexure can be thus ensured.

Further, because of including the cylindrical members 8 in addition to the spherical members 7, when the torque is transferred, the cylindrical members 8 make contact with the axially-extending grooves 4, 6 of the male shaft 1 and of the female shaft 2 earlier than the excessive load (stress) is applied on the leaf springs 9, and are capable of mainly transferring the torque, and consequently the excessive load (stress) is applied on neither the spherical members 7 nor the leaf springs 9.

Thus, the leaf spring 9 can ensure the sufficient quantity of flexure, and the excessive load (stress) is applied on neither the spherical members 7 nor the leaf spring 9. Therefore, when the torque is transferred, the stress generated at the contact portion between the spherical member 7 and the leaf spring 9 can be relieved, whereby none of the high stress occurs and the pre-load performance can be maintained over a long period of time by preventing a "fatigue" due to the permanent deformation.

Incidentally, in FIG. 20, when the torque is not transferred, the minute gaps exist between the cylindrical member 8 and the axially-extending groove 4 of the male shaft 1 and between the cylindrical member 8 and the axially-extending groove 6 of the female shaft 2, however, the cylindrical members 8 abut onto the grooves.

In German Patent DE3730393C2 shown in FIGS. 37 and 38, a sectional configuration of the axially-extending groove of the male shaft, in which the leaf spring is disposed, is a circular-arc shape having a curvature, and the leaf spring also assumes a circular-arc shape having a curvature, wherein the leaf spring is given spring characteristic by changing the respective curvatures. Hence, the contact points between the leaf spring and the male shaft are, as shown in FIG. 37, corners of the male shaft. Accordingly, as illustrated in FIG. 38, when the torque load is applied, the whole of the leaf spring slides sideways, thereby inducing a decrease in the transfer torque and causing the excessive hysteresis.

In contrast, in the present fourth embodiment illustrated in FIGS. 20 and 21, the axially-extending groove 3 of the male shaft 1 is configured of the flat surfaces. A central line of the axially-extending groove 3 is directed to a central point of the male shaft 1, wherein the groove 3 takes a wedge-like shape showing a symmetry between the right and left halves with respect to the center of the axially-extending groove 3. An angle (contact angle) of the wedge is preferably 40 through 70 degrees to the center of the axially-extending groove 3. With this contrivance, the leaf spring 9 is firmly fixed to the wedge surfaces of the axially-extending groove 3, and hence, when the torque load is applied, the whole of the leaf spring 9 is hard to slide sideways. Therefore, the transfer torque does not decrease, and the occurrence of the excessive hysteresis can be prevented.

In German Patent DE3730393C2 shown in FIGS. 37 and 38, when the torque load is not applied, none of the contact points between the male shaft, the spherical member, the leaf spring and the female shaft exist on the same line, so that the contact angle comes to change according as the torque load is applied. As a result, there might be a possibility in which neither a linear torsional characteristic necessary for the steering shaft nor the proper hysteresis can be obtained.

By contrast, according to the present fourth embodiment shown in FIGS. 20 and 21, the contact points between the male shaft 1, the spherical member 7, the leaf spring 9 and the female shaft 2 stay on the same line irrespective of the state of the torque load, and therefore the contact angle does not change. This makes it possible to acquire the linear torsional characteristic necessary for the steering shaft and also the linear steering characteristic giving the feeling of the high rigidity.

Figure 22A:
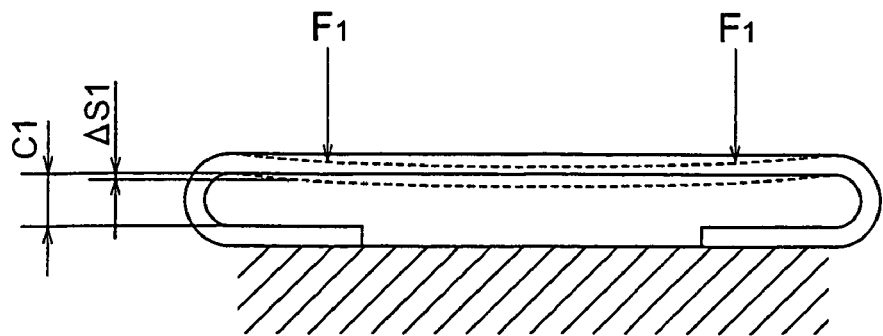
FIGS. 22A, 22B and 22C are schematic views showing flexural states of leaf springs employed in the fourth embodiment of the present invention.
Figure 22B:
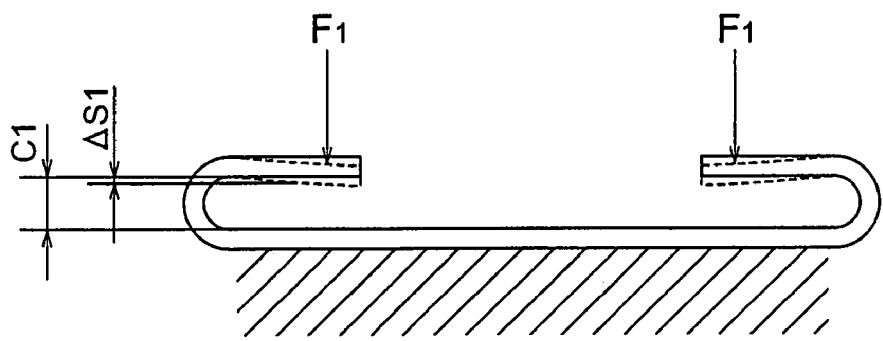
Figure 22C:
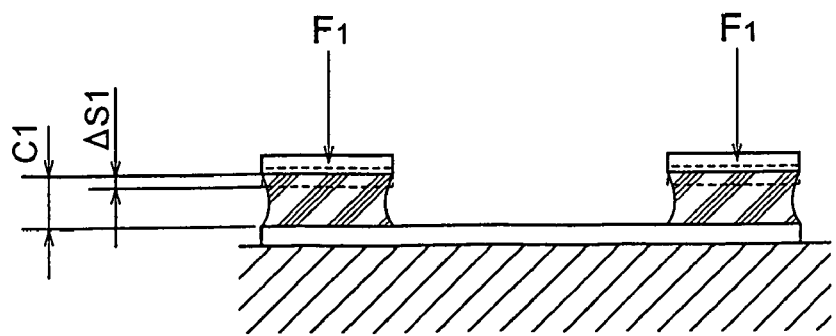

FIGS. 22A, 22B and 22C are schematic views showing flexural states of the leaf springs employed in the respective embodiments of the present invention.

Figure 39A:
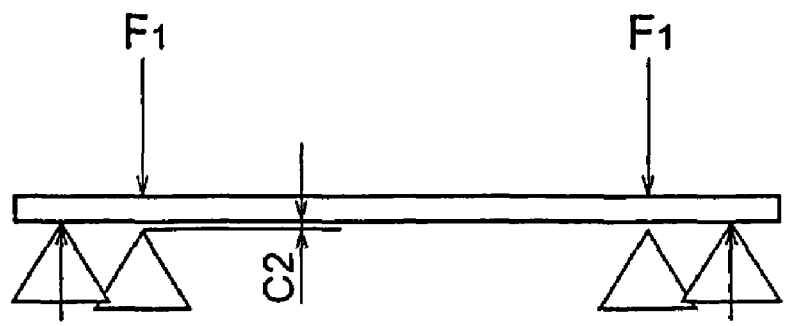
FIGS. 39A and 39B are schematic views each showing a flexural state of the leaf spring used in German Patent DE3730393C2.
Figure 39B:
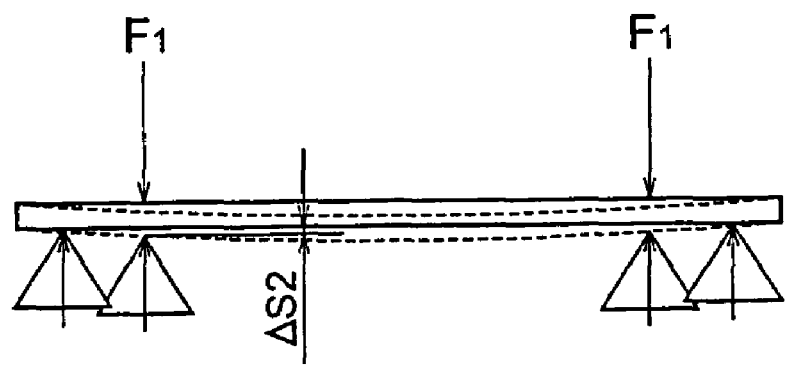

FIGS. 39A and 39B are schematic views showing flexural states of the leaf springs used in German Patent DE3730393C2.

FIGS. 39A and 39B show simplified models of the leaf spring shown in German Patent DE3730393C2. FIG. 39A shows a state where it is desired that a proper pre-load be applied in a non-load state of the torque, wherein a distance (C2) between the leaf spring and the axially-extending groove serves as a stroke at which the pre-load can be generated as a spring. FIG. 39B shows that when load (F1) is applied at two points, the leaf spring becomes flexural and eventually contacts with the side surfaces of the axially-extending groove. Consequently, the leaf spring must receive all the torque at the points contacting with the ball. Accordingly, the leaf spring is unable to increase a quantity of flexure ($\Delta S2$) thereof, and it is presumed that the steering shaft is hard to sustain its necessary life-time. Note that a relationship between the distance (C2) and the quantity of flexure ($\Delta S2$) is given by $C2 \leq \Delta S2$.

By contrast, according to the fourth embodiment of the present invention illustrated in FIG. 22A, an interval between the spherical member sided contact portion 9a and the groove surface sided contact portion 9b of the leaf spring 9 is set to (C1). In this state, when the load (F1) is applied at two points (corresponding to the spherical member sided contact portion 9a), the elastic body can sufficiently get flexural, and an ample quantity of flexure ($\Delta S1$) can be ensured. Accordingly, the pre-load performance can be maintained over the long period of time by preventing the "fatigue" due to the permanent deformation. Note that a relationship between the interval (C1) and the quantity of flexure ($\Delta S1$) is given by $C1 > \Delta S1$.

In an embodiment (which will hereinafter be described by way of a sixth embodiment) of the present invention shown in FIG. 22B, the interval between the spherical member sided contact portion 9a and the groove surface sided contact portion 9b of the leaf spring 9 is set to (C1). In this state, when the load (F1) is applied at two points (corresponding to the spherical member sided contact portion 9a), the elastic body can sufficiently get flexural, and the ample quantity of flexure ($\Delta S1$) can be ensured. Hence, the pre-load performance can be maintained over the long period of time by preventing the "fatigue" due to the permanent deformation. Note that a relationship between the interval (C1) and the quantity of flexure ($\Delta S1$) is given by $C1 > \Delta S1$.

In an embodiment (which will hereinafter be described by way of a seventeenth embodiment) of the present invention shown in FIG. 22C, the interval between the spherical member sided contact portion 9a and the groove surface sided contact portion 9b of the leaf spring 9 is set to (C1), and the biasing portion 9c is formed of a rubber, a synthetic resin and so on. In this state, when the load (F1) is applied at two points (corresponding to the spherical member sided contact portion 9a), the elastic body can sufficiently get flexural, and the ample quantity of flexure ($\Delta S1$) can be ensured. Accordingly, the pre-load performance can be maintained over the long period of time by preventing the "fatigue" due to the permanent deformation. Note that the relationship between the interval (C1) and the quantity of flexure ($\Delta S1$) is given by $C1 > \Delta S1$.

Next, as described above, when the torque is applied, the whole of the leaf spring 9 is so structured as to be hard to slide sideways, however, the bottom portion 9d of the leaf spring 9 is allowed to slightly shift sideways from the bottom surface 3b of the axially-extending groove 3.

Namely, the bottom portion 9d of the leaf spring 9, as in the present fourth embodiment, is set in the contact-state with the bottom surface 3b of the axially-extending groove 3, or as in a fifth embodiment which will be explained later on, an interval from the bottom surface 3b of the axially-extending groove 3 is set to a predetermined interval.

Hence, the bottom portion 9d of the leaf spring 9 is made contact with the bottom surface 3b of the axially-extending groove 3 as the necessity may arise, thereby making it possible to control the hysteresis and to obtain the hysteresis as desired.

Namely, it is required that the hysteresis be changed in many ways in matching with the steering performance of each vehicle. To be specific, in a case where the bottom portion 9d of the leaf spring 9 is set in the contact-state with the bottom surface 3b of the axially-extending groove 3, a friction occurs when the axially-extending groove 3 and the leaf spring 9 make the relative movements, and the hysteresis can be set comparatively large. On the other hand, the interval between the bottom surface 3b of the axially-extending groove 3 and the bottom portion 9d of the leaf spring 9 is set to the predetermined interval, in which case none of the friction occurs when the axially-extending groove 3 and the leaf spring 9 make the relative movements, and the hysteresis can be set comparatively small.

Fifth Embodiment

Figure 23:
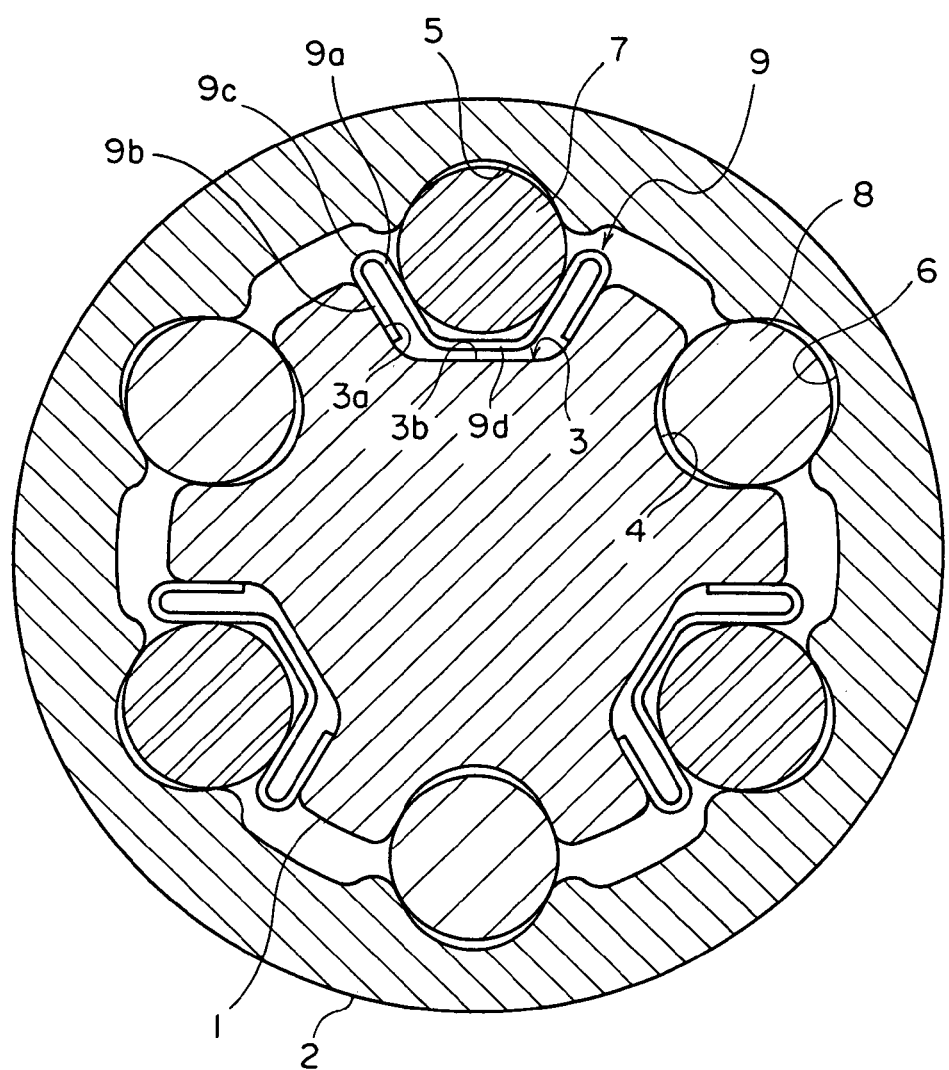
FIG. 23 is a cross-sectional view (corresponding to the cross-sectional view taken along the line X-X in FIG. 18A) of the telescopic shaft for the steering of the vehicle in a fifth embodiment of the present invention.

FIG. 23 is a cross-sectional view (corresponding to a cross-sectional view taken along the line X-X in FIG. 18A) of the telescopic shaft for the steering of the vehicle in a fifth embodiment of the present invention.

The fifth embodiment is substantially the same as the fourth embodiment discussed above, wherein the bottom surface 3b of the axially-extending groove 3 and the bottom portion 9d of the leaf spring 9 are spaced at a predetermined interval.

Accordingly, in this case, as explained above, the hysteresis can be controlled and can be set comparatively small without the occurrence of the friction when the axially-extending groove 3 and the leaf spring 9 move relatively.

Sixth Embodiment

Figure 24:
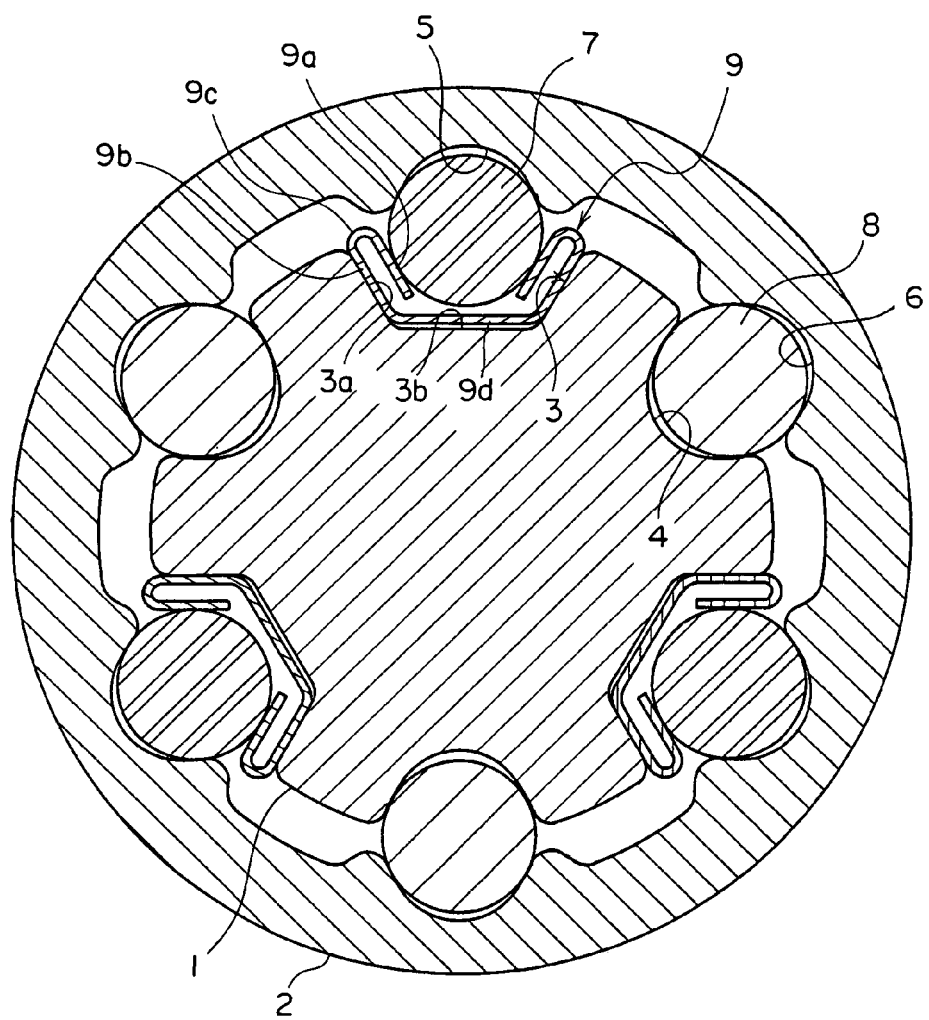
FIG. 24 is a cross-sectional view (corresponding to the cross-sectional view taken along the line X-X in FIG. 18A) of the telescopic shaft for the steering of the vehicle in a sixth embodiment of the present invention.

FIG. 24 is a cross-sectional view (corresponding to the cross-sectional view taken along the line X-X in FIG. 18A) of the telescopic shaft for the steering of the vehicle in a sixth embodiment of the present invention.

The sixth embodiment is substantially the same as the fifth embodiment discussed above, wherein the spherical member sided contact portion 9a of the leaf spring 9 is formed at a folding side end portion of the leaf spring 9, and the groove surface sided contact portion 9b is formed at a folding intermediate portion of the leaf spring 9.

Further, as in the fifth embodiment discussed above, the bottom surface 3b of the axially-extending groove 3 and the bottom portion 9d of the leaf spring 9 are spaced at a predetermined interval.

Seventh Embodiment

Figure 25:
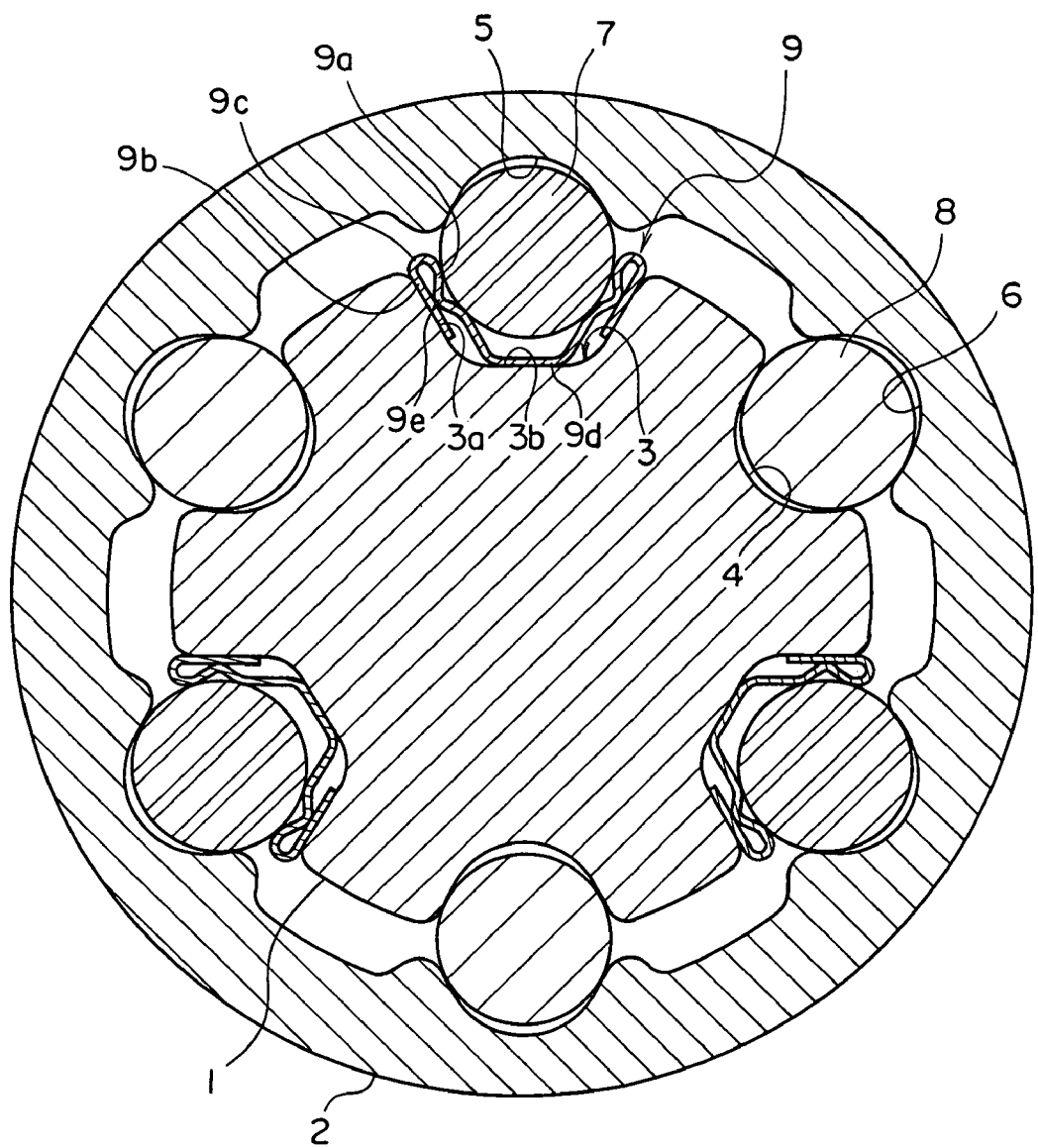
FIG. 25 is a cross-sectional view (corresponding to the cross-sectional view taken along the line X-X in FIG. 18A) of the telescopic shaft for the steering of the vehicle in a seventh embodiment of the present invention.

FIG. 25 is a cross-sectional view (corresponding to the cross-sectional view taken along the line X-X in FIG. 18A) of the telescopic shaft for the steering of the vehicle in a seventh embodiment of the present invention.

The seventh embodiment is substantially the same as the fourth embodiment discussed above, wherein the spherical member sided contact portion 9a of the leaf spring 9 is formed with a protruded portion 9e protruding towards the groove surface sided contact portion 9b.

This configuration enables the spherical member sided contact portion 9a to make contact at four points with the spherical member 7 and the load at the contact points between the leaf spring 9 and the spherical member 7 to be decreased, whereby the stress can be relieved.

Moreover, the bottom portion 9d of the leaf spring 9 is set in the contact-state with the bottom surface 3b of the axially-extending groove 3. In this case, as described above, the hysteresis can be controlled, the friction occurs when the axially-extending groove 3 and the leaf spring 9 move relatively, and the hysteresis can be set comparatively large.

Eighth Embodiment

Figure 26:
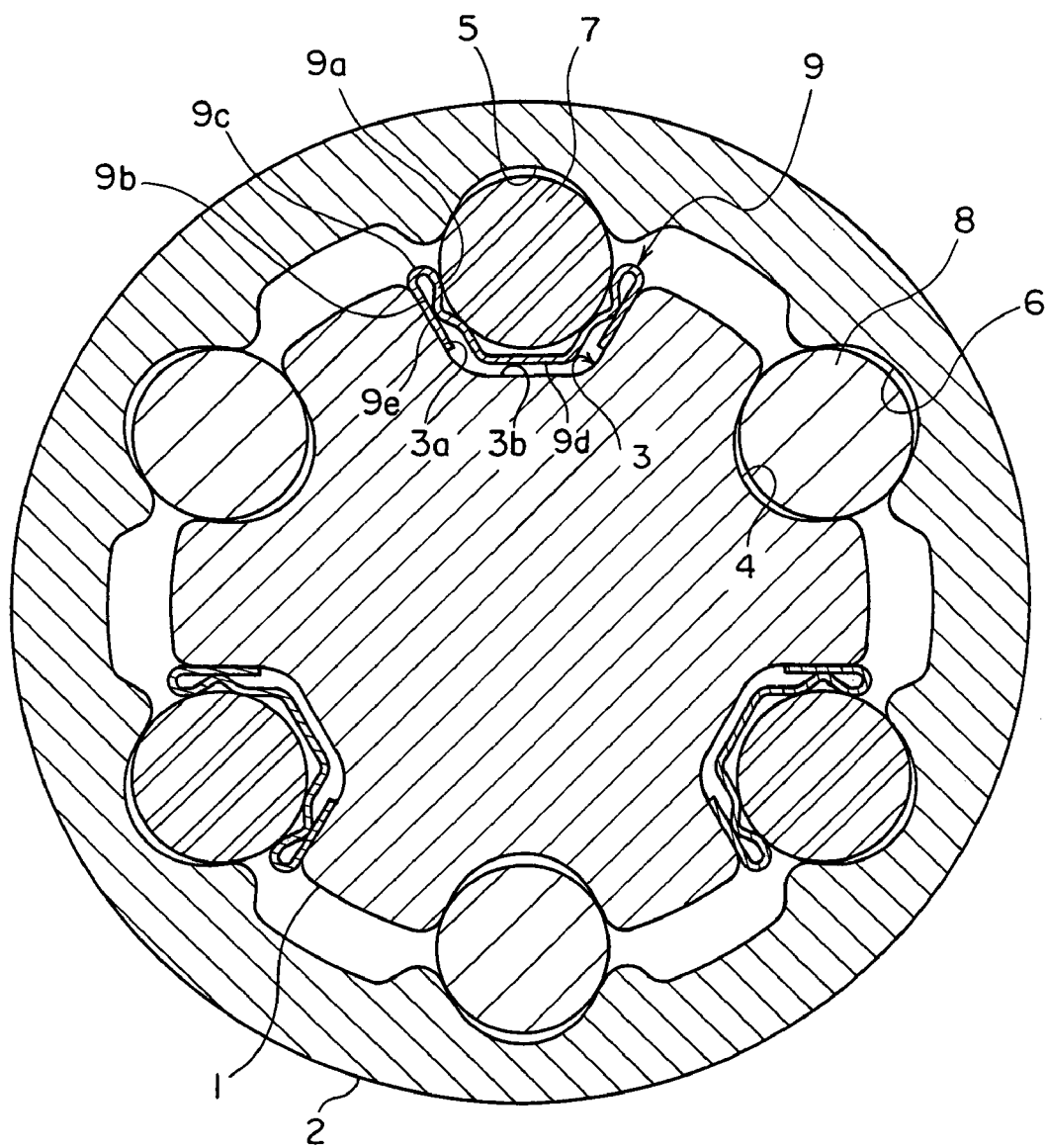
FIG. 26 is a cross-sectional view (corresponding to the cross-sectional view taken along the line X-X in FIG. 18A) of the telescopic shaft for the steering of the vehicle in an eighth embodiment of the present invention.

FIG. 26 is a cross-sectional view (corresponding to the cross-sectional view taken along the line X-X in FIG. 18A) of the telescopic shaft for the steering of the vehicle in an eighth embodiment of the present invention.

The eighth embodiment is substantially the same as the seventh embodiment discussed above, wherein the bottom surface 3b of the axially-extending groove 3 and the bottom portion 9d of the leaf spring 9 are spaced at a predetermined interval.

Accordingly, in this case, as explained above, the hysteresis can be controlled and can be set comparatively small without the occurrence of the friction when the axially-extending groove 3 and the leaf spring 9 move relatively.

Ninth Embodiment

Figure 27:
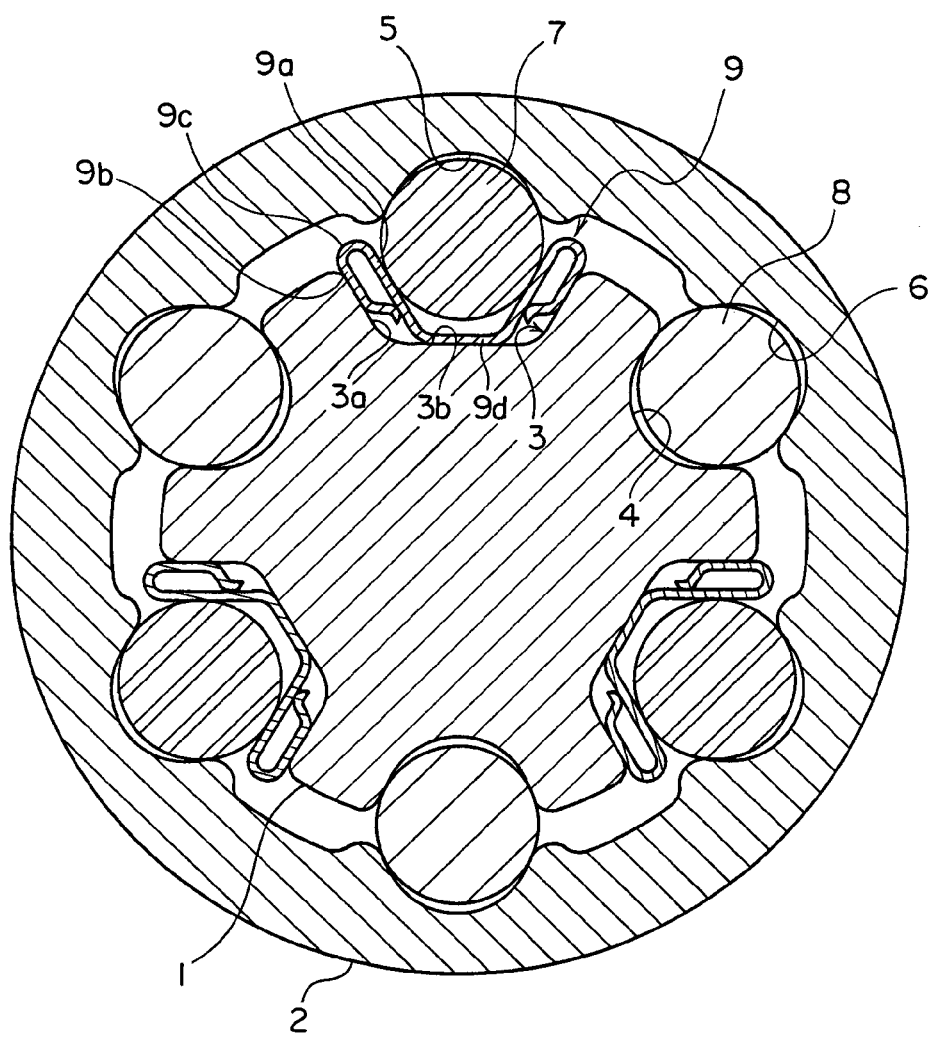
FIG. 27 is a cross-sectional view (corresponding to the cross-sectional view taken along the line X-X in FIG. 18A) of the telescopic shaft for the steering of the vehicle in a ninth embodiment of the present invention.

FIG. 27 is a cross-sectional view (corresponding to the cross-sectional view taken along the line X-X in FIG. 18A) of the telescopic shaft for the steering of the vehicle in a ninth embodiment of the present invention.

The ninth embodiment is substantially the same as the fourth embodiment discussed above, wherein tip end portions of the groove surface sided contact portion 9b of the leaf spring 9 are folded inwards to make contact with the spherical member sided contact portions 9a thereof.

This contrivance enables an increase in the rigidity of the leaf spring 9 and an improvement of the torsional rigidity.

Tenth Embodiment

Figure 28:
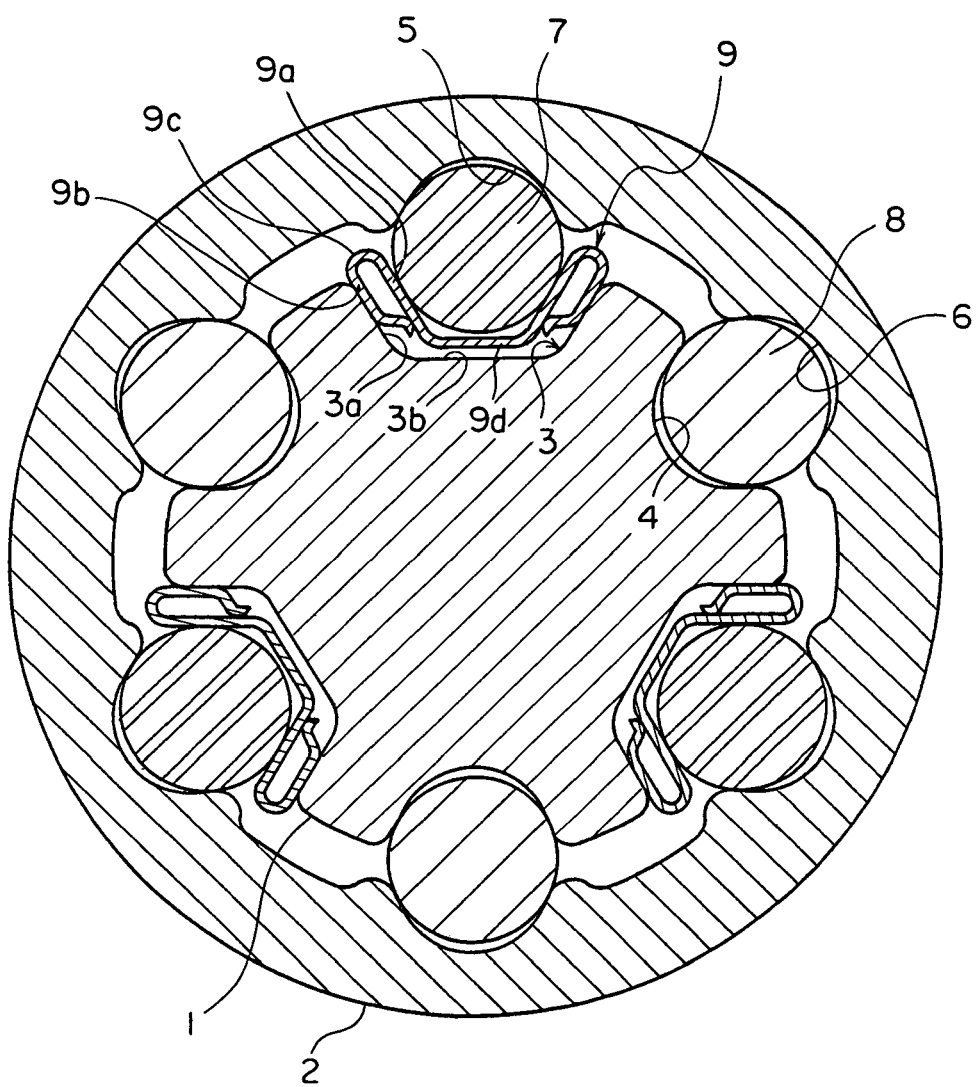
FIG. 28 is a cross-sectional view (corresponding to the cross-sectional view taken along the line X-X in FIG. 18A) of the telescopic shaft for the steering of the vehicle in a tenth embodiment of the present invention.

FIG. 28 is a cross-sectional view (corresponding to the cross-sectional view taken along the line X-X in FIG. 18A) of the telescopic shaft for the steering of the vehicle in a tenth embodiment of the present invention.

The tenth embodiment is substantially the same as the ninth embodiment discussed above, wherein the bottom surface 3b of the axially-extending groove 3 and the bottom portion 9d of the leaf spring 9 are spaced at a predetermined interval.

Accordingly, in this instance, as described above, the hysteresis can be controlled and can be set comparatively small without the occurrence of the friction when the axially-extending groove 3 and the leaf spring 9 move relatively.

Eleventh Embodiment

Figure 29:
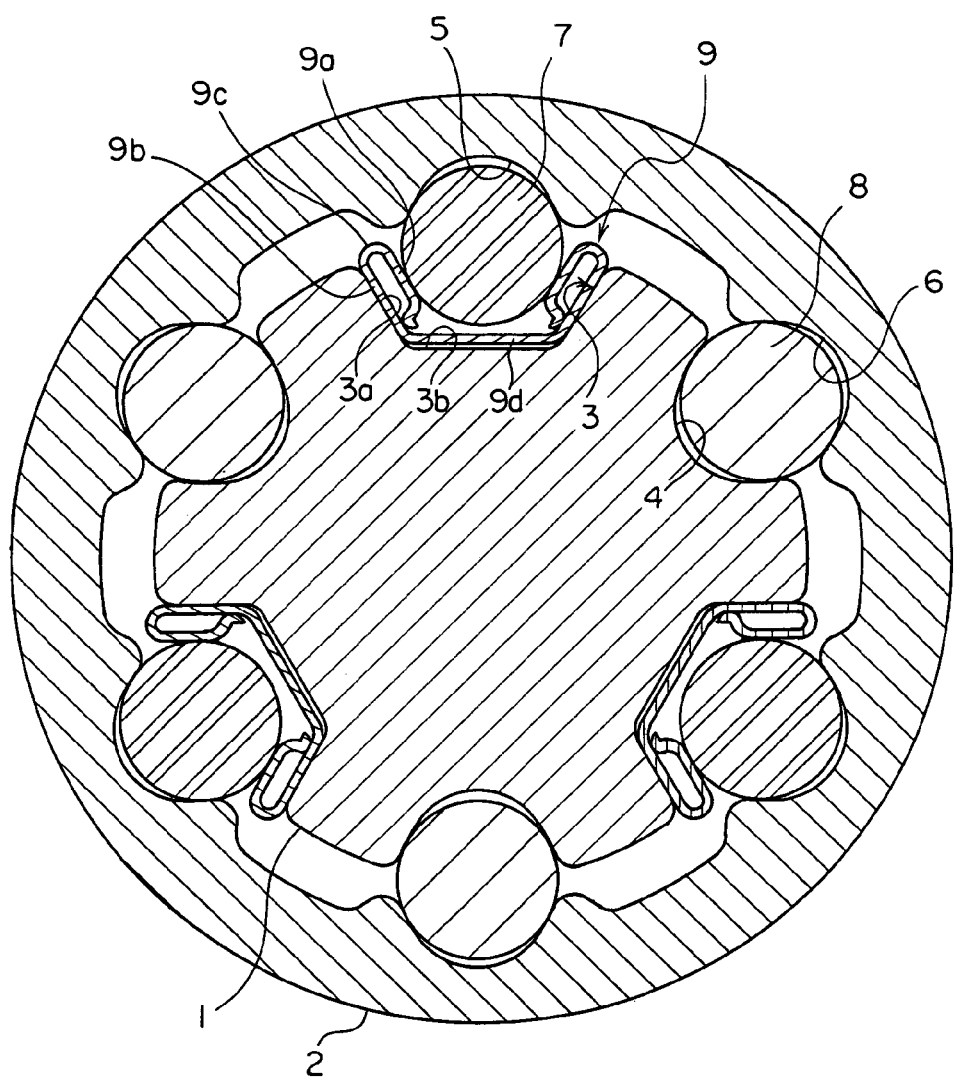
FIG. 29 is a cross-sectional view (corresponding to the cross-sectional view taken along the line X-X in FIG. 18A) of the telescopic shaft for the steering of the vehicle in an eleventh embodiment of the present invention.

FIG. 29 is a cross-sectional view (corresponding to the cross-sectional view taken along the line X-X in FIG. 18A) of the telescopic shaft for the steering of the vehicle in an eleventh embodiment of the present invention.

The eleventh embodiment is substantially the same as the sixth embodiment discussed above, wherein the spherical member sided contact portion 9a of the leaf spring 9 is formed on the folded-back end portion of the leaf spring 9, and the groove surface sided contact portion 9b is formed at a folding intermediate portion of the leaf spring 9. In this case also, the same action and effects as those in the third embodiment discussed above can be exhibited.

A tip end portions of the spherical member sided contact portion 9a of the leaf spring 9 are folded outwards to make contact with the groove surface sided contact portions 9b. With this contrivance, the rigidity of the leaf spring 9 can be increased, and the torsional rigidity can be improved.

Twelfth Embodiment

Figure 30:
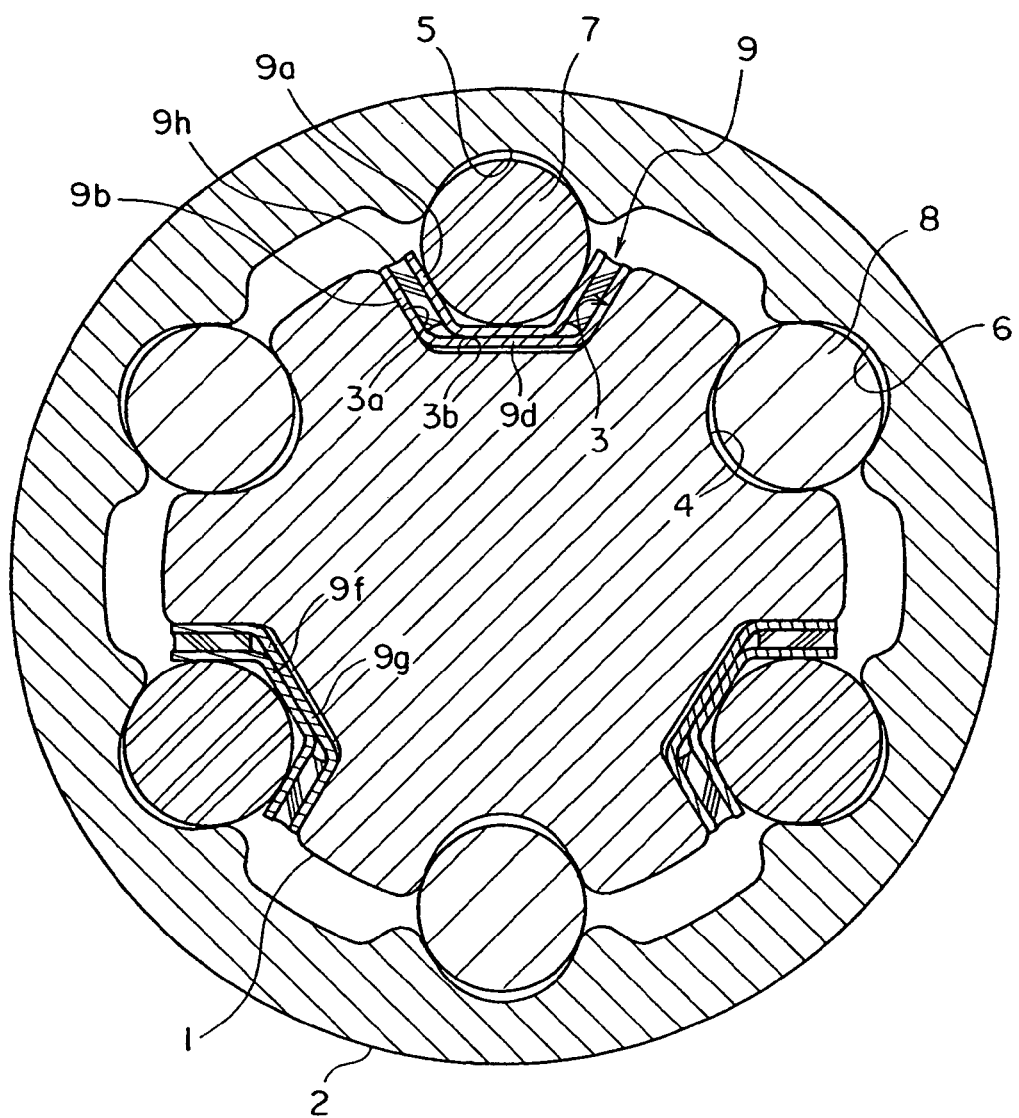
FIG. 30 is a cross-sectional view (corresponding to the cross-sectional view taken along the line X-X in FIG. 18A) of the telescopic shaft for the steering of the vehicle in a twelfth embodiment of the present invention.

FIG. 30 is a cross-sectional view (corresponding to the cross-sectional view taken along the line X-X in FIG. 18A) of the telescopic shaft for the steering of the vehicle in a twelfth embodiment of the present invention.

The twelfth embodiment is substantially the same as the fourth embodiment discussed above, wherein the crooked biasing portion 9C of the leaf spring 9 is eliminated, a pair of spherical member sided contact portions 9a are constructed of an inside plate 9f bent substantially in a U-shape, and a pair of groove surface sided contact portions 9b are constructed of an outside plate 9g bent substantially in a U-shape. Biasing portions 9h formed of different elastic materials such as rubbers or synthetic resins, etc. are interposed between flat surfaces of the inside plate 9f and flat surfaces of the outside plate 9g.

Further, there is no gap between a bottom surface of the inside plate 9f and a bottom surface of the outside plate 9g, wherein these bottom surfaces are set in a contact state. In this case, the hysteresis can be controlled, the friction occurs when the inside plate 9f and the outside plate 9g move relatively, and the hysteresis can be set comparatively large.

Thirteenth Embodiment

Figure 31:
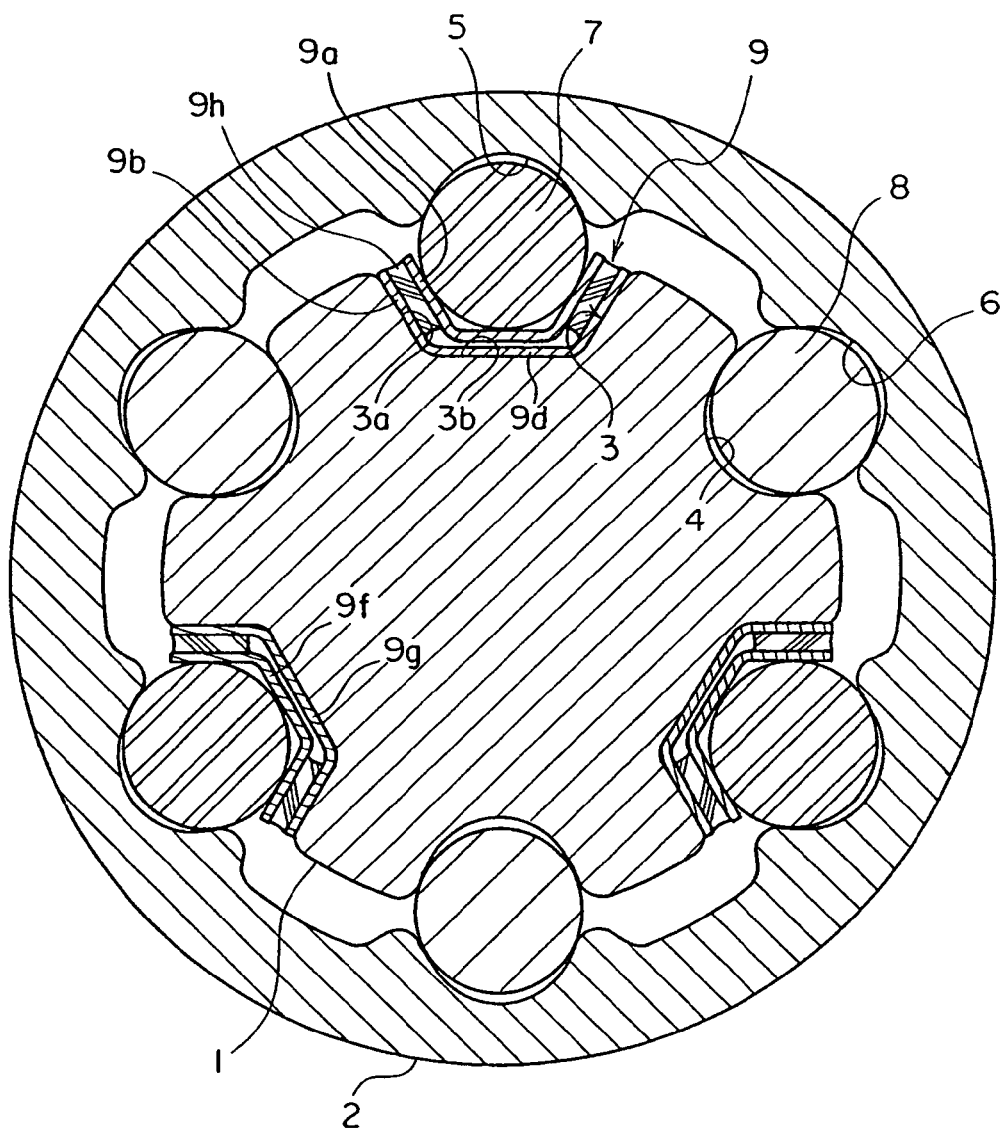
FIG. 31 is a cross-sectional view (corresponding to the cross-sectional view taken along the line X-X in FIG. 18A) of the telescopic shaft for the steering of the vehicle in a thirteenth embodiment of the present invention.

FIG. 31 is a cross-sectional view (corresponding to the cross-sectional view taken along the line X-X in FIG. 18A) of the telescopic shaft for the steering of the vehicle in a thirteenth embodiment of the present invention.

The thirteenth embodiment is substantially the same as the twelfth embodiment discussed above, wherein there is a slight gap between the bottom surface of the inside plate $9f$ and the bottom surface of the outside plate $9g$, wherein these bottom surfaces are set in a non-contact state. In this case, the hysteresis can be controlled, none of the friction occurs when the inside plate $9f$ and the outside plate $9g$ move relatively, and the hysteresis can be set comparatively small.

Fourteenth Embodiment

Figure 32:
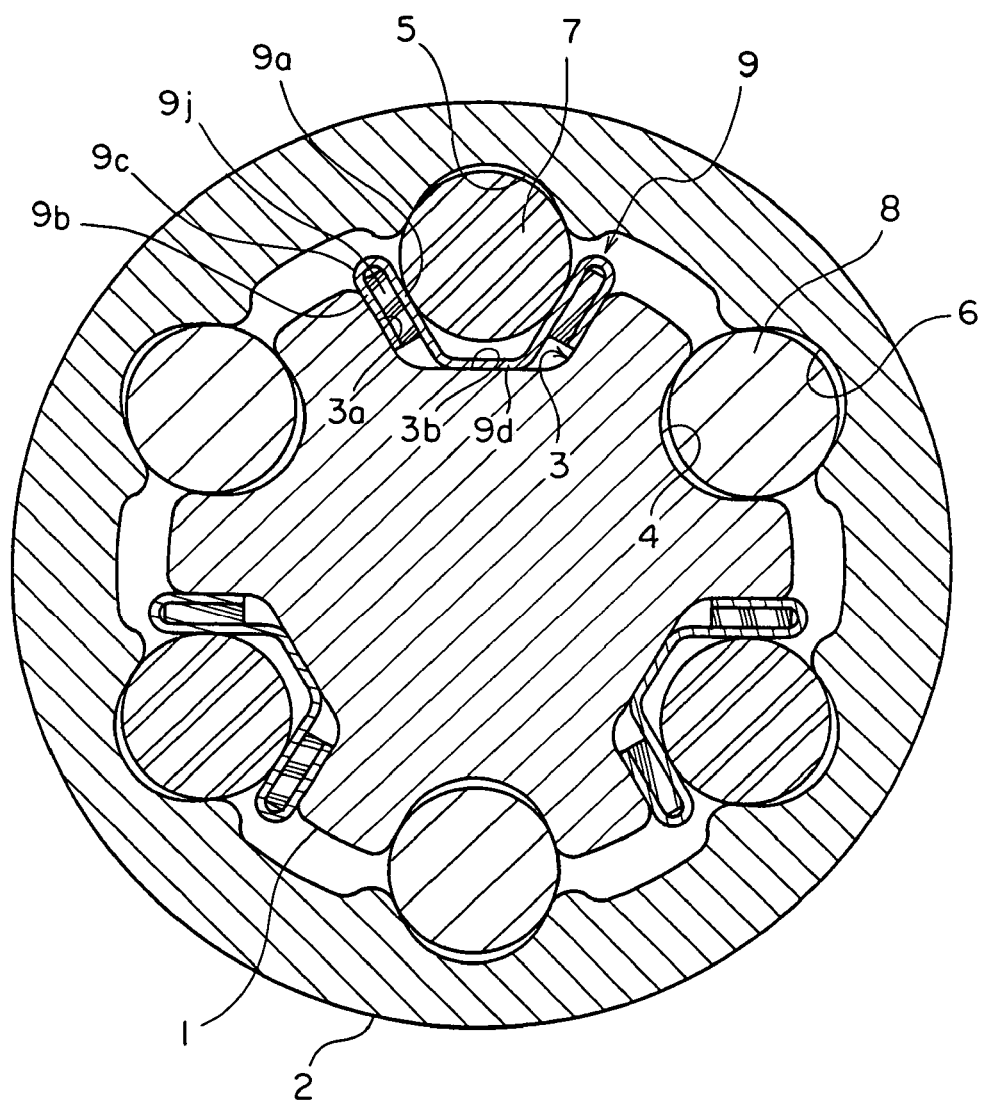
FIG. 32 is a cross-sectional view (corresponding to the cross-sectional view taken along the line X-X in FIG. 18A) of the telescopic shaft for the steering of the vehicle in a fourteenth embodiment of the present invention.

FIG. 32 is a cross-sectional view (corresponding to the cross-sectional view taken along the line X-X in FIG. 18A) of the telescopic shaft for the steering of the vehicle in a fourteenth embodiment of the present invention.

The fourteenth embodiment is substantially the same as the fourth embodiment discussed above, wherein in the leaf spring 9, second biasing portions $9j$ formed of different elastic materials such as rubbers or a synthetic resins, etc. are interposed between the spherical member sided contact portions $9a$ and the grove surface sided contact portions $9b$.

With this configuration, the elasticity inherent in the different elastic material is added to the elasticity inherent in the body of the leaf spring 9 itself, whereby the higher torsional rigidity can be acquired.

Fifteenth Embodiment

Figure 33:
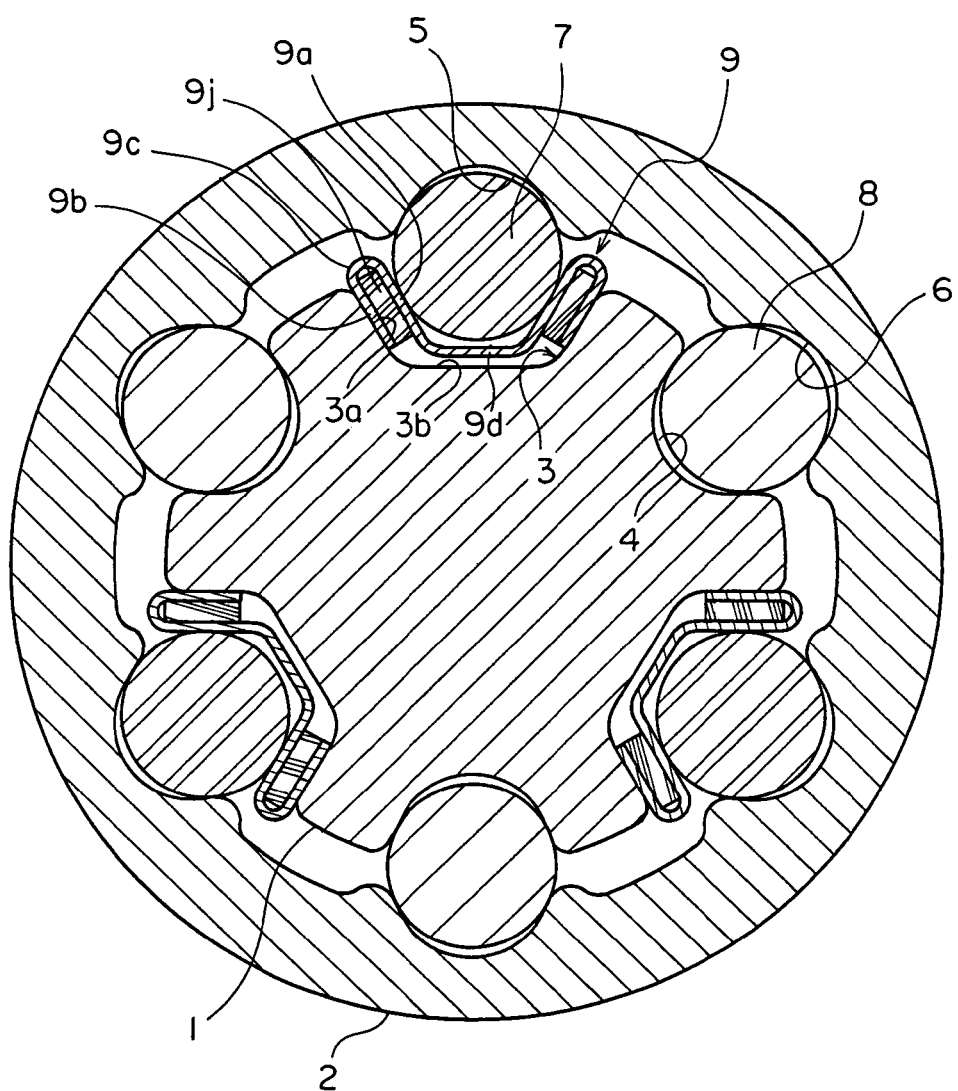
FIG. 33 is a cross-sectional view (corresponding to the cross-sectional view taken along the line X-X in FIG. 18A) of the telescopic shaft for the steering of the vehicle in a fifteenth embodiment of the present invention.

FIG. 33 is a cross-sectional view (corresponding to the cross-sectional view taken along the line X-X in FIG. 18A) of the telescopic shaft for the steering of the vehicle in a fifteenth embodiment of the present invention.

The fifteenth embodiment is substantially the same as the fifth embodiment discussed above, wherein in the leaf spring 9, the second biasing portions $9j$ formed of different elastic materials such as rubbers or a synthetic resins, etc. are interposed between the spherical member sided contact portions $9a$ and the groove surface sided contact portions $9b$.

With this configuration, the elasticity inherent in the different elastic material is added to the elasticity inherent in the body of the leaf spring 9 itself, whereby the higher torsional rigidity can be acquired.

Sixteenth Embodiment

Figure 34:
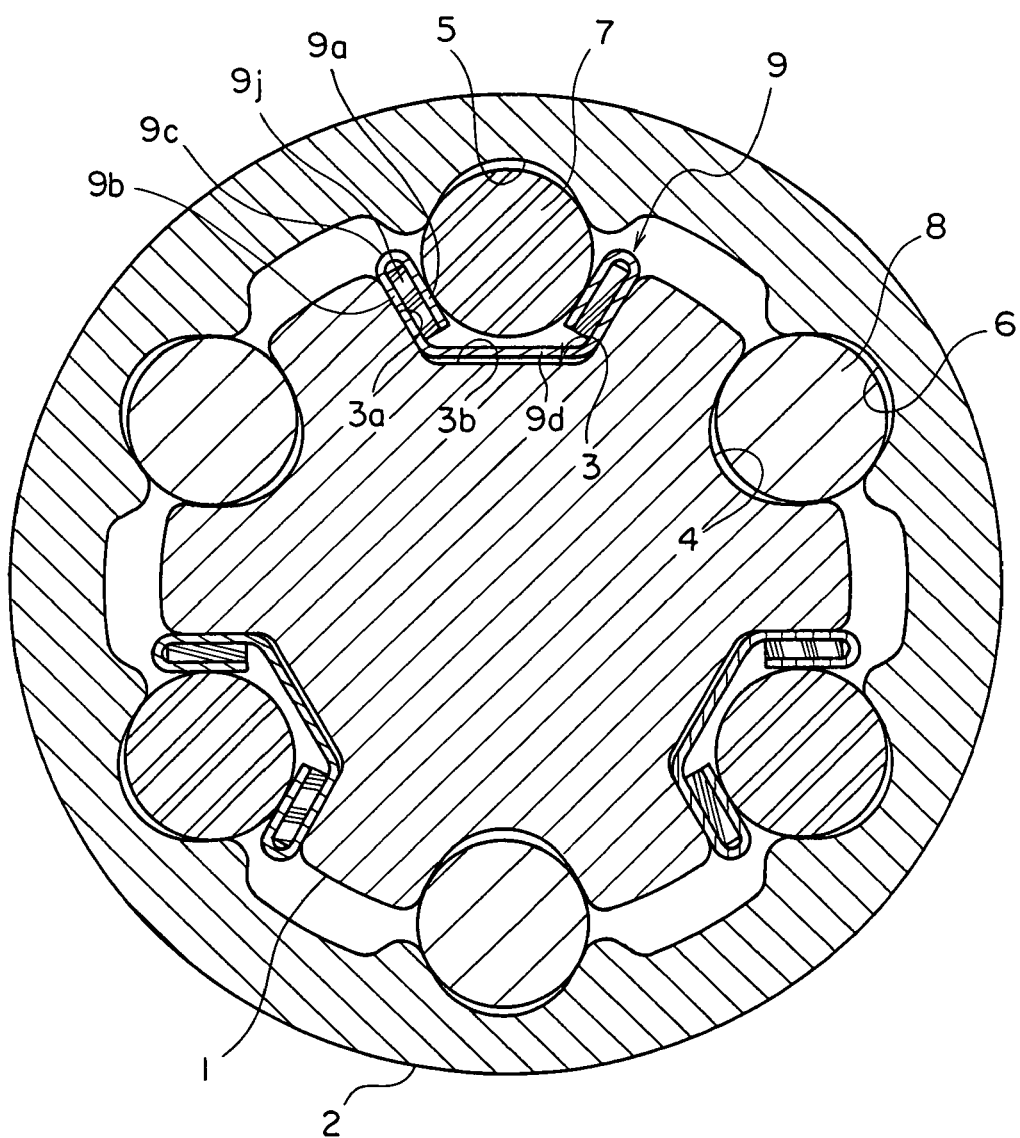
FIG. 34 is a cross-sectional view (corresponding to the cross-sectional view taken along the line X-X in FIG. 18A) of the telescopic shaft for the steering of the vehicle in a sixteenth embodiment of the present invention.

FIG. 34 is a cross-sectional view (corresponding to the cross-sectional view taken along the line X-X in FIG. 18A) of the telescopic shaft for the steering of the vehicle in a sixteenth embodiment of the present invention.

The sixteenth embodiment is substantially the same as the sixth embodiment discussed above, wherein in the leaf spring 9, the second biasing portions $9j$ formed of different elastic materials such as rubbers or synthetic resins, etc. are interposed between the spherical member sided contact portions $9a$ and the grove surface sided contact portions $9b$.

With this configuration, the elasticity inherent in the different elastic material is added to the elasticity inherent in the body of the leaf spring 9 itself, whereby the higher torsional rigidity can be acquired.

Seventeenth Embodiment

Figure 35:
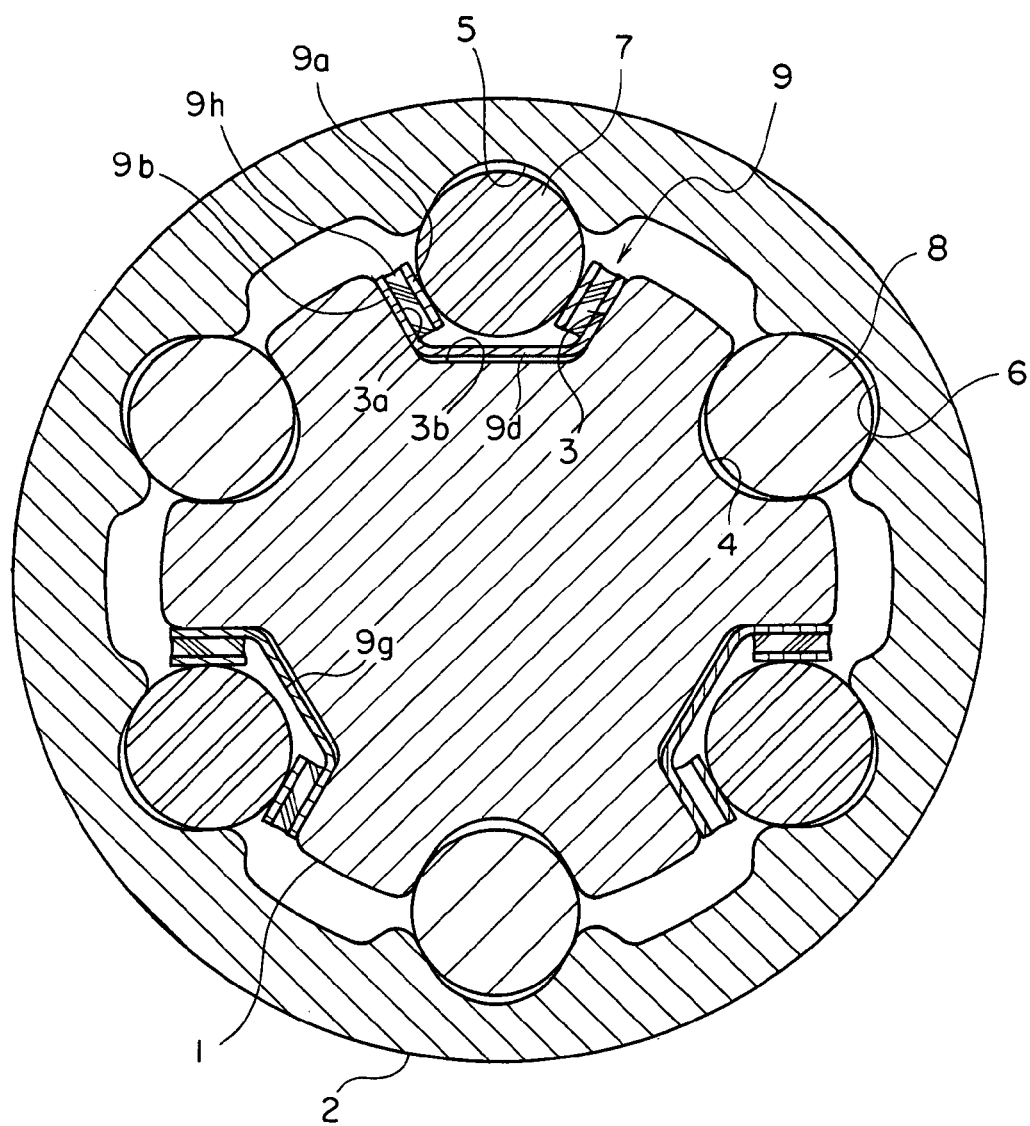
FIG. 35 is a cross-sectional view (corresponding to the cross-sectional view taken along the line X-X in FIG. 18A) of the telescopic shaft for the steering of the vehicle in a seventeenth embodiment of the present invention.

FIG. 35 is a cross-sectional view (corresponding to the cross-sectional view taken along the line X-X in FIG. 18A) of the telescopic shaft for the steering of the vehicle in a seventeenth embodiment of the present invention.

The seventeenth embodiment is substantially the same as the twelfth or thirteenth embodiment discussed above, wherein in the leaf spring 9, a pair of spherical member sided contact portions $9a$ are constructed of two pieces of plates as inside plates, and a pair of groove surface sided contact portions $9b$ are constructed of an outside plate $9g$ bent substantially in a U-shape. The biasing portions $9h$ formed of different elastic materials such as rubbers or a synthetic resins, etc. are interposed therebetween.

With this configuration, the elasticity inherent in the material itself can be utilized, and, especially in the case of requiring the low torsional rigidity, the characteristic thereof can be exhibited.

Eighteenth Embodiment

Figure 36:
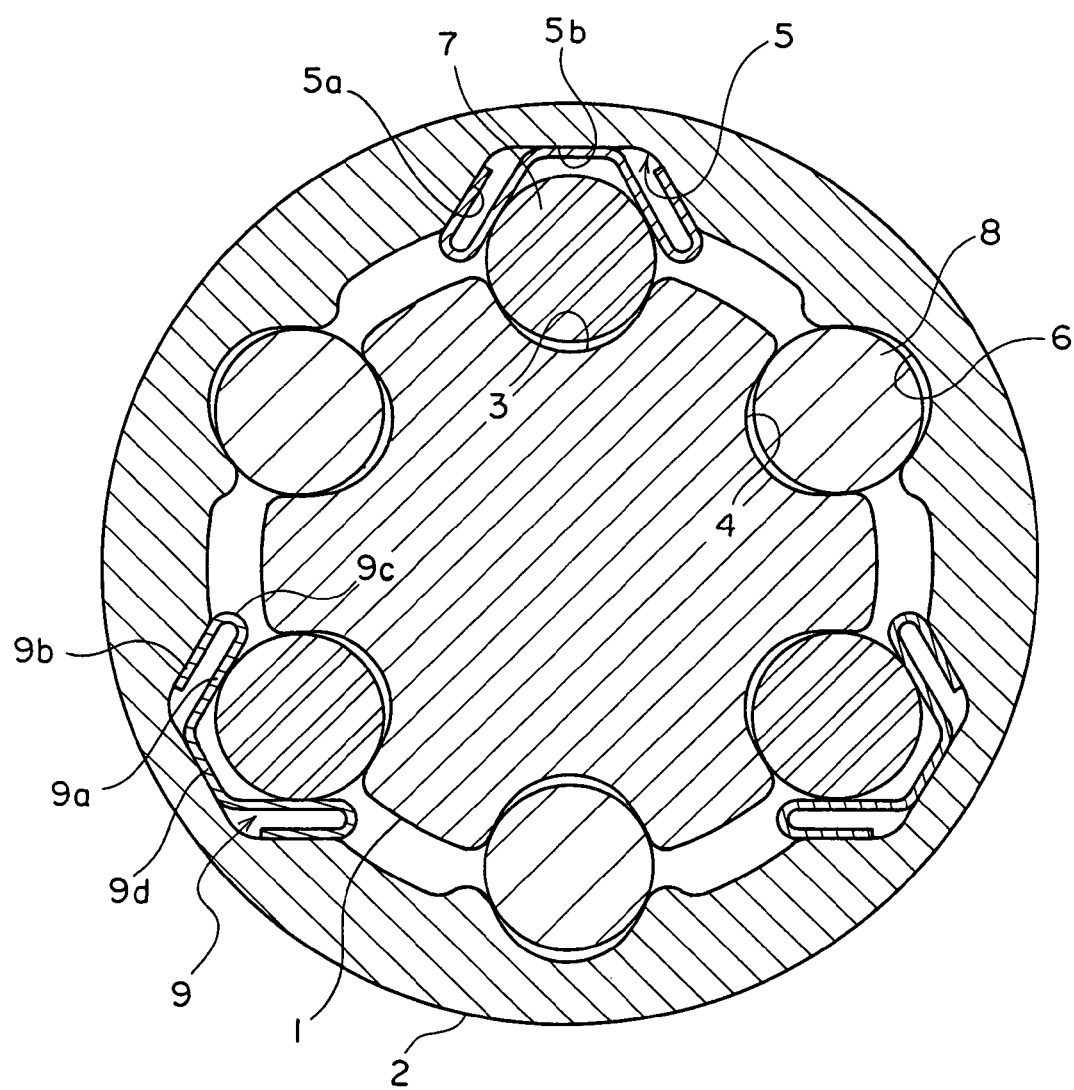
FIG. 36 is a cross-sectional view (corresponding to the cross-sectional view taken along the line X-X in FIG. 18A) of the telescopic shaft for the steering of the vehicle in an eighteenth embodiment of the present invention.

FIG. 36 is a cross-sectional view (corresponding to the cross-sectional view taken along the line X-X in FIG. 18A) of the telescopic shaft for the steering of the vehicle in an eighteenth embodiment of the present invention.

The eighteenth embodiment is what the leaf spring 9 is provided on the side of the female shaft 2 in the fourth embodiment discussed above.

The axially-extending groove 5 of the female shaft 2 is constructed of a pair of slant flat side surfaces $5a$ and a bottom surface $5b$ formed flat between the pair of flat side surfaces $5a$.

The leaf spring 9, which makes contact with the spherical member 7 and thus gives the pre-load thereto, is provided between the axially-extending groove 5 of the female shaft 2 and the spherical members 7.

The leaf spring 9 includes the spherical member sided contact portions $9a$ making contact at two points with the spherical member 7, the groove surface sided contact portions $9b$ spaced at a predetermined interval substantially in the peripheral direction from the spherical member sided contact portions $9a$ and making contact with the flat side surfaces $5a$ of the axially-extending groove 5 of the female shaft 2, biasing portions $9c$ for elastically biasing the spherical member sided contact portions $9a$ and the groove surface sided contact portions $9b$ in such a direction as to get separated from each other, and the bottom portion $9d$ facing the bottom surface $5b$ of the axially-extending groove 5.

The biasing portion $9c$ is bent substantially in a circular-arc shape and thus takes substantially a U-shape. The biasing portion $9c$ taking the bent shape can elastically bias the spherical member sided contact portion $9a$ and the groove surface sided contact portion $9b$ in such a direction as to get separated from each other.

Thus, even when the leaf spring 9 is disposed conversely to the fourth embodiment, the same action and effects can be exhibited.

Note that the present invention can be modified in a variety of forms without being limited to the embodiments discussed above.

As explained so far, according to the fourth through eighteenth embodiments of the present invention, the elastic body includes the transfer member sided contact portions making contact with the first torque transfer member, the groove surface sided contact portions spaced at the predetermined interval substantially in the peripheral direction from the transfer member sided contact portions and making contact with the groove surfaces of the axially-extending groove of the male shaft or the female shaft, and the biasing portions for elastically biasing the transfer member sided contact portions and the groove surface sided contact portions in such a direction as to get separated from each other. Therefore, in the elastic body, the transfer member sided contact portions can gain the sufficient flexures through the biasing portions, and the ample quantities of flexures can be ensured.

Further, as the second torque transfer member in addition to the first torque transfer member is provided, when the torque is transferred, the second transfer members make contact with the axially-extending grooves of the male shaft and of the female shaft earlier than the excessive load (stress) is applied on the elastic body, and are capable of mainly transferring the torque, and consequently the excessive load (stress) is applied on neither the first torque transfer members nor the elastic body.

Moreover, the elastic body can, as described above, ensure the sufficient quantity of flexure, and the excessive load (stress) is applied on neither the first torque transfer members nor the elastic body. Hence, when the torque is transferred, the stress generated at the contact portion between the first torque transfer member and the elastic body can be relieved. This prevents the high stress from occurring, and the pre-load performance can be maintained over the long period of time by preventing the "fatigue" due to the permanent deformation.

Still further, in the elastic body, the transfer member sided contact portions thereof make contact with the first torque transfer member, and the groove surface sided contact portions thereof make contact with the groove surface of the axially-extending groove. Therefore, the elastic body is in the state of fitting to the axially-extending groove. Accordingly, when the torque is transferred, the whole of the elastic body is hard to slide sideways in the peripheral direction from the axially-extending groove. Hence, the decrease in the transfer torque is not induced, and the hysteresis can be prevented from becoming excessive.

Furthermore, the contact points between the male shaft, the spherical member, the elastic body and the female shaft stay on the same line irrespective of the state of the torque load, and therefore the contact angle does not change. This makes it possible to acquire the linear torsional characteristic necessary for the steering shaft and also the linear steering characteristic giving the feeling of the high rigidity.

Note that manufacturing errors of the male shaft, the female shaft and the elastic body can be absorbed by the elastic deformation of the elastic body, so that a tolerance can be set large and a scheme of reducing the costs can be attained.

From what has been discussed so far, according to the fourth through eighteenth embodiments of the present invention, the stress generated on the elastic body is relieved, whereby the pre-load performance required over the long period of time can be maintained by preventing the "fatigue" of the elastic body. Further, there is no necessity of setting the dimensional accuracy strict, and the reduction in the costs can be actualized. Moreover, the steering performance required can be easily obtained because of being structured so that the friction between the elastic body and the axially-extending groove can be controlled.

What is claimed is:

1. A telescopic shaft for steering of a vehicle, assembled in a steering shaft and including a male shaft and a female shaft that are so fitted to be capable of transferring torque and to be movable in an axial direction relative to each other,
characterized in that a first torque transfer portion, which includes a first torque transfer member and an elastic body, is formed in at least one line of axially-extending groove formed in each of an outer peripheral surface of said male shaft and an inner peripheral surface of said female shaft,
said elastic body includes:
a transfer member sided contact portion being in contact with said first torque transfer member;
a groove surface sided contact portion spaced at a predetermined interval substantially in a peripheral direction from said transfer member sided contact portion, and being in contact with a groove surface of said axially-extending groove of said male shaft or said female shaft; and
a biasing portion elastically biasing said transfer member sided contact portion and said groove surface sided contact portion in such a direction as to get separated from each other;
wherein said biasing portion of said elastic body takes a bent shape bent between said transfer member sided contact portion and said groove surface sided contact portion.

2. A telescopic shaft for steering of a vehicle according to claim 1, wherein said axially-extending groove of said male shaft or said female shaft has a flat side surface which is in contact with said groove surface sided contact portion of said elastic body, and a bottom surface contiguous to said flat side surface,
said elastic body has a bottom portion facing said bottom surface of said axially-extending groove, and
said bottom portion of said elastic body is set in a contact state with said bottom surface of said axially-extending groove, or an interval between said bottom surface of said axially-extending groove and said bottom portion of said elastic body is set to a predetermined interval.

3. A telescopic shaft for steering of a vehicle according to claim 1, wherein said elastic body is constructed of a leaf spring.

4. A telescopic shaft for steering of a vehicle according to claim 1, wherein a lubricating agent is applied between said axially-extending groove of said male shaft, said axially-extending groove of said female shaft, said elastic body and said first torque transfer member.

5. A telescopic shaft for steering of a vehicle according to claim 1, wherein a second torque transfer portion is formed between the outer peripheral surface of said male shaft and the inner peripheral surface of said female shaft.

6. A telescopic shaft for steering of a vehicle according to claim 5, wherein said first torque transfer portion includes rolling members that roll when said two shafts make relative movements in the axial direction, and
said second torque transfer member includes a slide member that slides when said two shafts make the relative movements in the axial direction.

7. A telescopic shaft for steering of a vehicle, assembled in a steering shaft and including a male shaft and a female shaft that are so fitted to be capable of transferring torque and to be movable in an axial direction relative to each other,
characterized in that a first torque transfer portion, which includes a first torque transfer member and an elastic body, is formed in at least one line of axially-extending groove formed in each of an outer peripheral surface of said male shaft and an inner peripheral surface of said female shaft, said elastic body includes:
a transfer member sided contact portion being in contact with said first torque transfer member;
a groove surface sided contact portion spaced at a predetermined interval substantially in a peripheral direction from said transfer member sided contact portion, and being in contact with a groove surface of said axially-extending groove of said male shaft or said female shaft; and
a biasing portion elastically biasing said transfer member sided contact portion and said groove surface sided contact portion in such a direction as to get separated from each other;
wherein said biasing portion of said elastic body is a separate portion from said transfer member sided contact portion and from said groove surface sided contact portion, and is formed of a different material.

8. A telescopic shaft for steering of a vehicle, assembled in a steering shaft and including a male shaft and a female shaft that are so fitted to be capable of transferring torque and to be movable in an axial direction relative to each other,
characterized in that a first torque transfer portion, which includes a first torque transfer member and an elastic body, is formed in at least one line of axially-extending groove formed in each of an outer peripheral surface of said male shaft and an inner peripheral surface of said female shaft,
said elastic body includes:
a transfer member sided contact portion being in contact with said first torque transfer member;
a groove surface sided contact portion spaced at a predetermined interval substantially in a peripheral direction from said transfer member sided contact portion, and being in contact with a groove surface of said axially-extending groove of said male shaft or said female shaft;
a biasing portion elastically biasing said transfer member sided contact portion and said groove surface sided contact portion in such a direction as to get separated from each other; and
a second biasing portion formed of a different material as a separate portion.

9. A telescopic shaft for steering of a vehicle according to claim 8, wherein each of said biasing portion and said second biasing portion is made of a rubber or a synthetic resin.

* * * * *

UNITED STATES PATENT AND TRADEMARK OFFICE
CERTIFICATE OF CORRECTION

PATENT NO. : 7,322,607 B2 Page 1 of 1
APPLICATION NO. : 10/504815
DATED : January 29, 2008
INVENTOR(S) : Yasuhisa Yamada et al.

It is certified that error appears in the above-identified patent and that said Letters Patent is hereby corrected as shown below:

On the title page, item (54), and Col. 1, line 1, the title should read as follows :

(54) TELESCOPIC SHAFT FOR STEERING VEHICLE AND TELESCOPIC SHAFT FOR STEERING VEHICLE WITH CARDAN SHAFT JOINT

On the title page, item (75), the listing of inventors should read as follows :

(75) Yasuhisa Yamada, Gunma-ken (JP);
Akihiro Shoda, Gunma-ken (JP);
Atsushi Ozawa, Kanagawa-ken (JP);
Kinji Yukawa, Kanagawa-ken (JP)

Signed and Sealed this

Twenty-fifth Day of August, 2009

David J. Kappos
*Director of the United States Patent and Trademark Office*